(12) United States Patent
Divakaran et al.

(10) Patent No.: US 12,282,606 B2
(45) Date of Patent: *Apr. 22, 2025

(54) VPA WITH INTEGRATED OBJECT RECOGNITION AND FACIAL EXPRESSION RECOGNITION

(71) Applicant: SRI International, Menlo Park, CA (US)

(72) Inventors: Ajay Divakaran, Monmouth Junction, NJ (US); Amir Tamrakar, Philadelphia, PA (US); Girish Acharya, Redwood City, CA (US); William Mark, San Mateo, CA (US); Greg Ho, South Brunswick, NJ (US); Jihua Huang, Philadelphia, PA (US); David Salter, Bensalem, PA (US); Edgar Kalns, San Jose, CA (US); Michael Wessel, Palo Alto, CA (US); Min Yin, San Jose, CA (US); James Carpenter, Mountain View, CA (US); Brent Mombourquette, Menlo Park, CA (US); Kenneth Nitz, Redwood City, CA (US); Elizabeth Shriberg, Berkeley, CA (US); Eric Law, Hayward, CA (US); Michael Frandsen, Helena, MT (US); Hyong-Gyun Kim, Santa Clara, CA (US); Cory Albright, Helena, MT (US); Andreas Tsiartas, Santa Clara, CA (US)

(73) Assignee: SRI International, Menlo Park, CA (US)

( * ) Notice: Subject to any disclaimer, the term of this patent is extended or adjusted under 35 U.S.C. 154(b) by 327 days.

This patent is subject to a terminal disclaimer.

(21) Appl. No.: 17/107,958

(22) Filed: Dec. 1, 2020

(65) Prior Publication Data
US 2021/0081056 A1   Mar. 18, 2021

Related U.S. Application Data

(63) Continuation of application No. 15/332,494, filed on Oct. 24, 2016.
(Continued)

(51) Int. Cl.
*G06F 3/03* (2006.01)
*G06F 3/01* (2006.01)
(Continued)

(52) U.S. Cl.
CPC ............ *G06F 3/017* (2013.01); *G06F 3/0304* (2013.01); *G06F 3/167* (2013.01); *G06N 3/006* (2013.01);
(Continued)

(58) Field of Classification Search
CPC ........ G06F 3/017; G06F 3/0304; G06F 3/167; G06F 3/03; G06K 9/00221;
(Continued)

(56) References Cited

U.S. PATENT DOCUMENTS 5,357,596 A * 10/1994 Takebayashi ............ G06F 3/16
704/E15.045
8,407,055 B2 * 3/2013 Asano ..................... G10L 17/26
704/251

(Continued)

OTHER PUBLICATIONS

Divakaran, U.S. Appl. No. 15/332,494, filed Oct. 24, 2016, Office Action, Feb. 27, 2020.
(Continued)

*Primary Examiner* — Lunyi Lao
*Assistant Examiner* — Jarurat Suteerawongsa
(74) *Attorney, Agent, or Firm* — MOSER TABOADA

(57) ABSTRACT

Methods, computing devices, and computer-program products are provided for implementing a virtual personal assistant. In various implementations, a virtual personal assistant can be configured to receive sensory input, including at least two different types of information. The virtual personal assistant can further be configured to determine semantic information from the sensory input, and to identify a context-specific framework. The virtual personal assistant can further be configured to determine a current intent. Determining the current intent can include using the semantic information and the context-specific framework. The virtual personal assistant can further be configured to determine a current input state. Determining the current input state can include using the semantic information and one or more behavioral models. The behavioral models can include one or more interpretations of previously-provided semantic information. The virtual personal assistant can further be configured to determine an action using the current intent and the current input state.

22 Claims, 26 Drawing Sheets

Related U.S. Application Data

(60) Provisional application No. 62/264,228, filed on Dec. 7, 2015, provisional application No. 62/329,055, filed on Apr. 28, 2016, provisional application No. 62/339,547, filed on May 20, 2016.

(51) Int. Cl.

| | | |
|---|---|---|
| G06F 3/16 | (2006.01) | |
| G06N 3/006 | (2023.01) | |
| G06N 5/022 | (2023.01) | |
| G06N 20/00 | (2019.01) | |
| G06N 20/10 | (2019.01) | |
| G06V 40/16 | (2022.01) | |
| G06V 40/20 | (2022.01) | |
| G10L 15/18 | (2013.01) | |
| G10L 15/22 | (2006.01) | |
| G10L 25/63 | (2013.01) | |
| G06N 7/01 | (2023.01) | |

(52) U.S. Cl.
CPC ............. *G06N 5/022* (2013.01); *G06N 20/00* (2019.01); *G06N 20/10* (2019.01); *G06V 40/16* (2022.01); *G06V 40/20* (2022.01); *G10L 15/1815* (2013.01); *G10L 15/22* (2013.01); *G10L 25/63* (2013.01); *G06N 7/01* (2023.01); *G10L 15/1822* (2013.01); *G10L 2015/228* (2013.01)

(58) Field of Classification Search
CPC .. G06K 9/00335; G06N 99/005; G06N 20/10; G06N 5/022; G06N 3/006; G06N 20/00; G06N 7/005; G10L 15/1815; G10L 15/22; G10L 25/63; G10L 15/1822; G10L 2015/228

See application file for complete search history.

(56) References Cited

U.S. PATENT DOCUMENTS

| | | | | |
|---|---|---|---|---|
| 8,781,802 | B2* | 7/2014 | Hagelin | G09B 7/04 |
| | | | | 703/2 |
| 8,914,290 | B2* | 12/2014 | Hendrickson | G10L 13/02 |
| | | | | 704/226 |
| 9,613,025 | B2* | 4/2017 | Heo | G06F 40/30 |
| 9,898,850 | B2* | 2/2018 | Furukawa | G06T 13/80 |
| 9,916,628 | B1* | 3/2018 | Wang | G06Q 40/123 |
| 10,884,503 | B2* | 1/2021 | Divakaran | G06F 3/167 |
| 2003/0167167 | A1 | 9/2003 | Gong | |
| 2006/0120570 | A1* | 6/2006 | Azuma | G06K 9/00597 |
| | | | | 382/117 |
| 2006/0192868 | A1* | 8/2006 | Wakamori | G06K 9/00604 |
| | | | | 348/294 |
| 2009/0231441 | A1* | 9/2009 | Walker | G06F 16/58 |
| | | | | 348/207.1 |
| 2010/0014718 | A1* | 1/2010 | Savvides | G06T 7/11 |
| | | | | 382/117 |
| 2011/0087483 | A1 | 4/2011 | Hsieh | |
| 2011/0112826 | A1* | 5/2011 | Wang | G06F 40/30 |
| | | | | 704/9 |
| 2013/0110520 | A1 | 5/2013 | Cheyer et al. | |
| 2013/0185066 | A1* | 7/2013 | Tzirkel-Hancock | |
| | | | | G10L 21/003 |
| | | | | 381/71.4 |
| 2013/0185078 | A1 | 7/2013 | Tzirkel-Hancock | |
| 2014/0195221 | A1* | 7/2014 | Frank | G06F 40/40 |
| | | | | 704/9 |
| 2014/0272847 | A1* | 9/2014 | Grimes | G09B 7/08 |
| | | | | 434/236 |
| 2015/0007307 | A1* | 1/2015 | Grimes | G09B 5/08 |
| | | | | 726/18 |
| 2015/0340031 | A1* | 11/2015 | Kim | G10L 15/22 |
| | | | | 704/249 |
| 2016/0163332 | A1* | 6/2016 | Un | G06F 16/90332 |
| | | | | 704/260 |
| 2017/0125008 | A1* | 5/2017 | Maisonnier | G10L 15/22 |
| 2018/0033432 | A1* | 2/2018 | Ikeno | G10L 17/22 |
| 2018/0075142 | A1* | 3/2018 | Fridental | G06V 20/10 |

OTHER PUBLICATIONS

Divakaran, U.S. Appl. No. 15/332,494, filed Oct. 24, 2016, Office Action, Jan. 17, 2019.
Divakaran, U.S. Appl. No. 15/332,494, filed Oct. 24, 2016, Advisory Action, Feb. 12, 2020.
Divakaran, U.S. Appl. No. 15/332,494, filed Oct. 24, 2016, Notice of Allowance, Sep. 4, 2020.
Divakaran, U.S. Appl. No. 15/332,494, filed Oct. 24, 2016, Interview Summary, Jun. 9, 2020.
Divakaran, U.S. Appl. No. 15/332,494, filed Oct. 24, 2016, First Office Action Interview, Mar. 26, 2019.
Divakaran, U.S. Appl. No. 15/332,494, filed Oct. 24, 2016, Final Office Action, Sep. 9, 2019.
The International Bureau of WIPO, "Preliminary Report on Patentability", in application No. PCT/US2016/065400, dated Jun. 21, 2018, 13 pages.
Current Claims in application No. PCT/US2016/065400, dated Jun. 2018, 8 pages.

* cited by examiner

| User Audio Input 202 | System Audio Response 204 |
|---|---|
| 210 I'd like to refill a prescription. | |
| | 212 Sure, happy to help you with that. Is it for you or for someone else? |
| 214 It's for me. | |
| | 216 Great, do you have the prescription number that appears on the label of the bottle? |
| 218 Yes, it's 469-421-003 | |
| | 220 Thanks, next I need to verify your name and address. |
| 222 This is John Doe, 222 Main Street, New Castle, Pennsylvania 16101. | |
| | 224 Thanks, I show that you have 3 refills remaining. Can I send the refill to the address you just provided? |
| 226 Yes, that's fine. | |
| | 228 You're all set. You should receive your prescription in 3 to 5 business days. Do you need to expedite it for faster delivery? |
| 230 No, 3 to 5 days should be fine. | |
| | 232 Thank you! Good-bye. |

| User Audio Input 302 | System Audio Response 304 | Multi-Modal Cues 306 | User State 308 | System Adaptation 310 |
|---|---|---|---|---|
| 310 I'd like to refill a prescription. | | | | |
| | 312 Sure, happy to help you with that. I'll need to ask you some questions first. | | | |
| 314 <some noise, no perceptible speech> | | Speaking rate is slow, hesitant | User needs more time | Changes dialog approach to asking direct yes/no questions |
| | 316 Is the prescription for you? | | | |
| 318 Uh, what's that? | | | | |
| | 320 Is the prescription for you? | Hearing ability is less than normal/default | | Moderate volume increase and slowing of system responses |
| 322 Yes, yes, it's..it's for me. I need a refill. | | | | |
| | 324 OK, great. Do you have your medicine bottle with you now? | | | |
| 326 Yes, it's here somewhere, let me...here it is. | | Speaking rate faster, mild frustration | | |
| | 328 OK, on the bottle there should be a label. <pause> On the label there will be a medication number. Can you find it? | | | |
| 330 I think so, I found something here...but...<sigh> | | Visible grimace and audible frustration | Frustration | Changes questing approach toward easy to remember information |
| | 332 OK, let's try a different approach. Please tell me your home phone number instead. | | | |

*FIG. 3*

VPA WITH INTEGRATED OBJECT RECOGNITION AND FACIAL EXPRESSION RECOGNITION

CROSS REFERENCE TO RELATED APPLICATIONS

This patent application is a continuation of U.S. application Ser. No. 15/332,494, filed Oct. 24, 2016 which claims the benefit of and priority to U.S. Provisional Patent Application Ser. No. 62/264,228, filed Dec. 7, 2015, and U.S. Provisional Patent Application No. 62/329,055, filed Apr. 28, 2016, and U.S. Provisional Patent Application No. 62/339,547, filed May 20, 2016, each of which is incorporate herein by this reference in its entirety.

BRIEF SUMMARY

Provided are systems, methods, such as computer-implemented methods, and computer-program products for a virtual personal assistant with integrated object recognition and facial expression recognition. A virtual personal assistant (VPA) is an electronic tool that enables a person to interact with a computer-driven device using multi-modal inputs, such as spoken, written, or typed natural language, verbal cues, emotional cues, and/or visual cues. A virtual personal assistant is capable of determining a person's intent, as well as the person's emotional, mental or cognitive state. Using this information, the virtual personal assistant is able to engage the personal in an interactive dialog, which can be steered or directed by the person. By interacting and reacting with the person, the virtual personal assistant can accomplish a task for the person.

In various implementations, methods, systems including computing devices, and computer-program products are provided for implementing a virtual personal assistant. In various implementations, a virtual personal assistant can be configured to receive, using an integrated circuit, sensory input. The sensory input can include at least two different types of information. The virtual personal assistant can further be configured to determine semantic information from the sensory input. The semantic information can provide an interpretation of the sensory input. The virtual personal assistant can further be configured to identify a context-specific framework. The context-specific framework can include a cumulative sequence of one or more previous intents. The virtual personal assistant can further be configured to determine a current intent. Determining the current intent can include using the semantic information and the context-specific framework. The virtual personal assistant can further be configured to determine a current input state. Determining the current input state can include using the semantic information and one or more behavioral models. The behavioral models can include one or more interpretations of previously-provided semantic information. The virtual personal assistant can further be configured to determine an action. Determining the action can include using the current intent and the current input state.

In some implementations, types of information included in sensory input can include speech information, graphical information, audio input, image input, or tactile input. In some implementations, voice biometrics are capable of being derived from audio input. In some implementations, an emotional state is capable of being derived from audio input. In some implementations, physical gestures are capable of being derived from image input. In some implementations, iris biometrics are capable of being derived from image input. In some implementations, an emotional state is capable of being derived from image input.

In some implementations, behavioral models can include a configurable preference model. The configurable preference model can include one or more previous input states and semantic information associated with the one or more previous input states.

In some implementations, the context-specific framework can include a context-specific ontology. The context-specific ontology can include a cumulative sequence of one or more context-specific intents. In some implementations, wherein the context-specific framework can include a dynamic ontology. The dynamic ontology can include a cumulative sequence of one or more previous intents derived from a context-specific ontology.

In some implementations, the virtual personal assistant can further be configured to generate a request to confirm that the determined action is correct. In some implementations, the virtual personal assistant can further be configured to determine the determined action is incorrect using additional sensory input. In these implementations, the virtual personal assistant can further be configured to generate a request for additional information. Alternatively or additionally, in some implementations, the virtual personal assistant can be configured to determine a new action using the additional sensory input.

In some implementations, actions can include formulating and outputting a verbal response. In some implementations, actions can include searching for information and providing a result of the search. In some implementations, actions can include generating a control signal.

BRIEF DESCRIPTION OF THE DRAWINGS

Illustrative embodiments are described in detail below with reference to the following figures:

FIG. 2 illustrates an example of an interaction that a person may have with a system that includes a virtual personal assistant;

FIG. 3 illustrates another example of an interaction between a person and a system that includes virtual personal assistant;

DETAILED DESCRIPTION

Figure 1:
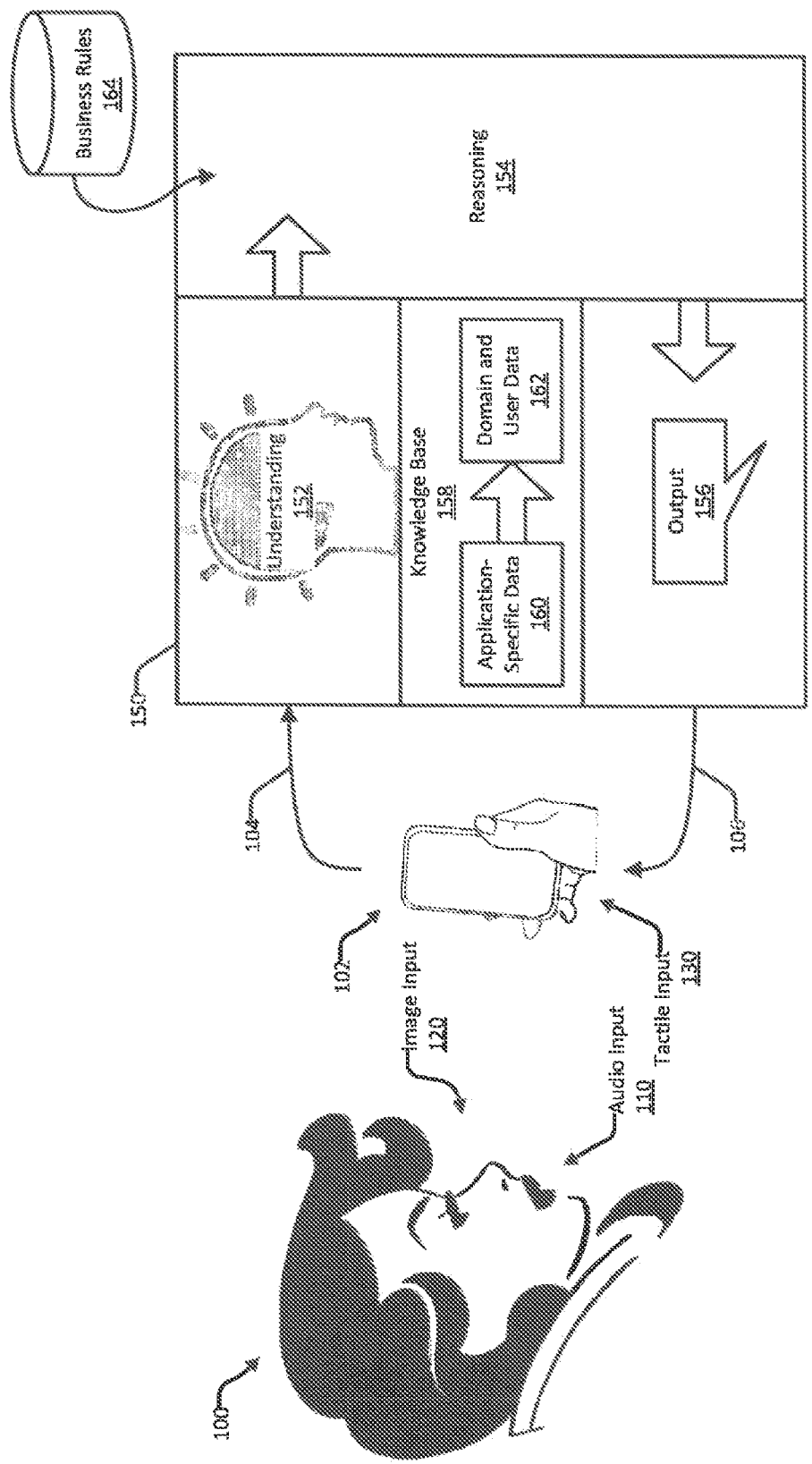
FIG. 1 illustrates an example of person interacting with a device or system that includes a multi-modal virtual personal assistant.

A virtual personal assistant (VPA) is an electronic tool that enables a person to interact with a computer-driven device by speaking to the device using natural language. "Natural language" is the ordinary language spoken by human beings among each other. Natural languages are languages that have evolved through time and use, as opposed to artificial or constructed languages, such as computer programming languages. Virtual personal assistants are typically integrated into other devices, such as smartphones, automobiles, or customer service systems. Generally, a person using such a device can speak or type a question or command, such as "what's the weather today?" or "give me directions to the restaurant." The virtual personal assistant can use speech recognition to interpret spoken words, and may use artificial intelligence to determine the speaker's intent, that is, what the speaker wants from the device. The virtual personal assistant may pass this information to the device to be acted upon.

Generally, virtual personal assistants accept as input spoken words and text. Human communication, however, is far more complex than only words. For example, during a conversation, the people speaking may react to vocal inflections, facial expressions, the direction of a speaker's gaze, body language, pointing or gesturing, and so on. That is, in addition to words, people also communicate through emotional and/or physical cues. A virtual personal assistant that is configured to only accept spoken and typed input is not able to comprehend non-verbal conversational cues, and thus would not likely be able to interact with a person in a natural way.

Virtual personal assistants may also have a limited ability to keep track of a conversation. To provide a simple example, a person may ask her smartphone "what's John's phone number?" to which the smartphone would respond with John's telephone number. The person may then say "call him," at which point the smartphone does not know who "him" is. A more complex example, where a speaker refers back to conversation that happened minutes or even days before, may be beyond the ability of a typical virtual personal assistant to handle.

In various implementations, provided herein is a multi-modal, conversational virtual personal assistant. A virtual personal assistant according to these implementations is able to receive various sensory inputs, including audible, visual, and/or tactile input. The virtual personal assistant is further able to derive semantic information from the different kinds of input, where the semantic information provides a description or interpretation of the inputs. The virtual personal assistant may combine the various inputs and, using a context-specific framework, determine the intent of a person who provided the inputs. A context-specific framework may provide information related to a specific domain or to a specific person or group of people. Using such frameworks, the virtual personal assistant may be able to determine what a person wants and/or how the person is reacting to the virtual personal assistant's outputs. The virtual personal assistant may further be able to determine the person's state of mind. That is, the virtual personal assistant may determine the person's current emotional, mental, or cognitive state using, for example, various behavioral models. In this way, the virtual personal assistant may be able to determine, for example, that a speaker is frustrated or confused even when the speaker only said "show me a map." In various implementations, a multi-modal virtual personal assistant may then adjust its behavior accordingly.

Multi-modality describes the practice of communicating using textual, aural, linguistic, spatial, and visual resources, each of which may be called a "mode". A multi-modal virtual personal assistant can accept audio input, including natural language and non-verbal sounds such as grunts or laughter. From the audio input, the virtual personal assistant can determine the words spoken (if any), and may also be able to determine the speaker's emotional state and voice biometrics (e.g., vocal characteristics). A multi-modal virtual personal assistant can also accept visual input, including video or still images, and determine information such as facial expressions, gestures, and iris biometrics (e.g., characteristics of a person's eyes). A multi-modal virtual personal assistant can also accept tactile input, such as keyboard, mouse, or touchscreen input, or other mechanical input methods that can be provided by a computing system (e.g., joysticks, key pads, scanners, barcode or Quick Response (QR) code scanners, etc.).

In various implementations, a multi-modal virtual personal assistant can also include a preference model, which can be tailored for a particular population and/or for one or more individual people. The preference model may keep track of information related to the person's personal information and/or the person's use of a device, such as for example a person's identification information, passwords, account information and/or login information, address books and so on. The preference model can also store historical information about a person, such as frequently used applications, frequently accessed contacts, frequently visited locations, shopping habits, a fondness for traveling, or an interest in antique cars. The preference model can also store characteristics and traits about a person, such as a propensity for speaking very quickly JO when anxious. The various audible, visual, and tactile information that can be input into the virtual personal assistant can be modified by the preference model to adjust for, for example, accents, cultural differences in the meaning of gestures, regional peculiarities, personal characteristics, and so on.

In various implementations, a multi-modal virtual personal assistant can also include various context-specific frameworks, including frameworks that aid the virtual personal assistant in keeping track of a conversation. For example, the virtual personal assistant may maintain a dynamic ontology. An ontology is a framework for organizing information. An ontology generally includes classes of information, attributes of those classes or of members of a class, and relationships between classes or members of a class. Ontologies are often used for artificial intelligence, semantic web design, systems engineering, software engineering, information architecture, information processing, knowledge engineering, and generally in the field of computer science as a way to represent knowledge.

A dynamic ontology is an organized set of information that grows or shrinks based on input received through the course of a conversation. A dynamic ontology can be used by a virtual personal assistant to track relationships between things said during a conversation. For example, a dynamic ontology can indicate that, when a device's user says "can you give me directions," the user is referring to the location that was the answer to user's question, "can you find me a Chinese restaurant in Menlo Park?" Information added to a dynamic ontology may be derived from underlying ontologies, such as for example an ontology for information about the city of Menlo Park.

Context-specific frameworks can also include frameworks for specific domains. A "domain" is a particular application, task, or environment to which a virtual personal assistant can be applied. Examples of domains include a banking website, where the virtual personal assistant can operate like a virtual teller; a retail checkout counter, where the virtual personal assistant can act as a cashier; and an airline customer service telephone system, where the virtual personal assistant can book flights and report current flight statuses.

In various implementations, a virtual personal assistant can include a set of universal components, which can be used in any domain. The universal components may include multi-modal understanding and reasoning engines, behavioral models, broadly applicable ontologies, and output generation tools that can be applied to any domain. The universal part of the virtual personal assistant may also have access to the Internet and information that can be derived from the Internet.

The universal components can be augmented by domain-specific components. The domain-specific components can include domain-specific ontologies, workflows, and output generation tools, among other things. In some cases, the domain-specific components can reduce the scope of what the virtual personal assistant needs to know, such that the device that includes such a virtual personal assistant can be self-contained (e.g., the device does not need a connection to the Internet). In some cases, when the domain-specific components do not have the information requested, the information can be requested from the universal components, which may seek the information from a resource such as the Internet.

I. Virtual Personal Assistant Platform

FIG. 1 illustrates an example of person 100 interacting with a device or system that includes a multi-modal virtual personal assistant 150. FIG. 1 further illustrates a conceptual example of the operation of a virtual personal assistant 150. An example implementation is discussed below. As noted above, a virtual personal assistant is usually integrated into another device or system, such as a computer, a mobile device, a wearable device, a body-mounted device, an appliance, an automobile, or a telephone-based Interactive Voice Response (IVR) system, among others. In the example illustrated in FIG. 1, a virtual personal assistant 150 has been integrated into a smartphone 102.

A domain may be specified for the smartphone 102. The domain can include the kinds of activities a smartphone is usually used for. Such activities may include, for example, making phone calls, sending text messages, finding businesses in a particular location (e.g. nearby, or in a specific city, state, or country), obtaining driving or walking directions, launching apps, and so on. A smartphone may also be used for activities that are not specific to the smartphone domain, such as online shopping and finding information on the Internet, among other things.

A person 100 using a smartphone 102 that includes a virtual personal assistant 150 can interact with the smartphone 102 using various sensory input, such as audio input 110, image input 120, and/or tactile input 130. For example, the person 100 can provide audio input 110, captured for example by a microphone, by speaking to the smartphone 102. The smartphone 102 can also capture non-verbal sounds, such as laughter or grunting. As another example, the person 100 can provide image input 120, captured for example by a camera. For example, the smartphone 102 can capture nodding, pointing, smiling, or placing some object or scene of interest in front of the smartphone 102. As another example, the person 100 can provide tactile input 130 by typing text into the smartphone's 102 keyboard interface, touching parts of the smartphone's 102 screen that represent text, buttons, images, or links (among other things), and/or by swiping, tapping, pinching, and/or making some other motion while touching the smartphone's 102 touchscreen interface, among other things.

The smartphone 102 device of this example can provide person's 100 various audio 110, image 120, and/or tactile 130 input as input 104 to the virtual personal assistant 150 system. The virtual personal assistant 150 typically includes an understanding system 152, a reasoning system 154, an output system 156, and a knowledge base 158. The understanding 152 system attempts to understand the person's 100 intent and/or emotional state. In some cases, the understanding 152 system may engage the person 100 in a dialog, either because the person 100 wants the smartphone 102 to do additional tasks or because the virtual personal assistant 150 needs more information from the person 100. The reasoning 154 system reasons about the best course of action for the virtual personal assistant 150. The best course of action may include considering not only what the person 100 has said or typed, but also the person's 100 apparent emotional or cognitive state. The reasoning 154 system may be provided an intelligent set of rules and/or models, which can be referred to as business rules 164, that help the reasoning 154 system to come to reasonable conclusions. The business rules 164 can include rules, models, templates, work flows, task flows, or some other method of expressing possible operations that the virtual personal assistant 150 is capable of The business rules 164 can be, though need not be, domain-specific. The output 156 system can formulate an output 106 to the person 100, where the output 106 can include, for example, something for the smartphone 102 to vocalize (such as asking follow-up questions), display, or do (e.g. look up information).

The understanding 152, reasoning 154, and output 156 systems may be aided by the virtual personal assistant's 150 knowledge base 158. The knowledge base 158 may include application-specific data 160 and domain and user data 162. The application-specific data 160 may include data that is specific to a particular application that the person 100 may be using when interfacing with the virtual personal assistant 150. For example, when the person 100 is asking for a phone number, the application-specific data 160 may include an address book. As another example, when the person 100 is asking for directions the application-specific data 160 may include a map. The domain and user data 162 may include data specific to a domain and/or a particular user of the smartphone 102. In this example, domain data can include, for example, telephone directories, address books, maps, and other data that can be used by typical smartphone applications. The user data can include, for example, the person's 100 identification information (address, telephone number, login usernames, etc.), authentication information (e.g., passwords, personal identification numbers (pins), fingerprints, etc.), and data generated by the person 100, such as photos, emails, etc. The user data can also include personal characteristics of the person 100, such as vocal characteristics (e.g. accents, speech impediments, etc.), visual characteristics (e.g. what the person 100 looks like, iris characteristics, what particular gestures made by the person 100 mean, etc.) and other audible or visual data that can assist the virtual personal assistant 150 in understand the particular person 100. In various implementations, the virtual personal assistant 150 may have user data for multiple people and/or for a group of people.

Using these systems, the virtual personal assistant 150 can interact with the person 100, determine the person's 100 intent, and assist the smartphone 102 device in determining what action to take in response to the person's 100 inputs. The virtual personal assistant 150 can further determine the person's 100 emotional, mental, or cognitive state, and adjust the action to take based on this determination. Actions to be taken by the smartphone 102 can include, for example, looking up requested information, asking for additional information or confirmation, and/or generating a control signal to enable some other action (e.g., launching an application, turning on a light, opening a door, starting a car, etc.).

FIG. 2 illustrates an example of an interaction 200 that a person may have with a system that includes a virtual personal assistant. In this example, a person is interacting with a system for refiling a prescription, such as for example an automated telephone system for a pharmacy, in a conversational, user-directed manner. "User-directed" means, for example, that the system is able to let the user specify the subject matter of the conversation, and to have the user directed the flow of the conversation (as compared to, for example, a system that presents a fixed set of automated prompts to which the user responds). In this example, the person is having no trouble interacting with the virtual personal assistant, and/or is not confused or distracted or upset by the system or by something else. The person is thus able to accomplish her task without any issues.

The left-hand column in this example illustrates the person's inputs to the system. In this example, the person is speaking to the system, thus the person's input is user audio input 202. The right-hand column illustrates the system audio response 204, that is, verbal responses by the system.

First, at step 210, the person says, "I'd like to refill a prescription." The system, using perhaps a natural language recognition system, is able to understand what the person wants, and responds, at step 212, with: "Sure, happy to help you with that. Is it for you or for someone else?" In this step, the system is configured to respond with an indication that it understood what the person has asked, and also with a request for additional information.

At step 214, the person responds: "It's for me." While the system may not know who "me" is, the system may be configured to conclude that the speaker is authorized to refill the prescription. For example, the system may be able to extract features from the speech input signal and, using automated speaker verification techniques, have verified the identity and/or authority of the speaker. Hence, at step 216, the system responds: "Great, do you have the prescription number that appears on the label of the bottle?" In this step, the system may be able to validate the speaker's identity without interrupting the flow of conversation (e.g., by asking the speaker to supply a passcode or some other identifying credential).

At step 218, the person responds, "Yes, it's 469-421-003," providing the prescription number. The system, by executing domain-specific workflows, for example, now determines that it needs more information before it can continue. Thus, at step 220, the system says, "Thanks, next I need to verify your name and address." In this response, the system acknowledges the person's answer, and requests standard validation information.

At step 222, the person responds, "This is John Doe, 222 Main Street, New Castle, Pennsylvania 16101." At step 224, the system acknowledges that it understood, provides some useful information to the person, and asks for additional information: "Thanks. I show that you have 3 refills remaining. Can I send the refill to the address you just provided?" The system may have obtained this information, for example, by executing a domain-specific workflow that accesses and retrieves information from the pharmacy database.

At step 226, the person responds, "Yes, that's fine." At step 228, the system again acknowledges that it understood, and provides some additional helpful information. The system also volunteers a suggestion, in case the person needs the prescription sooner: "You're all set. You should receive your prescription in 3 to 5 business days. Do you need to expedite it for faster delivery?"

At step 230, the person responds, "No, 3 to 5 days should be fine." The system then determines it has all the information it needs to refill the person's description, and, at step 232, concludes the conversation: "Thank you! Good-bye."

FIG. 3 illustrates another example of an interaction 300 between a person and a system that includes virtual personal assistant. In this example, the person is also refilling a prescription using an automated system, but in this example the person is having some problems. As illustrated in FIG. 3, the virtual personal assistant detects that the person is frustrated, and adjusts the system's output in an attempt to help the person accomplish her task. In this example, the first column illustrates the user audio input 302 (that is, the words spoken, or sounds made by the person) and the second column illustrates the system audio response 304 (that is, the verbal output from the system). The third column illustrates multi-modal cues 306 detected by the virtual personal assistant. The fourth column illustrates user states 308 determined by the virtual personal assistant. The fifth column illustrates the system adaptation 310 taken by the virtual personal assistant in response to the multi-modal cues 306 and user state.

At step 310, the person tells the system, "I'd like to refill a prescription." The system detects that the person is speaking slowly and hesitantly. The system may conclude that the speaker maybe is not quite ready for this conversation, and needs more time. Based on the conclusions that the system has made about the speaker's emotional or cognitive state, at step 312, the system determines to change its dialog approach by asking direct yes/no questions, and responds, "Sure, happy to help you with that. I'll need to ask you some questions first."

At step 314, the system detects some noise from the person, but is not able to perceive any speech. At step 316, the system attempts to move forward, and asks, "Is the prescription for you?"

At step 318, the person responds, "Uh, what's that?" From this, the system determines that perhaps the person has hearing difficulty. Based on this conclusion, the system adjusts by moderately increasing the volume and slowing the speed of its audio output. The person's response also indicates that the person likely did not understand the system's last response, so at step 320 the system repeats, "Is the prescription for you?"

At step 322, the person responds, "Yes . . . yes, it's . . . it's for me. I need a refill." The system detects that the person's speaking rate is faster, and that the person's tone of voice indicates mild frustration. The system may further conclude that the person is ready to move forward, but perhaps is not prepared. The system thus, at step 324, responds, "Ok, great. Do you have your medicine bottle with you now?"

At step 326, the person says, "Yes, it's here somewhere, let me . . . here it is." The system may determine that the person is generally uncertain as to what she needs to do. The system may thus, at step 328, respond in a patient, more direct way: "OK, on the bottle there should be a label <pause>. On the label there will be a medication number. Can you find it?"

At step 330, the person responds, "I think so, I found something here . . . but . . . <sigh>." From this reply, the system may detect audible frustration. The system may further detect, from image data, a visible grimace. From this information, the system may conclude that the person is probably frustrated, and that perhaps a different approach is needed. At step 332, the system adapts by changing its questions towards easier to remember information: "OK, let's try a different approach. Please tell me your home phone number instead."

The interaction may proceed from there, with the system continuing to adjust and attempting to help the person refill her prescription. As illustrated, the system can adjust not only to what the person says, but also to non-verbal cues that the system detects and determines indicate the person's emotional state. The system can use both visual and audible information acquired during the course of the interaction to determine how the system should adjust.

Figure 4:
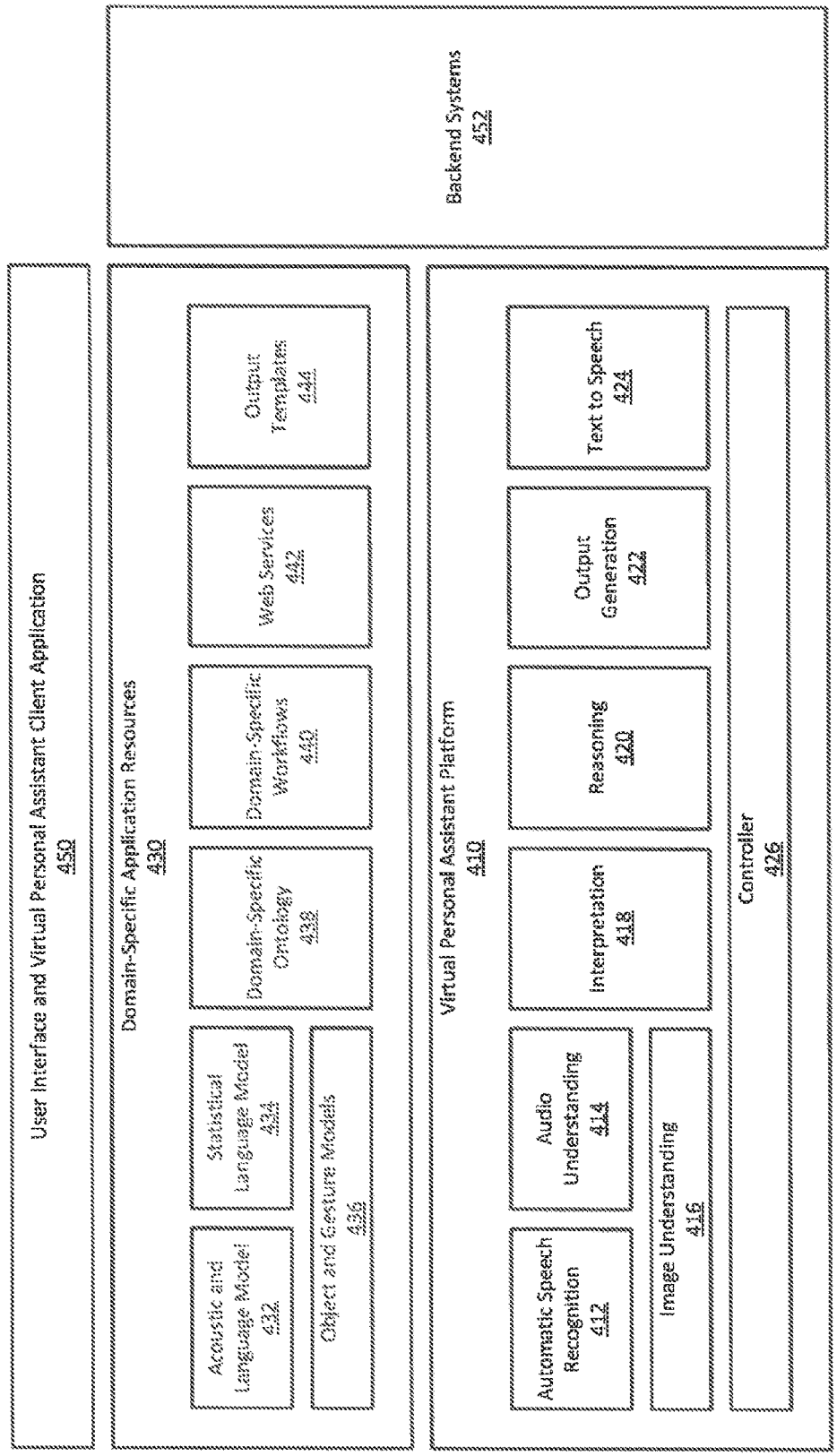
FIG. 4 is an example of a virtual personal assistant system, which can be integrated into various devices and systems that are designed to have multi-modal, conversational interactions with human users.

FIG. 4 is an example of a virtual personal assistant system 400, which can be integrated into various devices and systems that are designed to have multi-modal, conversational interactions with human users. In various implementations, being "integrated" into a device or system means that the virtual personal assistant system 400 is a component in a device or system that may have many other functions. For example, the virtual personal assistant system 400 can be implemented using software and/or hardware engines, which can be added to a computing device. The computing device can be, for example, a desktop computer, a laptop computer, a personal digital assistant, a smartphone, a tablet computer, a wearable or body-mounted device, or an appliance, among other devices. Other examples of computing devices include computers for automobiles, automated customer service systems, retail checkout systems, web-based Internet services, and so on.

The virtual personal assistant 400 can be integrated into a device or system in various ways. For example, the virtual personal assistant system 400 can be implemented as an independent application, or can be built into an operating system. As another example, the virtual personal assistant system 400 can be implemented as a hardware device, such as an Application Specific Integrated Circuit (ASIC), which can be added to, and used by, a computing system. As another example, the virtual personal assistant system 400 can be implemented as a device that can be added to another device. As another example, the virtual personal assistant system 400 can include a software and/or hardware interface that enables a device to access (e.g., over a network), a virtual personal assistant system 400 running "in the cloud," that is, in a data center and/or on remote servers.

In various implementations, the device or system into which the virtual personal assistant system 400 has integrated can include hardware for capturing or receiving user input. For example, the device or system can include a keyboard or touchscreen for accepting tactile input, a microphone for capturing audio input, and/or a camera for capturing image input. In various implementations, the user input captured by these devices or systems can be provided to the virtual personal assistant system 400, which can analyze and interpret the data, as discussed further below. In various implementations, the device or system can also provide a connection to a network, including the Internet, which the virtual personal assistant system 400 can use to obtain additional information.

In various implementations, a virtual personal assistant system 400 can be implemented using a layered approach, where lower layers provide basic or universal functionality, and upper layers provide domain and application-specific functionality. In the example virtual personal assistant system 400, the universal functionality is provided by a virtual personal assistant platform 410. On top of the virtual personal assistant platform 410, the example virtual personal assistant system 400 includes domain-specific application resources 430, which can use the virtual personal assistant platform's 410 functionality for domain-specific operations. On top of the domain-specific application resources 430, the example virtual personal assistant system 400 includes a user interface and virtual personal assistant client application 450, which can provide an interface between the domain-specific application resources 430 and a device's user. In various implementations, the virtual personal assistant system 400 can also include backend systems 452, which can support the operations of the virtual personal assistant platform 410 and/or the domain-specific application resources 430.

The virtual personal assistant platform 410 can provide the basic and common functionality that all or most virtual personal assistant implementations would use. To provide this functionality, in various implementations, the virtual personal assistant platform 410 can include automatic speech recognition 412, audio understanding 416, image understanding 416, interpretation 418, reasoning 420, output generation 422, and text-to-speech 424, among others components. The virtual personal assistant platform 410 can also include a controller 426 to coordinate the activities of the other components.

The automatic speech recognition 412 component can identify natural language in audio input, and provide the identified words as text to the rest of the system 400. In various implementations, the virtual personal assistant platform 410 can also receive natural language input entered using a tactile interface, such as a keyboard. In various implementations, the virtual personal assistant platform 410 can also receive input in the form of computer instructions, which may have been entered, for example, using a mouse, stylus, or touchscreen.

The audio understanding 414 and image understanding 416 components process audible and visual information to attempt to determine what was meant by the person who provided the audible or visual information. For example, in some implementations, the audio understanding component 416 formulate words identifying by the automatic speech recognition 412 (or entered through tactile inputs) into phrases, sentences, and/or concepts. In various implementations, the audio understanding 414 component can also extract non-verbal information from audio input, such as onomatopoetic utterances and voice biometrics. For example, the audio understanding 414 component can identify a particular sound as "laughter" or maybe even "ironic laughter." Voice biometrics describe the characteristics of a person's voice, such as frequency range, tonal range, volume, accent, inflections, and so on.

The image understanding 416 component can extract and interpret information in images. For example, the image understanding 416 component may be able to identify objects, scenes, faces, gestures, body language, and/or iris biometrics. In some implementations, the image understanding 416 component can further identify something extracted from an image, such as "lamp" or "John." The image understanding 416 component may also be able to associate concepts with information extracted from images, such as "pointing," "waving," or "nodding vigorously."

The interpretation 418 component can use the information extracted from audio and visual information by the audio understanding 414 and image understanding 416 components, and attempt to determine a person's current intent. "Intent" in this context means an objective, goal, task, purpose, request, or meaning intended by the verbal and/or visual input. For example, a person may say, "what is that?" and point at an object. In this example, the interpretation 418 component may, from the verbal input, determine that the person's intent is for the virtual personal assistant system 400 to identify something. Furthermore, the interpretation 418 component may, from image input, determine that the thing to be identified is an object being pointed at. The interpretation 418 component may be aided by ontologies and domain-specific knowledge, as discussed below. The interpretation 418 component may also be aided by preference models. For example, when the person says, "show me the baseball scores," the interpretation 418 component may first identify the speaker, and having identified the speaker, determine that the person's intent is for the system 400 to provide the day's score for the Boston Red Sox. In various implementations the interpretation 418 component may be assisted by a dialog history, such as for example a dynamic ontology, which may assist the interpretation 418 component in identifying references, such as "this," "that," "him," "her," "it," and so on.

In various implementations, the interpretation 418 component can also analyze audio and visual information to determine a person's current input state. Input state may also be referred to as an emotional, mental, or cognitive state. The input state can indicate, for example, whether the person is happy or angry, distracted or excited, or whether the person understand or does not understand an output from the system 400. The interpretation 418 component can determine a person's current input state from, for example, vocal cues, such as atone or manner of speaking, and/or visual cues, such as particular body language, gestures, and/or facial expressions. For example, when a person says, "what is that?" the interpretation 418 component may, from the person's facial expression, determine that the person is distressed. In various implementations, the interpretation 418 component may be assisted by a dialog history, which may assist the interpretation 418 in formulating a conclusion about a person's input state.

The reasoning 420 component can receive the input intent and input state and determine a reasoned task, or course of action. For example, from an input such as "show me the baseball scores," the reasoning 420 may determine that the task is to look up information. In various implementations, the reasoning 420 component can synthesize an input intent and an input state to come to a better conclusion as to the appropriate course of action. For example, a person may have said "please tell me more," indicating the person intends the virtual personal assistant system 400 continue with the current dialog, but the person's expression may have indicated boredom. Thus, in this example, the reasoning 420 component may determine that virtual personal assistant system 400 should change the topic. The reasoning 420 component may be assisted by pre-defined workflows, including domain-specific workflows, as well as models and rules. In various implementations, the reasoning 420 component may also be assisted by a dialog history, such as for example a dynamic ontology. In various implementations, the reasoning 420 component can also initiate or execute the steps required to complete a task.

The output generation 422 component can create responses, which can be output using natural language and/or a visual display. For example, the output generation 422 can formulate a textual response, and indicate whether the textual response should be displayed on a screen or vocalized. As another example, the output generation 422 can assemble. a combined textual and visual response.

The text to speech 424 component can convert text output, such as may be provided by the output generation 422 component, to audio output. Other output, such as text output to be displayed or graphic output to be displayed on a screen, can be provided directly to the user interface of the user interface and virtual personal assistant client application 450.

Each of the understanding 414, 416, interpretation 418, reasoning 420, and output generation 422 components are discussed in further detail below.

The domain-specific application resources 430 can include various components related to a specific domain. Generally, the domain-specific application resources 430 assume that low-level functionality, such as automatic speech recognition and natural language understanding, are provided by the virtual personal assistant platform 410. The domain-specific application resources 430, however, can provide context-specific frameworks and components that can provide a more advanced understanding of a person's input. For example, the virtual personal assistant platform 410 can interpret a person's words and emotional state, but may need to ask follow-up questions in order to fully understand how to accomplish the person's desired task. In contrast, the domain-specific application resources 430 can provide a context, for example using a domain-specific ontology 438 and/or domain-specific workflows, and, using the words and emotional state supplied by the virtual personal assistant platform 410, more quickly determine the person's desired task.

The domain-specific application resources 430, in this example, provide a framework for domain-specific components and functionality that can be included in a domain-specific implementation of a virtual personal assistant system 400. In various implementations, the domain-specific application resources 430 can include an acoustic and language model 432, a statistical language model 434, object and gesture models 436, a domain-specific ontology 438, domain-specific workflows 440, web services 442, and output templates 444, among others. In various implementations, the domain-specific application resources 430 can include fewer or additional components, as required by a particular domain.

The acoustic and language model 432 can be used to customize automatic speech recognition 412 with domain-specific data. For example, the acoustic and language model 432 can be trained or programmed for higher performance in specific acoustic environments. For example, when the domain is a recording studio, the acoustic and language models 432 can be trained or programmed for higher recognition of musical and audio-recording terms, and to filter out musical sounds. As another example, the acoustic and language model 432 can also be adapted for language variations. For example, the acoustic and language model 432 can accommodate regional accents and terminology. In various implementations, the domains-specific application resources 430 can include multiple acoustic and language models.

The statistical language model 434 can include a statistical classifiers trained or programmed with domain-specific natural language samples. For example, the statistical language model 434 can be trained or programmed with natural language phrases that are specific to a domain, collected from typical users of the domain. For example, when the domain is banking and finance, the statistical language model 434 can be trained or programmed with finance terminology, typical abbreviations, and typical financial slang. In various implementations, the statistical language model 434 can make use of default statistical language models and generic user intents. In various implementations, the domain-specific language resources 430 can include multiple statistical language models.

The object and gesture models 436 can also be trained or programmed with domain-specific object and gesture samples. For example, the object and gesture models 436 can be trained or programmed with images of domain-specific objects and video sequences of domain-specific gestures. For example, when the domain is related to baseball, the object and gesture models 436 can be trained or programmed to recognize umpires' calls, and to distinguish one team's uniform from another.

The domain-specific ontology 438 can include a reasonably thorough data model for the concepts and relationships that are specific to the domain. In various implementations, the domain-specific ontology 438 can be implemented using standardized format, such as Web Ontology Language (OWL), or proprietary formats. In various implementations, the domain-specific ontology 438 can be adaptive, and can grow, shrink, and/or change as the virtual personal assistant system 400 obtains new information about the domain. In various implementations, the domain-specific application resources 430 may include multiple ontologies, which may be related or may be unrelated.

The domain-specific workflows 440 can be used to interpret and fulfill a user's intent. For example, the domain-specific workflows 440 can include typical tasks performed within the domain, and rules to associate a person's inputs with these tasks. The domain-specific workflows 440 can further include domain-specific reasoning and output generation rules.

The web services 442 can, in various implementations, integrate services provided be websites or other networked resources. For example, the web-services can implement a client-server protocol to interface with services provided by remote servers. These services can be used to fulfil a user's intent. For example, when the domain is a map application, the web services 442 can be used to access publicly-available maps and address books. In some implementations, the web services 442 can be used for information retrieval and/or to perform transactions on behalf of a device's user. For example, a user can request that the virtual personal assistant system 400 buy a particular product, and the virtual personal assistant system 400 can, using the web services 442, find the product and place the order.

The output templates 444 can be used to customize the virtual personal assistant system's 400 output for a specific domain. For example, in some domains, a certain greeting or salutation may be customary. In various implementations, the output templates 444 can include multi-modal outputs. For example, the output templates 444 can provide a combined visual and audio output.

In various implementations, the user interface and virtual personal assistant client application 450 can provide an infrastructure for providing input to, and receiving out from, the virtual personal assistant system 400. For example, the user interface and virtual personal assistant client application 450 can provide a user interface, through which a person using the system can input sensory information, such as audio, image, and/or tactile input. The user interface can also include output devices, such as speakers and/or graphical displays for providing output to the person. The user interface can also include and active components, such as actuators, electrical signals, and/or relays (among others) for executing actions requested by the person. In some implementations, the user interface can be provided by a device into which the virtual personal assistant system 400 has been integrated. The user interface and virtual personal assistant client application 450 can also include a client application, which can be added to a device so that the virtual personal assistant system 400 can be accessed using the device. In some implementations, the client application 450 can include a reference application, which can be extended or adapted for to each particular implementation. In some implementations, the reference application can be Java-based. For some operating systems, such as iOS or Android, the client application 450 can be implemented using JavaScript Object Notation (JSON) and a WebSocket-based client-server protocol. In various implementations, a user interface, such as a graphical user interface (GUI), can be part of the client application.

In various implementations, the virtual personal assistant system 400 can also include various backend systems 452. The backend systems 452 can provide hardware and/or software resources that support the operations of the virtual personal assistant platform 410 and/or the domain-specific application resources 430. The backend systems 452 can include, for example, computing resources, such as processors, servers, storage disks, databases, and so on. The backend systems 452 can also include, for example, network resources, such as a network interface and/or a communication link to a data center. In some implementations, the backend systems 452 may include domain-specific backend systems, such as domain-specific machinery, knowledge bases, services, and so on.

Figure 5:
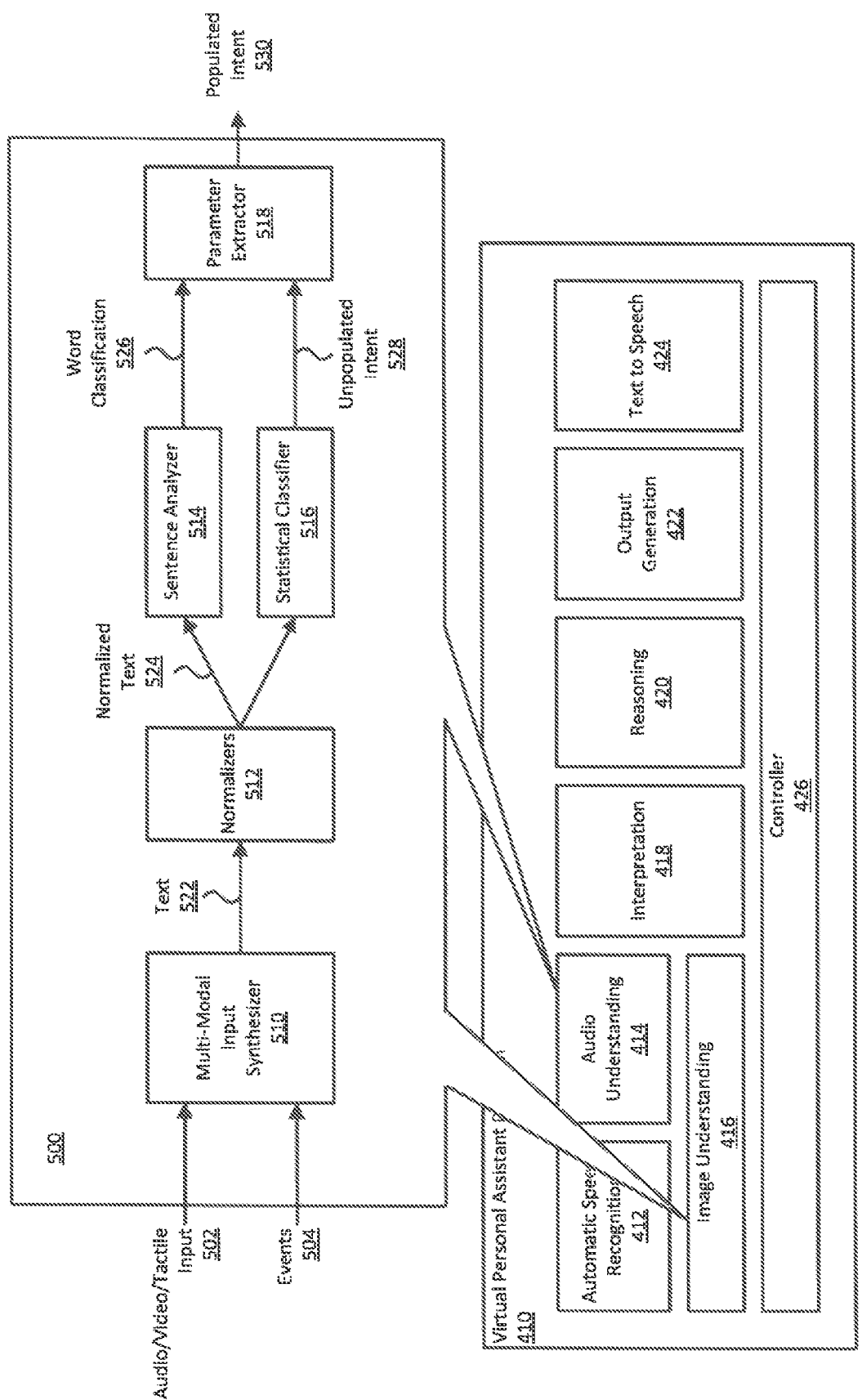
FIG. 5 illustrates in greater detail an example of the audio understanding and image understanding components of the virtual personal assistant platform.

FIG. 5 illustrates in greater detail an example of the audio understanding 414 and image understanding 416 components of the virtual personal assistant platform 410. As noted above, the audio understanding 414 component can extract and interpret information from audio input, while the image understanding 416 component can extract and interpret information in images. FIG. 5 illustrates an example of a general understanding system 500 that can convert user input into a user intent. In various implementations, the understanding system 500 receives audio, video, and/or tactile input 502 and events 504. In some implementations, the audio, video, and/or tactile input 502 may be provided directly from audio or video capture devices, or from a tactile input device. In some implementations, the audio, video, and/or tactile input 502 may first be processed so that the raw data is easier for the system 500 to use. For example, the audio, video, and/or tactile input 502 may be digitized. In various implementations, the audio, video, and/or tactile input 502 may be associated with events 504. Events may be discrete inputs, such as a single utterance from a speaker, a particular sequence of images, or a single tactile command. The events 504 thus can provide structure to the audio, video, and/or tactile input 502.

In various implementations, the understanding system 500 provides the audio, video, and/or tactile input 502 and events 504 to a multi-modal input synthesizer 510. The multi-modal input synthesizer 510 can analyze the audio, video, and/or tactile input 502 to determine the content and/or meaning of the input. In various implementations, the multi-modal input synthesizer 510 can produce text 522 that interprets the audio, video, and/or tactile input 502. For example, the text 522 can include words detected in audio-input, or a description of events 504 seen in image input, or a command received through tactile input. In some implementations, the text 522 may be in a format that is more easily processed by a machine, such as a binary format.

In various implementations, the understanding system 500 provides the text 522 to normalizers 512. The normalizers 512 may refine the text 522 using, for example, parsers, grammars, and models that describe input patterns. The normalizers 512 may thus be able to, for example, break down the text 522 into sentences, sentence fragments, parts of speech, objects, relationships between the objects, and/or relationships between one kind of input and another. In various implementations, the normalizers 512 can also extract physical and/or non-verbal cues from the text 522, which can be used to determine a person's input state. In various implementations, the understanding system 500 may also leverage domain-specific acoustic and language models, statistical language models, and object and gesture models, to obtain a better understanding of the audio, video, and/or tactile input 502. The normalizers 512 can output normalized text 524.

In various implementations, the understanding system 500 provides the normalized text 524 to a sentence analyzer 514 and a statistical classifier 516. The sentence analyzer 514 can analyze the normalized text 524, and produce a word classification 526. The word classification 526 may, for example, describe the ideas expressed in the normalized text 524. The statistical classifier 516 can analyze the normalized text 524, and produce an unpopulated intent 524.

The statistical classifier 516 may classify the normalized text 524 based on the probability that the normalized text 524 expressed one idea or another. The resulting unpopulated intent 528 may describe, at a high level, the intent expressed in the audio, video, and/or tactile input 502.

In various implementations, a parameter extractor 518 can put the word classification 526 and the unpopulated intent 528 together, to determine a populated intent 530. In various implementations, the parameter extractor 518 can associate the word classification 526 with the generalized unpopulated intent 528 so that the intent expressed in the audio, video, and/or tactile input 502 can be made more definite. The result is the populated intent 530.

FIG. 5 provides one, general description of an understanding engine 500. Additional examples of various audio and visual understanding engines are described below.

Figure 6:
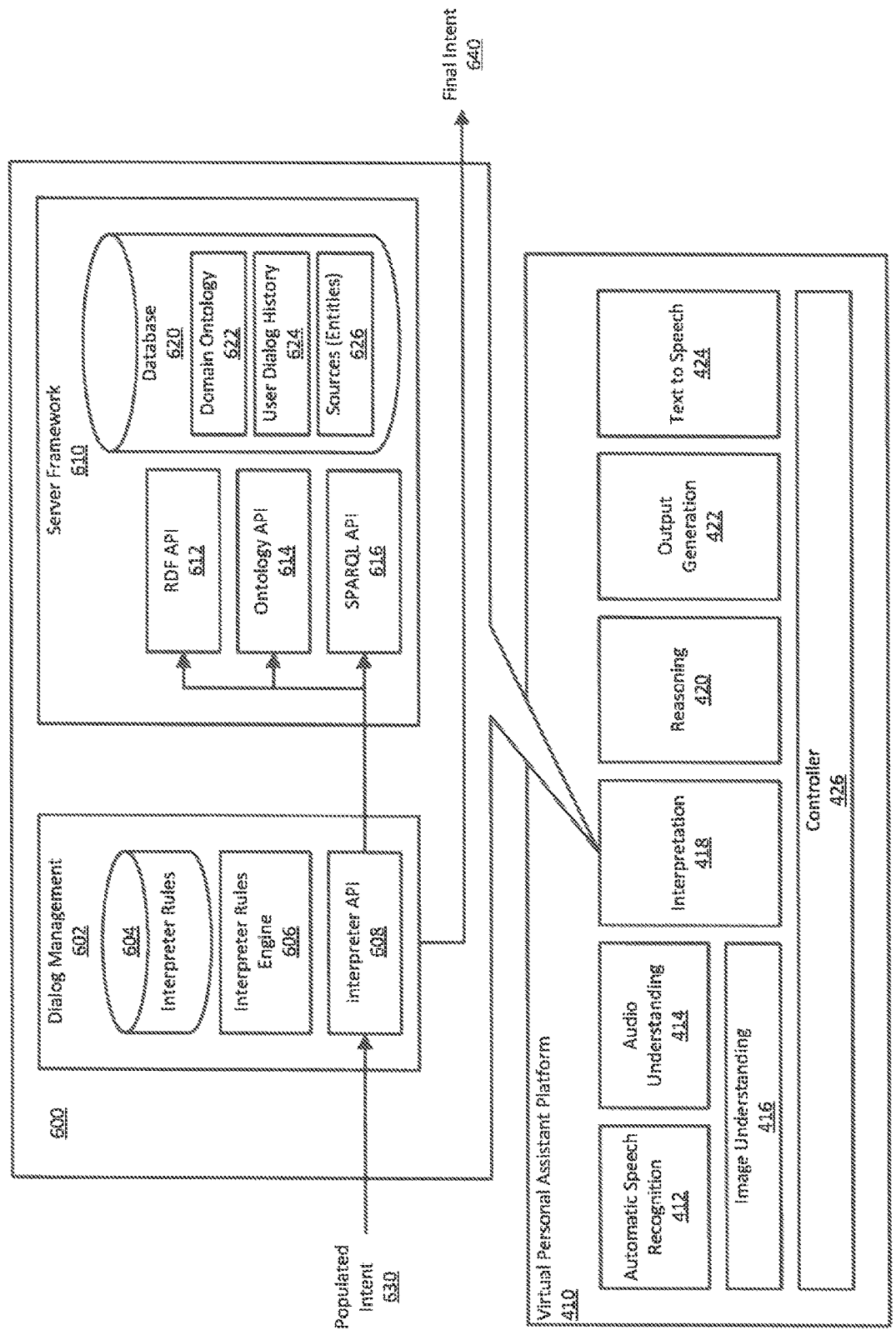
FIG. 6 illustrates in greater detail the interpretation component of the virtual personal assistant platform.

FIG. 6 illustrates in greater detail the interpretation 418 component of the virtual personal assistant platform 410. As noted above, the interpretation 418 component can interpret a current intent and/or current input state in the context of earlier dialog. The interpretation 418 component can be implement using an interpretation system 600, which can leverage dialog history and/or domain contexts to refine an intent or state. In various implementations, the interpretation system 600 can include dialog management 602 and a server framework 610. The dialog management 602 can include interpreter rules 604, an interpreter rules engine 606, and an interpreter application programming interface (API) 608. The interpretation rules 604 may provide structures and models for understanding and conducting dialog. The interpreter rules engine 606 can use and apply the interpreter rules 604. The interpreter API 608 can provide an interface to the interpreter rules engine 606. The interpreter API 608 can receive an unpopulated intent 630 generated, for example, by an understanding system.

The interpreter API 608 may further leverage databases and APIs to the databases, provided by the server framework 610. In this example, the server framework 610 includes a database 620, which can be used to store a domain ontology 622, a user dialog history 624, and various sources 626 or entities. The server framework 610 may further include a Resource Description Framework (RDF) API 612 for creating and manipulating RDF graphs, an ontology API 614 for accessing and/or modifying the domain ontology 622, and a Simple Protocol and RDF Query Language (SPARQL) API 616, for retrieving and/or manipulating the data in the database 610. In various implementations, the server framework 610 can be implemented using an Apache Jena framework. Using the server framework 610 and/or the interpreter rules 604, the interpreter API 608 can produce a final intent 640.

Figure 7:
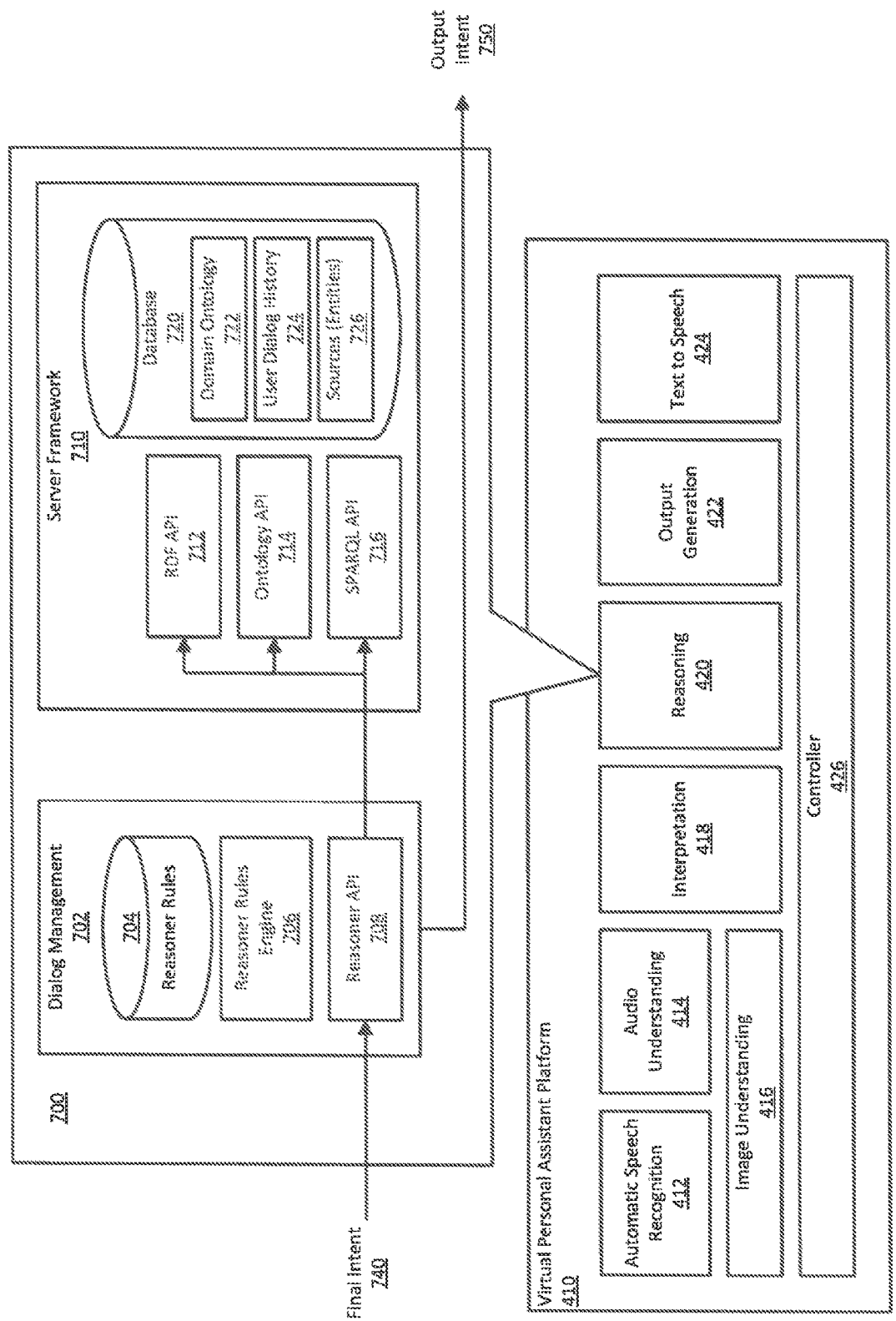
FIG. 7 illustrates in greater detail an example of the reasoning component of the virtual personal assistant platform.

FIG. 7 illustrates in greater detail an example of the reasoning 420 component of the virtual personal assistant platform 410. As noted above, the reasoning 420 component can perform a requested task and/or request more information from a person using the system. FIG. 7 illustrates an example of a reasoning system 700 that can be used to perform a task, where the task is based on the determined intent. The reasoning system 700 can, alternatively or additionally, gather more information, if the system 700 determines that more information is needed. In various implementations, the reasoning system 700 can include dialog management 702 and a server framework 710. The dialog management 702 can include reasoner rules 704, a reasoner rules engine 706, and a reasoner API 708. The reasoner rules 704 can provide structures and models for determining a task to perform. The reasoner rules engine 706 can use and apply the reasoner rules 704. The reasoner API 708 can provide an interface to the reasoner rules engine 706. The reasoner API 708 can receive a final intent 740 generated, for example, by an interpretation system.

The reasoner API 708 may further leverage databases and APIs to the databases, provided by the server framework 710. In this example, the server framework 710 includes a database 720, which can be used to store a domain ontology 722, a user dialog history 724, and various sources 726 or entities. The server framework 710 may further include an RDF API 712 for creating and manipulating RDF graphs, an ontology API 714 for accessing and/or modifying the domain ontology 722, and a SPARQL API 716 for retrieving and/or manipulating data in the database 610. In various implementations, the server framework 710 can be implemented using an Apache Jena framework.

Using the server framework 710, and/or the reasoner rules 704, the reasoner API 708 can produce an output intent 750. In various implementations, the output intent 750 can be information requested by a user of the system and/or an action, which is to be performed by the device that incorporated the virtual personal assistant. Alternatively or additionally, the output intent 750 can be a request to the user to provide more information.

Figure 8:
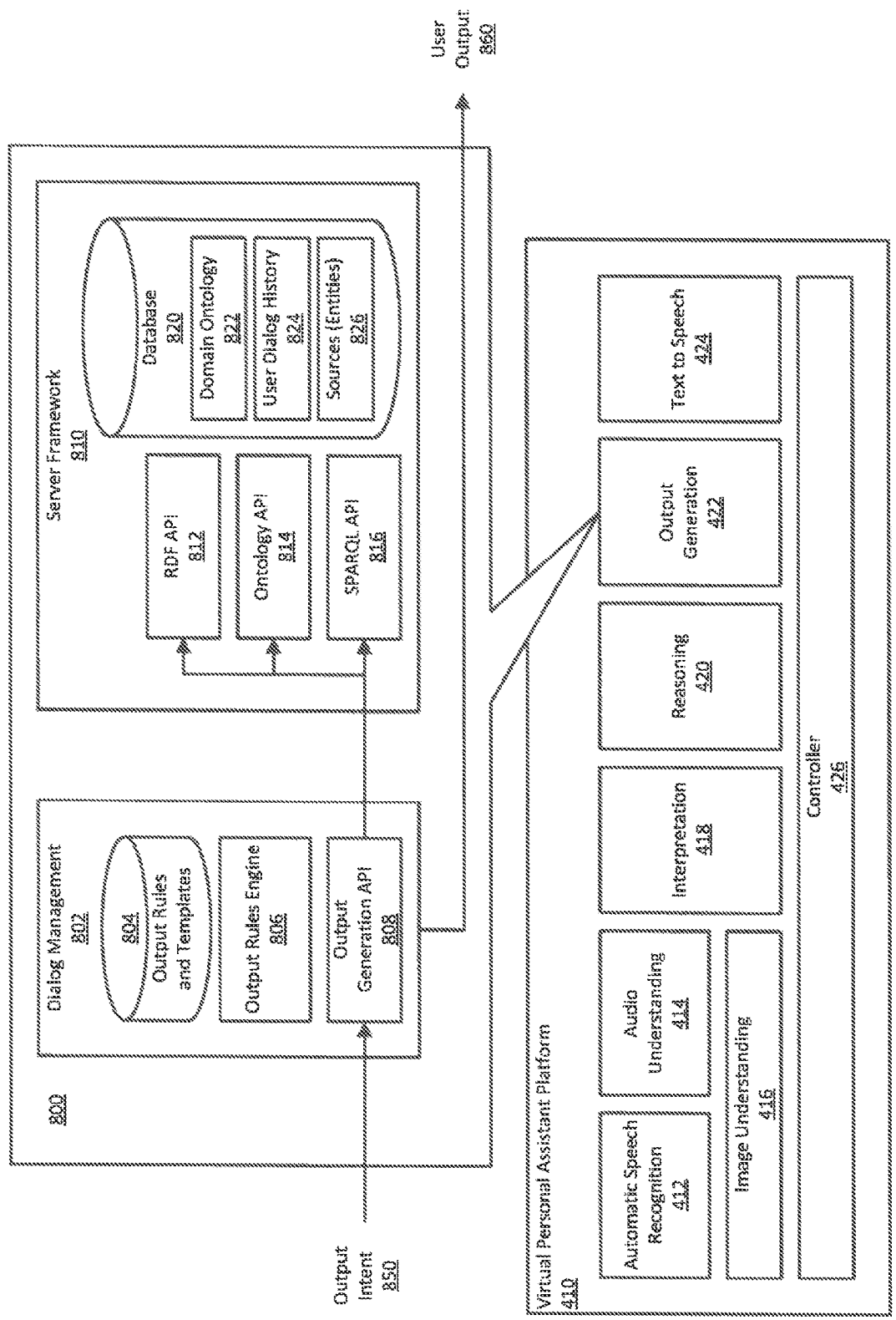
FIG. 8 illustrates in greater detail an example of the output generation component of the virtual personal assistant platform.

FIG. 8 illustrates in greater detail an example of the output generation 422 component of the virtual personal assistant platform 410. As noted above, the output generation 422 component can produce an output that can be perceived by the device's user. In some implementations, the output can be personalized to a specific person or group of people. FIG. 8 illustrates an example of an output generation system 800, which can prepare a textual and/or graphical response to audio, video, and/or tactile input. In various implementations, the output generation system 800 can include dialog management 802 and a server framework 810. The dialog management 802 can include output rules and templates 804, an output rules engine 806, and an output generation API 808. The output rules and templates 804 can provide structures and formats for producing output. The output rules engine 806 can use and apply the output rules and templates 804. The output generation API 808 can provide an interface to the output rules engine 806. The output generation API 808 can receive an output intent 850 generated, for example, by a reasoning system.

The output generation API 808 may further leverage databases and APIs to the databases, provided by the server framework 810. In this example, the server framework 810 includes a database 820, which can be used to store a domain ontology 822, a user dialog history 824, and various sources 826 or entities. The server framework 810 may further include an RDF API 812 for creating and manipulating RDF graphs, an ontology API 814 for accessing and/or modifying the domain ontology 822, and a SPARQL API 816 for retrieving and/or manipulating data in the database 810. In various implementations, the server framework 810 can be implemented using an Apache Jenaframework.

Using the server framework 810, and/or the output rules and templates 804, the output generation API 808 can produce user output 860. The user output 860 can be formatted as text, displayed on a screen, as audio, output through speakers, and/or as graphical images, displayed on a screen.

As noted above, a virtual personal assistant system can be implemented using a layered approach. A layered architecture can enable rapid development of virtual personal assistant systems. In a layered architecture, the components of the virtual personal assistant can be modularized, such that, for a specific implementation, the universal platform can be reused and only the domain-specific components need to be defined. The domain-specific layer can itself provide a framework within which the domain-specific components can be defined. For some domains, the domain-specific components can be concisely defined, such as for example when a virtual personal assistant is used for an airline reservation booking system. For other domains, the domain-specific components can be broadly defined, such as for example when a virtual personal assistant is integrated into a smartphone.

Figure 9:
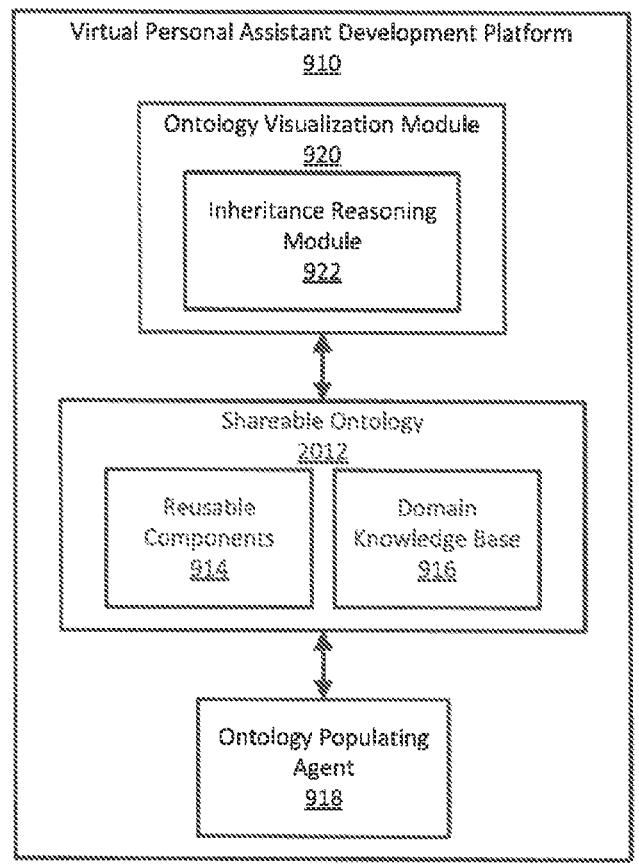
FIG. 9 illustrates an example of a virtual personal assistant development platform, which can be used to rapidly create, support, and/or maintain virtual personal assistant systems.

FIG. 9 illustrates an example of a virtual personal assistant development platform 910, which can be used to rapidly create, support, and/or maintain virtual personal assistant systems. In various implementations, a virtual personal assistant development platform 910 can include a shareable ontology 912, a number of reusable components 914, a domain knowledge base 916, an ontology populating agent 918, an ontology visualization module 120, and an inheritance reasoning module 922. The virtual personal assistant development platform 910 and its various components can be implemented as computer software, firmware, and/or hardware. Using a virtual personal assistant development platform 910, a developer who is developing a virtual personal assistant system for a particular domain can more quickly define the domain-specific components and integrate the virtual personal assistant system into a device or system. Rapid development platforms are also discussed in U.S. Pat. No. 9,081,411, titled "Rapid Development of Virtual Personal Assistant Applications," the entirety of which is incorporated herein by reference.

As used herein, the term "domain" may refer to a category of information and/or activities in relation to which a virtual personal assistant system may engage in a conversational dialog with a person. In some cases, "domain" may refer to the scope of a particular virtual personal assistant system or a portion thereof. As such, a domain may correspond to one or more ontological concepts and/or properties that are defined in the shareable ontology 912. For example, a virtual personal assistant system may be directed specifically to e-commerce shopping for "oil filters" (a single domain or concept) while another virtual personal assistant system may be more broadly directed to "automotive supplies" (a broader category of items that may include oil filters, spark plugs, and other supplies). In various implementations, the shareable ontology 912 may be created, updated, and maintained using a knowledge representation language, such as OWL and/or an ontology-authoring mechanism such as RDF.

As noted above, an ontology is a computerized knowledge representation framework. The example shareable ontology 912 of FIG. 9 is a "general-purpose" or "shared" ontology that can be used to develop virtual personal assistant systems for one domain or for many different domains. That is, the shareable ontology 912 can define a computerized structure for representing knowledge that relates to one domain or multiple domains. Such a structure includes ontological concepts (or "objects"), properties (or "attributes") that are associated with the concepts, and data relationships between or among the ontological concepts and properties. For example, in an ontology for a general-purpose "retail" domain, "product" may be an ontological concept, "color," "description," and "size" might be properties of the "product" concept, "has-a" might be a type of data relationship that exists between each of those properties and the "product" concept, and "is-a" might be a type of data relationship that exists between the concept "product" and a sub-concept "shirts." That is, in this example, a shirt is type of product that has a color, description, and size. In various implementations, the shareable ontology 912 can thus define certain ontological concepts and properties, and relationships between the concepts and properties, so as to model a way in which humans are likely to talk about them with the virtual personal assistant system. Alternatively or additionally, the shareable ontology 912 may define certain ontological concepts, properties, and relationships in a way that that is likely to coincide with the way that information is encountered by the ontology populating agent 918, which described below.

In some implementations, the shareable ontology 912 is hierarchical, in that the shareable ontology 912 leverages the "natural" inheritance structure of knowledge about a particular part of the real world. A hierarchical ontology can enable data and/or virtual personal assistant components to be shared and re-used through inheritance.

For example, the shareable ontology 912 may define an inheritance relationship between an ontological concept of "jeans" and a "pants" concept because many, if not all, of the properties of pants are also applicable to jeans. As such, during the development of a virtual personal assistant system designed for e-commerce shopping for pants, the platform 910 may use the shareable ontology 912 to help the developer create a natural language response that relates to pants. Through the shareable ontology 912, the virtual personal assistant platform 910 may know that pants have an "inseam" and that the inseam is a measurement that is used to determine a person's pants size. Accordingly, the virtual personal assistant platform 910 may suggest or otherwise help the virtual personal assistant developer create a natural language response such as "please tell me your inseam measurement," and incorporate that natural language response into the virtual personal assistant system for pants shopping. Furthermore, since the virtual personal assistant platform 910 may know, through the shareable ontology 912, that jeans are a type of pants, the virtual personal assistant platform 910 may suggest or otherwise help the application developer link the already-created natural language response, "please tell me your inseam measurement" with the concept of "jeans." The virtual personal assistant platform 910 may "remember" the link between the "inseam" natural language response and the concept of jeans (through the shareable ontology 912), so that later, if a virtual personal assistant system is developed specifically for e-commerce shopping for jeans, the virtual personal assistant platform 910 can suggest or otherwise help the virtual personal assistant developer incorporate the "inseam" natural language response into the jeans-specific e-commerce virtual personal assistant system.

In some implementations, the shareable ontology 912 may be viewed as the "union" of reusable components 914 and a domain knowledge base 916. In some implementations, the reusable components 914 and/or portions of the domain knowledge base 916 may be stored in the same container or containers as the shareable ontology 912 or portions thereof (where "container" refers generally to a type of computerized data storage mechanism). For example, a reusable component that is natural language grammar related to pants (e.g., "I like the natural-fit capris") may be linked with or included in the container that corresponds to the "pants" concept of the domain knowledge base 916 through the shareable ontology 912. In some implementations, the reusable components 914 can be linked with the domain knowledge base 916 through the shareable ontology 912 using, for example, a pointer, key, reference, or other programming mechanisms, without concern as to where the reusable components 914 may be stored.

In various implementations, the reusable components 914 and the domain knowledge base 916 can, once developed, be used in a particular virtual personal assistant system. The reusable components can include universal components that can be included in the virtual personal assistant platform layer of a virtual personal assistant system. The universal components are generally domain-independent, and provide the functionality that may be common to all virtual personal assistant systems. These universal components are thus "reusable" in the sense that these components can be reused across various virtual personal assistant systems. The reusable components 914 can, alternatively or additionally, include components that can be included in the domain-specific application resources layer, where these components can be configured for a particular domain. The domain-specific components can include unpopulated structures, models, and/or databases, which may be populated according to the shareable ontology 914 and/or by the ontology populating agent 918. The domain-specific components are thus "reusable" in that these components can provide an infrastructure that can be reused from one virtual assistant application to another. The domain knowledge base 916 can also be included in the domain-specific application resources layer, or can be linked to a virtual personal assistant system, for example, over a network.

The reusable components 914 can include software components, such as data, logic, alphanumeric text elements, sentences or phrases, variables, parameters, arguments, function calls, routines or procedures, and/or other components, which can be used by the virtual personal assistant system to conduct a dialog with a human user and/or initiate or execute a task or activity for the user based on the virtual personal assistant's understanding of the dialog. At a high level, the reusable components 914 may be categorized as follows: those that assist the virtual personal assistant system in understanding the user's intended meaning, goal, or objective of her dialog input, those that help the virtual personal assistant system reason about the user's intended meaning, goal, or objective and determine an appropriate system response, and those that generate for the virtual personal assistant system output formulated in a suitable fashion given the user's intent as previously determined by the virtual personal assistant system.

In addition to defining data relationships between different ontological concepts and properties, the shareable ontology 912 can define relationships or "links" between the ontological concepts and properties and the reusable components 914. That is, the reusable components 914 can be programmatically linked with one or more of the ontological concepts and/or properties in the shareable ontology 912. In this way, the shareable ontology 912 can be used to automate or at least partially automate the selection of reusable components 914 for use in a virtual personal assistant system for a particular domain of interest. The shareable ontology 912 can further be used to instantiate those selected components for the domain of interest. As used herein, terms such as "relation," "data relationship," "linkage," and "link" may refer to a logical association or semantic relationship that may be implemented in software using specialized computer programing statements or constructs. For example, in artificial intelligence-based systems, such statements may be referred to as sentences or axioms (e.g., "pants is-a apparel", "tool is-a retail product"). Other forms of linking mechanisms, such as pointers, keys, references, and/or others may also be used to establish logical associations or semantic relationships between elements of the shareable ontology 912 or between the shareable ontology 912 and the reusable components 914.

The domain knowledge base 916 or "domain ontology" can be included in or linked with the overall shareable ontology 912 structure or portions thereof so as to guide the linkages/relationships between or among the reusable components 914. That is, data objects and attributes that are defined in the domain knowledge base 916 can correspond to concepts, properties, and data relationships of the shareable ontology 912, so that reusable components 914 that are linked with the shareable ontology 912 can be adapted to the domain (e.g., by replacing parameters with actual domain-specific data values). In various implementations, a domain knowledge base 916 can include a data structure or structures (e.g. database(s), table(s), data files, etc.) in which data records and data values corresponding to the various elements of the shareable ontology 912 may be stored. Once populated (e.g., by the ontology populating agent 918), the domain knowledge base 916 may be referred to as a "populated" ontology or a domain-specific "leaf," "node," or "instance" of the shareable ontology.

As an example, in developing a virtual personal assistant system for an e-commerce vendor that sells jeans, the shareable ontology 912 may be defined to include "jeans" as an ontological concept having properties of style, color, size, and care instructions. A corresponding domain knowledge base 916 may store individual data records that each include data values for each style of jeans sold by the e-commerce vendor, the colors and sizes in which each style is available, and the care instructions applicable to each style of jeans. A populated version of the domain knowledge base 916 may contain data values such as "boot cut" and "slim," which map to a "style" property of a "jeans" concept in the ontology. In this example, "style" may be considered a "common characteristic" that links the data values in the domain knowledge base 916 with the ontology. The domain knowledge base 916 can be instantiated or populated with data values in a number of different ways, including manual data entry, interfacing with the vendor's back-end systems (e.g., via an application programing interface or API), or with the help of the ontology populating agent 918. Once populated with data values, the domain knowledge base 916 can be used to instantiate new or customized versions of the reusable components 914. This can be done by virtue of the linkages between the reusable components 914 and the shareable ontology 912, and the linkages between the elements of the domain knowledge base 916 and the shareable ontology 912.

In various implementations, the populating agent 918 can populate the shareable ontology 912 in an automated fashion. The populating agent 918 can be implemented as a computerized sub-system or module (e.g., software, firmware, hardware, or a combination thereof) that mines, "scrapes" or otherwise obtains data from Internet web pages (or other electronic data sources to which the populating agent 918 has access), maps the scraped data to the structure of the shareable ontology 912, and populates the domain knowledge base 916. For example, the ontology populating agent 918 can be used to develop virtual personal assistant systems that support transactional web sites, including web pages or web sites that support electronic transactions with consumers that relate to a domain of interest or to items in a domain (e.g., e-commerce transactions, financial transactions, healthcare-related transactions, and/or others). In this example, the ontology populating agent 918 can be used to harvest, from the relevant web page or pages, the applicable domain-specific information that needs to be applied to or incorporated into the reusable components 914 for a particular application.

In some cases, other types of publicly available electronic data sources may be mined by the ontology populating agent 918 to bolster the depth and/or breadth of knowledge that can be "fed" to a particular virtual personal assistant system. For example, competitor web pages or web sites, publicly available product review pages, publicly available dictionaries and knowledge bases (e.g., DICTIONARY.COM, WIKIPEDIA, and/or others), public areas of social media sites (e.g., FACEBOOK, GOOGLE+, etc.), publicly available blogs, and/or other data sources may be mined to provide additional information for use by the virtual personal assistant system. Such information may include alternative names, nicknames, synonyms, abbreviations, and the like, as well as current context information (e.g., in the e-commerce domain, information about competitor products, or items or styles of products that are currently popular or appear to be a frequent topic of conversation).

In various implementations, the ontology visualization module 920 can be implemented as a computerized sub-system or module (e.g., software, firmware, hardware, or a combination thereof) that presents an interactive representation of the shareable ontology 912 and/or the reusable components 914 in a human-accessible format. The ontology visualization module 920 can allow a virtual personal assistant developer or a knowledge base engineer to navigate and explore the shareable ontology 912, visually. In some implementations, the visualization module 920 presents a graphical representation of the ontology. Such a visualization may be simple enough for an end user or another person without sophisticated computer programming skills to understand and use. The ontology visualization module 920 can further permit the developer or other user to assign concepts and properties to the various elements and levels of the shareable ontology 912 and thereby define relationships between the concepts and properties. The ontology visualization module 920 may do so by, for example, allowing the user to "drag and drop" graphical representations of the ontological concepts and properties from one element or level of the shareable ontology 912 to another using, e.g., a computer mouse, stylus, or one's finger.

Figure 10:
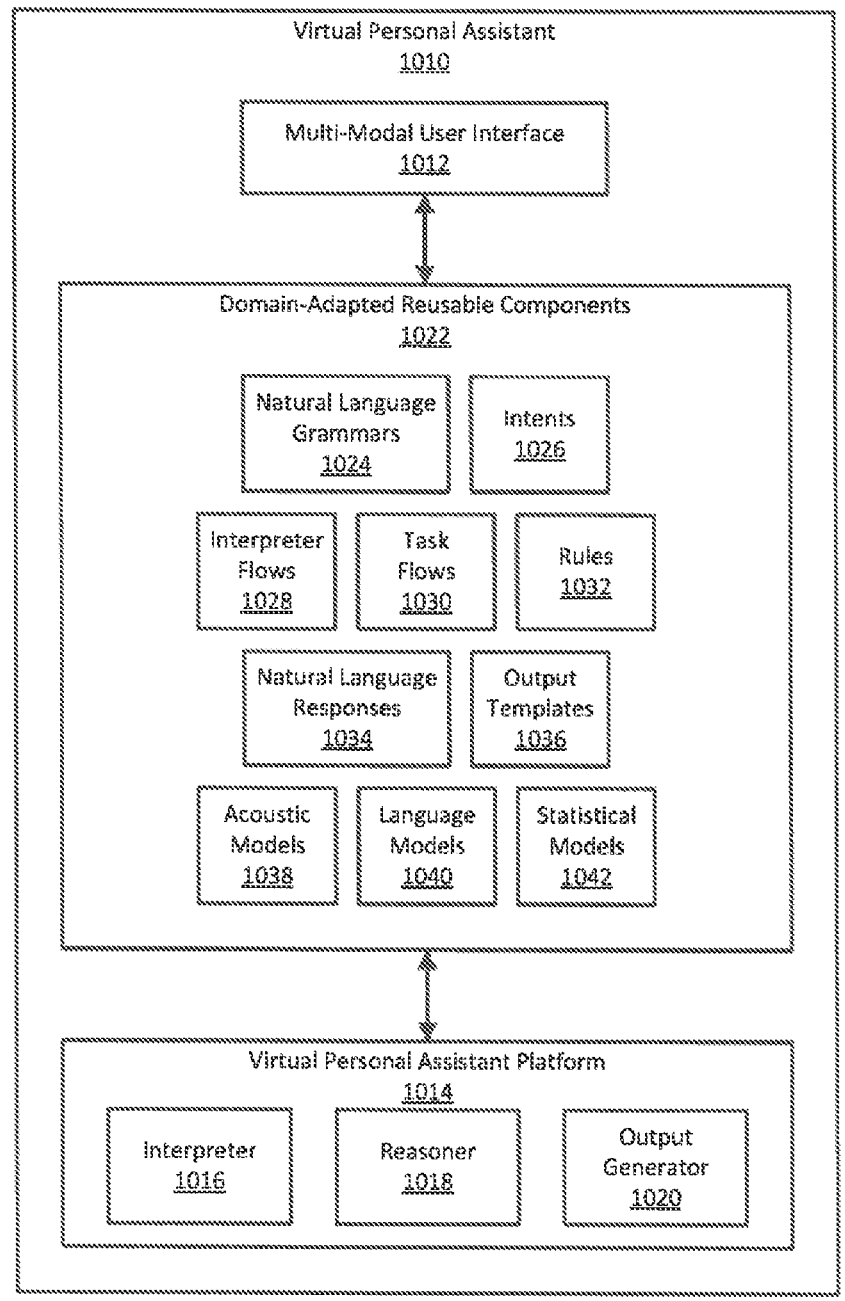
FIG. 10 illustrates an example of a virtual personal assistant system, constructed using the example virtual personal assistant development platform of FIG. 9.

In various implementations, the ontology visualization module 920 can also allow the developer or other user to associate the reusable components 914 with the shareable ontology 912 in a similar manner. For example, as indicated by FIGS. 6-8, the links between VPA components 914 and their corresponding ontological concepts can be presented graphically on a display screen, and the ontology visualization module 920 may allow such links to be added or changed by "pointing and clicking," "dragging and dropping," or other mode of user input. FIG. 10, described below, illustrates a simplified example of a display screen that may be presented to a developer. The example display screen can enable the selection of reusable components 914 for inclusion in a virtual personal assistant system.

In some implementations, the ontology visualization module 920 of FIG. 9 can include an inheritance reasoning module 922. In various implementations, the inheritance reasoning module 922 can leverage the organizational structure of the shareable ontology 912 to programmatically explore and follow data relationships and linkages as needed for the development of a virtual personal assistant system. To do this, the inheritance reasoning module 922 can analyze the existing programmatic statements (e.g., sentences and/or axioms) that define the data relationships between the concepts and properties in the shareable ontology 912. Such statements may indicate, for example, subsumption relationships, in which concepts that are defined as sub-classes or sub-categories of other concepts in the shareable ontology 912 inherit all of the properties and relations of their respective parent concepts (e.g., a "child" concept is "subsumed" by its parent).

In many cases, (e.g., where straightforward hierarchical relationships are involved) no reasoning algorithms are needed by the inheritance reasoning module 922, or the inheritance reasoning module 922 may be omitted. Where the shareable ontology 912 includes other kinds of relationships (e.g., temporal), however, the inheritance reasoning module 922 may apply one or more automated reasoning algorithms to reason over a populated domain knowledge base 916 to infer new data relationships and/or linkages based on the existing data relationships and/or linkages that are contained in the shareable ontology 912. That is, the inheritance reasoning module 922 may observe that a particular combination of data relationships and/or linkages exists in the shareable ontology 912 and based on that observation, add the reasoned-about relationships to the shareable ontology 912. Following that, the ontology visualization module 920 may make a suggestion or recommendation to the virtual personal assistant system developer as to a data relationship or linkage that may be appropriate for a new domain or a new piece of data.

As an example, when the virtual personal assistant developer is designing a new virtual personal assistant system for jeans shopping, the developer can use a "general-purpose" e-commerce ontology that defines "apparel" as a sub-class or sub-category of a "purchasable item" concept. The developer can inform the virtual personal assistant platform 910 that "jeans" are a type of apparel, or the virtual personal assistant platform 910 can learn that relationship in an automated fashion, as described below. The inheritance reasoning module 922 may further suggest to the developer that all or a portion of the reusable components 914 that are linked with the "apparel" concept in the ontology be included in the new virtual personal assistant system for jeans. In some cases, the module 922 or perhaps some other mechanism of the ontology visualization module 920, or the virtual personal assistant platform 910 more generally, may proceed to establish the new linkage in an automated fashion without requiring input from the developer. In those cases, the ontology visualization module 920 may present a depiction of the new relationship on a display screen, for example, to let the developer know that the new relationship has been created and/or to allow the developer an opportunity to undo or modify the relationship.

FIG. 10 illustrates an example of a virtual personal assistant system 1010, constructed using the example virtual personal assistant development platform 910 of FIG. 9. The example virtual personal assistant system 1010 of FIG. 10 includes a multi-modal user interface 1012, a virtual personal assistant platform 1014, and a number of domain-adapted reusable components 1022.

In various implementations, the multi-modal user interface 1012 can capture conversational natural language input provided by the a person communicating with the virtual personal assistant system 1010. In various implementations, multi-modal user interface 1012 can also capture visual information from, or provided by, the person. In various implementations, the multi-modal user interface 1012 can also capture tactile input, provided through tactile input devices.

In some implementations, the multi-modal user interface 1012 can capture the person's spoken natural language dialog input with a microphone or other audio input device. Alternatively or additionally, the multi-modal user interface 1012 can capture text-based natural language dialog input by, for example, a touch pad, key pad, touchscreen or other tactile input device. Other, non-verbal inputs also may be captured by, for example, a touch pad, key pad, touch screen, or other input device, through the multi-modal user interface 1012. Such inputs may include, for example, mouse clicks, taps, swipes, pinches, and/or other tactile input.

In some implementations, the multi-modal user interface 1012 may capture non-verbal, visual information. For example, the multi-modal user interface 1012 may capture facial expressions and/or iris images. In some cases, the multi-modal user interface 1012 can capture "off-device" body movements or other gesture-type inputs (such as hand waves, head nods, eye movements, etc.) using, for example, a camera, motion sensor and/or kinetic sensor.

While in many cases the conversational dialog that occurs between a person and the virtual personal assistant system 1010 is initiated by the person, this need not be the case. In some implementations, the virtual personal assistant system 1010 may operate in a proactive manner, and initiate a dialog with the person in response to the person's non-verbal inputs, or in response to sensed information obtained or derived from, for example, temperature sensors, gyroscopic sensors, motion sensors, location-based systems (e.g., global positioning systems or GPS, cellular systems, and/or others) and others. Thus, a person's inputs can include verbal as well as non-verbal inputs, both initiated by the person and provided by the person in response to system-generated output. For example, the dialog inputs may include questions, requests, statements made by the person to begin an information-seeking dialog, commands issued by the person to cause the virtual personal assistant system 1010 to initiate or undertake some action, responses to system-executed actions, and/or responses to questions presented by the system 1010. A portion of the multi-modal user interface 1012 may convert the human dialog inputs into machine-readable format, or this may be done by a component of the virtual personal assistant platform 1014. As noted above, the dialog inputs captured and processed by the multi-modal user interface 1012 may be in the form of audio, images, text, some other natural language inputs, or a combination of inputs.

The verbal and non-verbal inputs captured by the multi-modal user interface 1012 can be processed by the virtual personal assistant platform 1014. The example virtual personal assistant platform 1014 includes a number of components, such as an interpreter 1016, a reasoner 1018, and an output generator 1020. In various implementations, the virtual personal assistant platform 1014 may include additional components or modules, such as an information retrieval engine. In some implementations, some components, described below as being included in the virtual personal assistant platform 1014, may be located external to the virtual personal assistant 1010, and communicate with the virtual personal assistant 1010 by a communication link, such as for example a network connection.

In various implementations, the interpreter 1016 can attempt to determine a meaning of the person's multi-modal input. The interpreter's 1016 can produce an output what the interpreter 1016 determined, with a statistically high degree of confidence, most closely matched the person's actual intent or the goal of the person's communication. In the case of spoken dialog input, the interpreter 1016 (or an external automated speech recognition (ASR) system) can converts the person's natural language audio into a text or some other machine-readable format, which can be used for further analysis performed by the interpreter 1016. The interpreter 1016 may apply syntactic, grammatical, and/or semantic rules to the natural dialog input, in order to parse and/or annotate the input to better understand the person's intended meaning and/or to distill the natural language input to its significant words (e.g., by removing grammatical articles or other superfluous language). In the case of non-verbal audio and/or image input, the interpreter 1016 may apply semantic rules and/or models to the non-verbal input determine a meaning that may have been intended by the person. Alternatively or additionally, in some implementations, the interpreter 1016 may apply behavioral rules and/or models to attempt to identify the person's emotional state.

As used herein, terms such as "goal," "objective," or "intent" describe the virtual personal assistant system's 1010 attempted understanding of a person's purpose, goal or objective, in addition to the words, gestures, facial expressions, and/or other verbal or non-verbal the person used to express her intent. To do this, the virtual personal assistant system 1010 may consider the dialog context and/or other aspects of the person's current context. For example, the person might say something like "I'll take it" or "get me that one," which really means that the person's goal is to buy a certain product, where the product may have been identified by the person in a prior round of dialog or identified by the system 1010 through other multi-modal inputs (such as a tap selecting an on-screen graphic). Determining the person's intended goal or objective of a dialog often involves the application of artificial-intelligence based methods.

Some implementations of the user intent interpreter 1016 may include an automatic speech recognition (ASR) system and a natural language understanding (NLU) system. In general, an automatic speech recognition system can identify spoken words and/or phrases in verbal natural language dialog inputs and recognizes and converts them into text form (e.g., words, word strings, phrases, "segments," "chunks," "sentences," or other forms of verbal expression). In general, a natural language understanding system receives the automatic speech recognition system's textual hypothesis of natural language input. In some cases, the natural language input may be provided in text form, (e.g., by being typed using a keyboard), in which case automatic speech recognition processing can be bypassed.

In various implementations, a natural language understating system can parse, and semantically analyze, and interpret the verbal content of natural language dialog inputs that have been processed by the automatic speech recognition system. In other words, the natural language understanding system can analyze the words and/or phrases produced by the automatic speech recognition system and determine the meaning most likely intended given, for example, other words or phrases presented during the dialog and/or one or more of the domain-adapted reusable components 1022. For instance the natural language understanding system may apply a rule-based parser and/or a statistical parser to determine, based on the verbal context, the likely intended meaning of words or phrases that have multiple possible definitions (e.g., the word "pop" could mean that something has broken, may refer to a carbonated beverage, or may be the nickname of a person, depending on the context, including the surrounding words and/or phrases of the current dialog input, previous rounds of dialog, and/or other multi-modal inputs. A hybrid parser may arbitrate between the outputs of the rule-based parser and the statistical parser to determine which of the outputs has the better confidence value.

The interpreter 1016 can combine the likely intended meaning, goal, and/or objective derived from the dialog input as analyzed by the natural language component with any multi-modal inputs. The interpreter 1016 can communicate this information to the reasoner 1018 in the form of a "user intent." In some implementations, the user intent is represented as a noun-verb or action-object combination, such as "buy product" or "search product category," which specifies an activity that the person desires to have performed by the virtual personal assistant system 101 and an object (e.g., person, place or thing) that is the subject of that activity.

In various implementations, the interpreter 1016 can determine an input state from multi-modal inputs. For example, the interpreter 1016 may be able to identify an emotional state from verbal cues, such as the manner in which words were spoken and/or verbalizations that were not words (e.g., laughter, grunts, etc.). As another example, the interpreter 1016 may be able to identify an emotional state from visual cues, such as a facial expression, body language, and/or a gesture. In various implementations, the interpreter can synthesize one or more verbal and/or visual cues to formulate an input state for the person.

Generally speaking, the reasoner 1018 can synthesize the user intent, input state, and/or any of the other available inputs in view of applicable dialog models, business logic, rules, etc. (which may be supplied by one or more of the domain-adapted reusable components 1022). From this analysis, the reasoner 1018 can determine a likely appropriate task to execute on the person's behalf and/or a likely appropriate system response to the person's intended goal or objective as derived from the meaning of the inputs and reflected in the user intent (where "likely appropriate" may refer to a computed statistical measure of confidence determined and/or evaluated by the reasoner 1018). In some cases, the likely appropriate system task or response may be to ask the person for additional information, while in other cases, the likely appropriate system task or response may involve building a search query based on the inputs and execute an information retrieval process, or to execute some other piece of computer program logic (e.g., to launch an external software application or follow a link to a web site or control a machine). In still other cases, an appropriate system task or response may be to present information to the person in order to elicit from the user additional inputs that may help the virtual personal assistant platform 1014 clarify the user intent.

Some implementations, the reasoner 1018 may include a dialog manager module, which keeps track of the current state and flow of each conversation or dialog that occurs between a person and the virtual personal assistant system 1010. The dialog manager module may apply dialog-managing rules, templates, or task flows, for example, to the dialog input that are appropriate for the person's current context. For example, the dialog manager may apply rules for determining when a conversation has started or ended, or for determining whether a current input is related to other inputs, based on one or more of the current or recently-obtained multi-modal inputs.

Once the reasoner 1018 has determined an appropriate course of action by which to respond to the person's inputs, the reasoner 1018 can communicate an "output intent" to the output generator 1020. The output intent specifies the type of output that the reasoner 1018 determined, with a high degree of statistical confidence, is the most likely appropriate response to the person's intent, given the given the results of any workflows that have been executed. For example, if the user intent is "buy product" but the reasoner 1018 determines by executing a "check stock" task flow that the product the user wants to buy is not available for purchase, the output intent may be "offer alternative product."

In some cases, the reasoner 1018 may specify that the output is to be presented in a (system-generated) natural-language format. In these cases, a natural language generator may be used to generate a natural language version of the output intent. In some cases, the reasoner 1018 may further determine that spoken natural language is an appropriate form in which to present the output. In these cases, a speech synthesizer or text-to-speech (TTS) module may be used to convert natural-language text generated by the natural-language generator (or even the un-processed output) to speech (e.g., machine-produced speech using a human or humanlike voice). Alternatively or additionally, the system output may include visually-presented material (e.g., text, graphics, or video), which may be shown on a display screen, and/or other forms of output.

The interpreter 1016, reasoner 1018, and/or output generator 1020 may access and use one or more of the domain-adapted reusable components 1022. The domain-adapted reusable components 1022 are versions of the reusable components, discussed above with respect to FIG. 9, that have been adapted for use in connection with a particular domain. The domain-adapted reusable components 1022 illustrated in FIG. 10 thus represent examples of the components that may be found among the reusable components.

The domain-adapted reusable components 1022 can be created by applying data from a populated instance of a domain knowledge base to the reusable components. Specifically, a virtual personal assistant platform can use the linkages between the reusable components and the shareable ontology, and the linkages between the domain knowledge base and the shareable ontology, to connect information from the domain knowledge base with the appropriate reusable component. For example, data values in the populated instance of the domain knowledge base can be mapped to their corresponding parameters in the reusable components to produce the domain-adapted reusable components 1022.

As an example, when a virtual personal assistant developer is developing a new virtual personal assistant system for a specific domain of e-commerce, such as jeans shopping, and the developer can select a reusable component that is an intent 226 called "buy product." An inheritance reasoning module may infer that the other reusable components that are associated with the "product" concept in a shareable ontology are also likely to be applicable to jeans, and also those associated with any "parent" concepts of the product concept (e.g., "retailer," etc.) that are defined in the shareable ontology. As such, the inheritance reasoning module may suggest to the developer all of the other re-sable components that are linked with the "buy product" intent (through the "product" concept of the ontology) for inclusion in the new virtual personal assistant system 1010. In this way, the inheritance reasoning module can help automate the selection and instantiation of reusable components for particular domains, so that there is no need for the virtual personal assistant developer to create new components, or create new versions of the components, by hand.

The domain-adapted reusable components 1022 include a number of different components that provide inputs, structures, rules, and/or models to the components of the virtual personal assistant platform 1014. In the illustrated example, the domain-adapted reusable components 1022 include natural language grammars 1024, intents 1026, interpreter flows 1028, task flows 1030, rules 1032, natural language responses 1034, output templates 1036, acoustic models 1038, language models 104, and statistical models 1042.

The natural language grammars 1024 include, for example, text phrases and combinations of text phrases and variables or parameters, which represent various alternative forms of natural language dialog input that the virtual personal assistant system 1010 may expect to receive from the person. As such, the natural language grammars 1024 can help the virtual personal assistant platform 1014, or, more specifically, the interpreter 1016, map the person's actual natural language dialog input to a user intent. In some cases, the interpreter 1016 may include a rule-based parser that can use the natural language grammars 1024 to determine a user intent. A statistical parser is another mechanism by which the interpreter 1016 may determine a user intent. Whereas the rule-based parser uses the natural language grammars 1024, the statistical parser can use a statistical model 1042 that models different user statements to determine the statistically most likely appropriate user intent.

The intents 1026 are, as described above, computer-intelligible forms of the intended goal of a person's input as interpreted by the interpreter 1016. As such, the intents 1026 may be derived with assistance from other of the domain-adapted reusable components 1022 (e.g., the grammars 1024 and statistical models 1042). The intents 1026 help the virtual personal assistant platform 1014, or, more specifically, the reasoner 1018, determine an appropriate course of action in response to the person's input. As noted above, the user intent may be represented as a noun-verb/action combination such as "buy product."

The interpreter flows 1028 can be devices, structures, rules, lists, and/or models that help the virtual personal assistant platform 1014, or, more specifically, the interpreter 1016, determine the intended meaning or goal of the person's inputs. For example, the interpreter flows 1028 may include combinations or sequences of dialog inputs that, when they occur in temporal proximity, may indicate a particular user intent.

The task flows 1030 (which may be referred to as "workflows") can define actions that the virtual personal assistant 1010 may perform in response to a person's inputs, or in response to the completion of another task flow. As such, the task flows may include combinations or sequences of actions and parameters or arguments.

The rules 1032 may include a number of different rules (e.g., if-then logic) that may be applied by the virtual personal assistant platform 1014. For example, the rules 1032 may include a rule for the output generator 1020, where the rule stipulates that after a certain hour of the day, the output generator 1020 should output an audio response at a lower volume, or should only output text, rather than audio.

The natural language responses 1034 are similar to the natural language grammars 1024 in that they include, for example, text phrases and combinations of text phrases and variables or parameters, which represent various alternative forms of possible system-generated natural language dialog output that the virtual personal assistant 1010 may present to a person. As such, the natural language responses 1034 can help the virtual personal assistant platform 1014 or, more specifically, the output generator 1020, map the output intent formulated by the reasoner 1018 to an appropriate dialog output.

The acoustic models 1038, language models 1040, and statistical models 1042 are additional reusable components that can be defined at a general-purpose level and then adapted to a particular domain through the shareable ontology. The virtual personal assistant platform 1014, or more specifically, the interpreter 1016 and/or the reasoner 1018, may consult one or more of the models 1038, 1040, 1042 to determine the most likely user intent. For example, in some of the interpreter 1016 or more specifically, an automatic speech recognition component, may use the acoustic models 1038 to map orally-articulated words or phrases to their textual counterparts. In some implementations, a standard high-bandwidth acoustic model may be adapted to account for particular phraseology or vocabulary that might be specific to a domain. For instance, terminology such as "boot cut" and "acid wash" may have importance to a virtual personal assistant system that is directed to the sale of women's jeans but may be meaningless in other contexts. Thus, a virtual personal assistant developer may be prompted to include mathematical representations of the audio speech of those terms in an acoustic model 1038 by virtue of the inclusion of those terms in a domain knowledge base that is linked to the shareable ontology (and to which the acoustic model 1038 is also linked). Similarly, the language models 1040 (which may, for example, determine whether a sequence of words recognized by an automatic speech recognition module represents a question or a statement) and statistical models 1042 may be provided with the virtual personal assistant development platform as reusable components and adapted for use in connection with a specific domain.

II. Multi-Modal Input Processing

Figure 11:
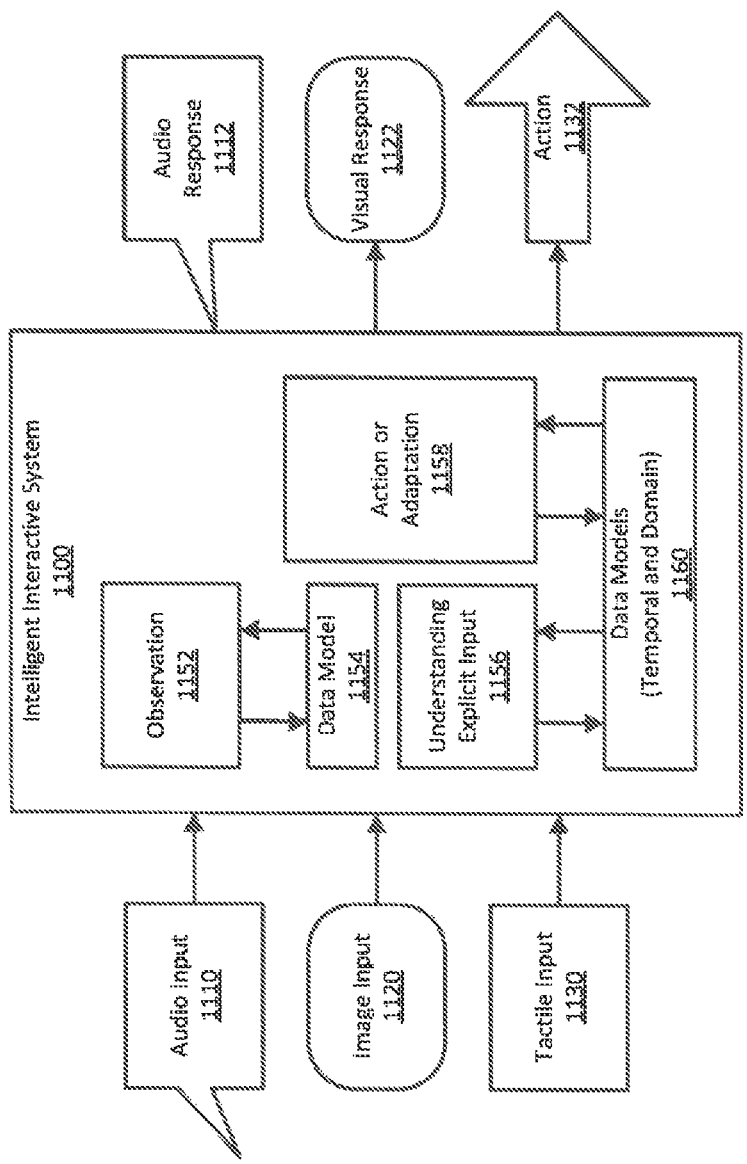
FIG. 11 illustrates an example of the structure and operation of an Intelligent
Interactive System.

A virtual personal assistant system can generally be described as a type of Intelligent Interactive System (IIS). FIG. 11 illustrates an example of the structure and operation of an Intelligent Interactive System 1100. An Intelligent Interactive System is a conversational system, capable of engaging in a back-and-forth series of interactions as needed to complete a task. conduct a dialog with a person, where the system's responses are not only based on the last thing the person said or did, but possibly also on things the person said or did earlier in the conversation, or even days or weeks in the past. An Intelligent Interactive System can also respond not only to natural language input, entered as spoken or typed words, but also to non-verbal cues, derived from audio, visual, and/or tactile input. That is, the system can use behavioral cues, such as gestures, facial emotions, voice volume or pace, and so on to understand a person's emotional and/or cognitive state. The system can thus leverage behavioral cues to adapt to human modes of communication. An Intelligent Interactive System is also able to combine modalities, including both explicit and behavioral cues, to fully understand a person's context. An Intelligent Interactive System is also able to understand a person's capabilities and adapt to them.

As illustrated in FIG. 11, an Intelligent Interactive System 1100 can take in audio input 1110, image input 1120, and tactile input 1130. The system 1100 is further able to output an audio response 1112, including being to respond vocally, produce positive and negative sounds, play music, and so on. The system 1100 may further be able to provide a visual response 1122, including displaying an image or a website, playing a video, providing directions, and so on. The system 1100 may also be able to take an action 1132, such as opening a door, operating a machine, or initiating a transaction, among other things.

To interact with a person, the Intelligent Interactive System 1100 may include an observation system 1152, an understanding and explicit input system 1156, and an action or adaptation system 1158. The observation system 1152 is able to observer a person's implicit cues and environment. Using this information, the observation system 1152 may be able to develop a deeper understand of the person's state and the progress of a task. The observation system 1152 can leverage continuous audio and/or visual inputs, and predict things about the person by understanding the meaning of input data. The observation system 1152 may be able to determine audio information such as pitch dynamics, voice energy, and speaking rate among other things. The observation system 1152 may also be able to determine visual information such as facial expressions, body language, direction of gaze, and the scene or environment, among other things. The observation system 1152 can access data models 1154, which may include models for visual and audible cues, to determine a person's state, which may include anger, anxiety, confusion, sadness, and so on.

The understanding and explicit input system 1156 is able to understand explicit, multi-modal inputs from a person. These explicit inputs can include, for example, gestures, head tracking, speech, and tactile input such as touches, taps, and typing. The understanding and explicit input system 1156 may, from this information, be able determine the person's explicit intent.

It should be noted that observations, as conducted by the observation system, 1152 may be continuous, while a person's intent, as determined by the understanding and explicit input system 1156, may be dialog-based. Specifically, the Intelligent Interactive System 1100 may determine a person's intent from the most recent input provided by the person. In contrast, the Intelligent Interactive System 1100 may derive observations in a continuous flow from both explicit input and observed input.

The action or adaptation system 1158 can formulate the Intelligent Interactive System's 1100 response to the person's inputs. The action or adaptation system 1158 may, for example, take an explicit action that matches (or attempts to match) the person's intent, as derived by the understanding and explicit input system 1156. The action or adaptation system 1158 may alternatively or additionally be able to adapt its behavior using observations of the person's state, as provided by the observation system 1152.

Both the understanding and explicit input system 1156 and the action or adaptation system 1158 may have access to data models 1160 that may assist these systems in making determinations. The data models 1160 may include temporal data models and/or domain models. The temporal models attempt to store the temporal nature of the person's interaction with the Intelligent Interactive System 1100. For example, the temporal models may store observations and features that lead to those observations. The temporal models may also store intents and the system's associated responses and adaptations. The domain models may store observation and feature associations as well as intent and response associations for a specific domain. The domain models generally do not require a temporal element, relying instead on what is known and/or expected about a particular domain.

As discussed above, an Intelligent Interactive System, such as a virtual personal assistant, can have components that understand a person's multi-modal input, can interpret the multi-modal input as an intent and/or an input state, and can reason as to the best response or course of action that addresses the intent and/or input state. To conduct the understanding, interpreting, and reasoning, a virtual personal assistant a number of audio analysis and image analysis tools. These audio and image analysis tools can analyze audio and visual input, respectively, to understand and interpret (and, in some cases, also reason) a particular aspect of the input. In various implementations, a virtual personal assistant can also combine the understanding conducted by the audio and image analysis tools, as well as information provided by tactile input, to produce an intent and/or input state that are based on a multi-modal analysis of a person's input. In various implementations, the virtual personal assistant can then reason using the multi-modal intent and/or input state.

Figure 12:
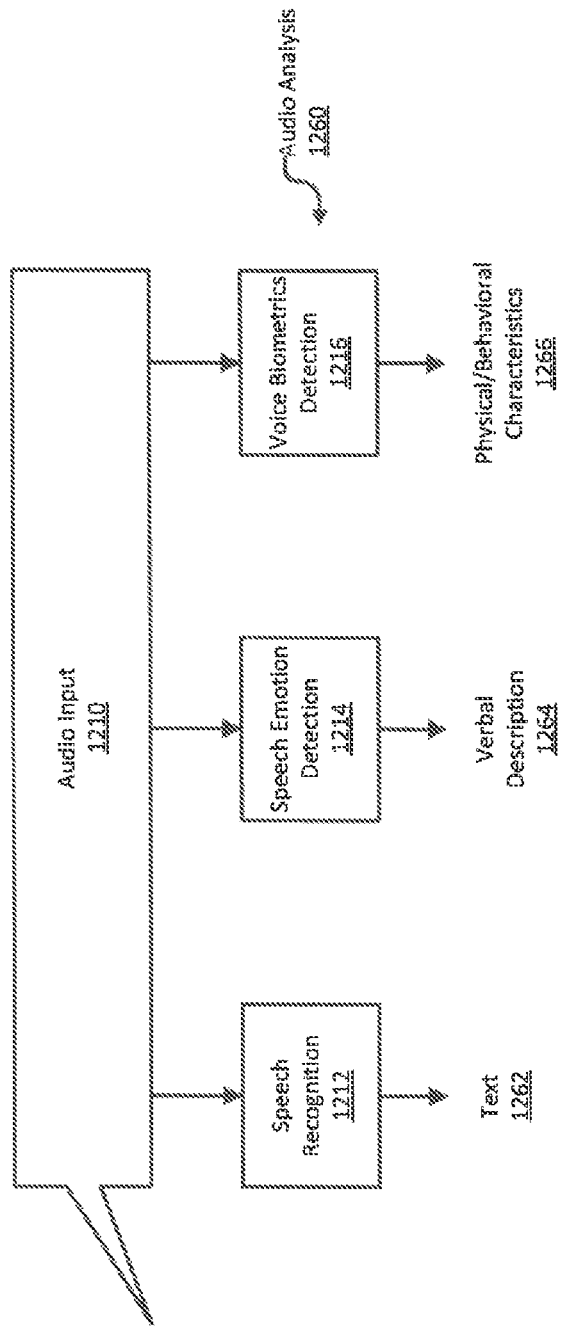
FIG. 12 illustrates examples of audio analysis tools that an Intelligent Interactive system or a virtual personal assistant may use to process audio input.

FIG. 12 illustrates examples of audio analysis 1260 tools that an Intelligent Interactive system or a virtual personal assistant may use to process audio input 1210. Audio input 1210 may include both words and sounds, such as humming, laughing, coughing, and so on. The audio analysis 1260 tools can process the audio input 1210 and provide semantic interpretations of the audio input 1210. For example, the audio analysis 1260 tools can interpret a string of sounds as the words "please call John." As another example, the audio analysis 1260 tools can interpret a particular sound as laughing, and associate the word "laughing" with the sound. As another example, the audio analysis 1260 tools can interpret particular sounds as indicating that the speaker has a British accent. In some implementations, the audio analysis 1260 tools are able to output the semantic information in formats that can be used and processed by other parts of the virtual personal assistant.

In the illustrated example, the audio analysis 1260 tools include a speech recognition engine 1212, a speech emotion detection engine 1214, and a voice biometrics detection engine 1216. These audio analysis 1260 tools are provided as examples of the tools a virtual personal assistant may have for analyzing audio input 1210. In various implementations, a virtual personal assistant may include additional or alternative tools, and/or may have tools that are capable of making a combined analysis (e.g., speech recognition and speech emotion detection). The speech recognition engine 1212 can identify words in the audio input 1210, and produce the identified words as text 1262. The speech emotion detection engine 1214 can identify the emotional content in the audio input 1212, and produce a verbal description 1264 of the identified emotions. The voice biometrics detection engine 1216 can identify characteristics of a person's voice, and produce a description of the physical and/or behavioral characteristics 1266. Example implementations of each of the audio analysis 1260 tools are provided below.

Figure 13:
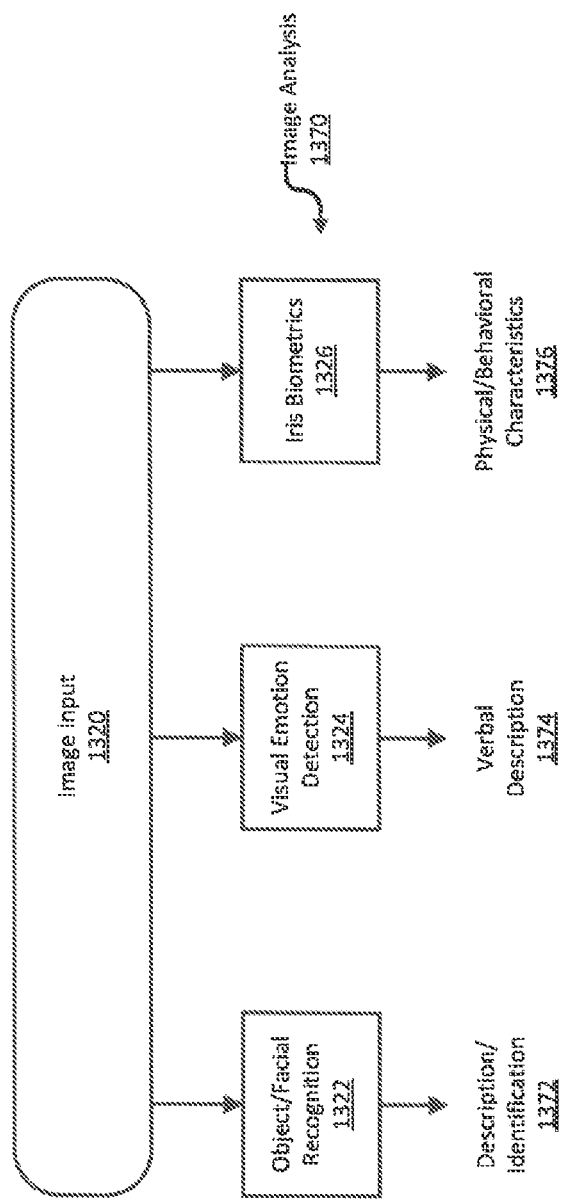
FIG. 13 illustrates examples of image analysis tools that a virtual personal assistant may use to process image input.

FIG. 13 illustrates examples of image analysis 1370 tools that a virtual personal assistant may use to process image input 1320. Image input 1320 may include still images, moving images (e.g., video), and still and/or moving images capturing data other than what is available in the visible spectrum (e.g., night vision images, thermal sensing images, infrared images, etc.). The image analysis 1370 tools can process the image input 1320 and provide semantic interpretations of the image input 1320. For example, the image analysis 1370 tools can interpret a particular image as being a lamp or the face of a particular person, and output "lamp" or "John." As another example, the image analysis 1370 tools can interpret a video as indicating that a person is bored or excited, and output "bored" or "excited." As another example, the image analysis 1370 tools can interpret an image that includes an iris, and output that the iris belongs to "John." In some implementations, the image analysis 1370 tools are able to output the semantic information in formats that can be used and processed by other parts of the virtual personal assistant.

The image analysis 1370 tools illustrated in this example include an object/faction recognition engine 1322, a visual emotion detection engine 1324, and an iris biometrics engine 13213. These image analysis 5130 tools are provided as examples of the tools a virtual personal assistant may have for analyzing image input 1320. In various implementations, a virtual personal assistant may include additional or alternative tools, and/or may have tools that are capable of making a combined analysis (e.g., facial recognition and emotion detection). The object/facial recognition engine 1322 can identify objects in an image or video, and provide a verbal description of the objects. The object/facial recognition engine 1372 can also recognize faces, and provide an identification associated with the face, such as a name and/or category (e.g., "child" or "adult"). The visual emotion detection engine 1324 can determine person's emotion from an image or video that captures the person's face and/or body. The visual emotion detection engine 1324 can produce a verbal description of the detected emotion. The iris biometrics engine 1326 can examine eyes captured in the image input 1320, and provide the physical and/or behavioral characteristics 1376 of the irises. Example implementations of each of the image analysis 1370 tools are provided below.

Figure 14:
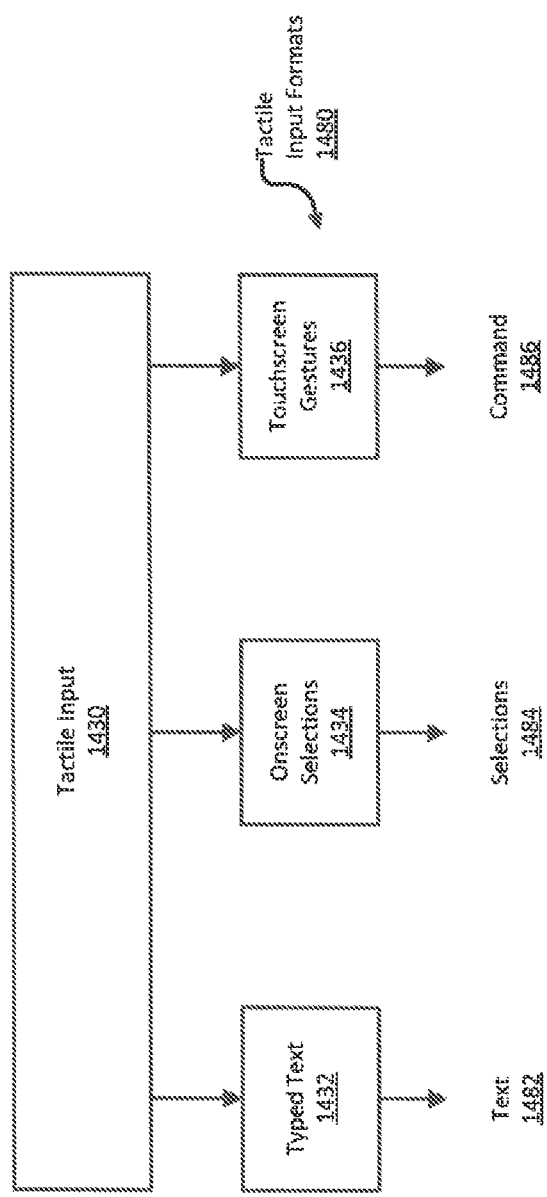
FIG. 14 illustrates examples of tactile input format tools that a virtual personal system may use for receiving tactile input.

FIG. 14 illustrates examples of tactile input format 1480 tools that a virtual personal system may use for receiving tactile input 1430. Tactile input 1430 may include input a person enters into the system using her fingers, hands, or some other body part, or inputs into the system using a mechanical or electronic device such as a keypad, touchscreen, stylus or pen, joystick, iris scanner, fingerprint scanner, barcode scanner, etc. The tactile input format 1480 tools describe some of the ways in which tactile input 1430 can be entered into the system. The tactile input format 1480 tools further provide an interpretation of a tactile input 1430. In some implementations, the tactile input format 1480 tools can output an interpretation that can be used and processed by other parts of the virtual personal assistant.

The example tactile input format 1480 tools illustrated in FIG. 14 include a typed text 1432 tool, an onscreen selections 1434 tool, and a touchscreen gestures 1436 tool. These tactile input format 1480 tools are provided as examples of the tools a virtual personal assistant may have for accepting tactile input. In various implementations, a virtual personal assistant may include additional or alternative tools, and/or may have tools that are capable of accepting multiple types of tactile input (e.g., touchscreen gestures and touch selections). The typed text 1432 tool provides text 1482 input using a keyboard, such as a mechanical keyboard, or an onscreen, touch-based keyboard. The onscreen selection 1434 tool provides selections 1484 made by a person using a mouse, joystick, stylus, a finger, or some other selection tool. Selections 1484 include, for example, checkboxes, radio buttons, drop-down menus, buttons that initiate an action, fields for text entry, menus, icons, hypertext links, etc. The touchscreen gestures 1436 tool interprets inputs to a touchscreen, such as taps, swipes, panning, scrolling, and multi-touch input, where the touchscreen is touched in two or more places at the same time. The touchscreen gestures 1436 tool interprets the touch input, and provides the command 1486 interpreted from the input.

In some implementations, a virtual personal assistant can operate on the information provided by audio analysis, image analysis, and tactile input tools, as described above. In some implementations, a virtual personal assistant also includes one or more preference models, which it can use to further interpret audio, visual, and tactile input.

Figure 15:
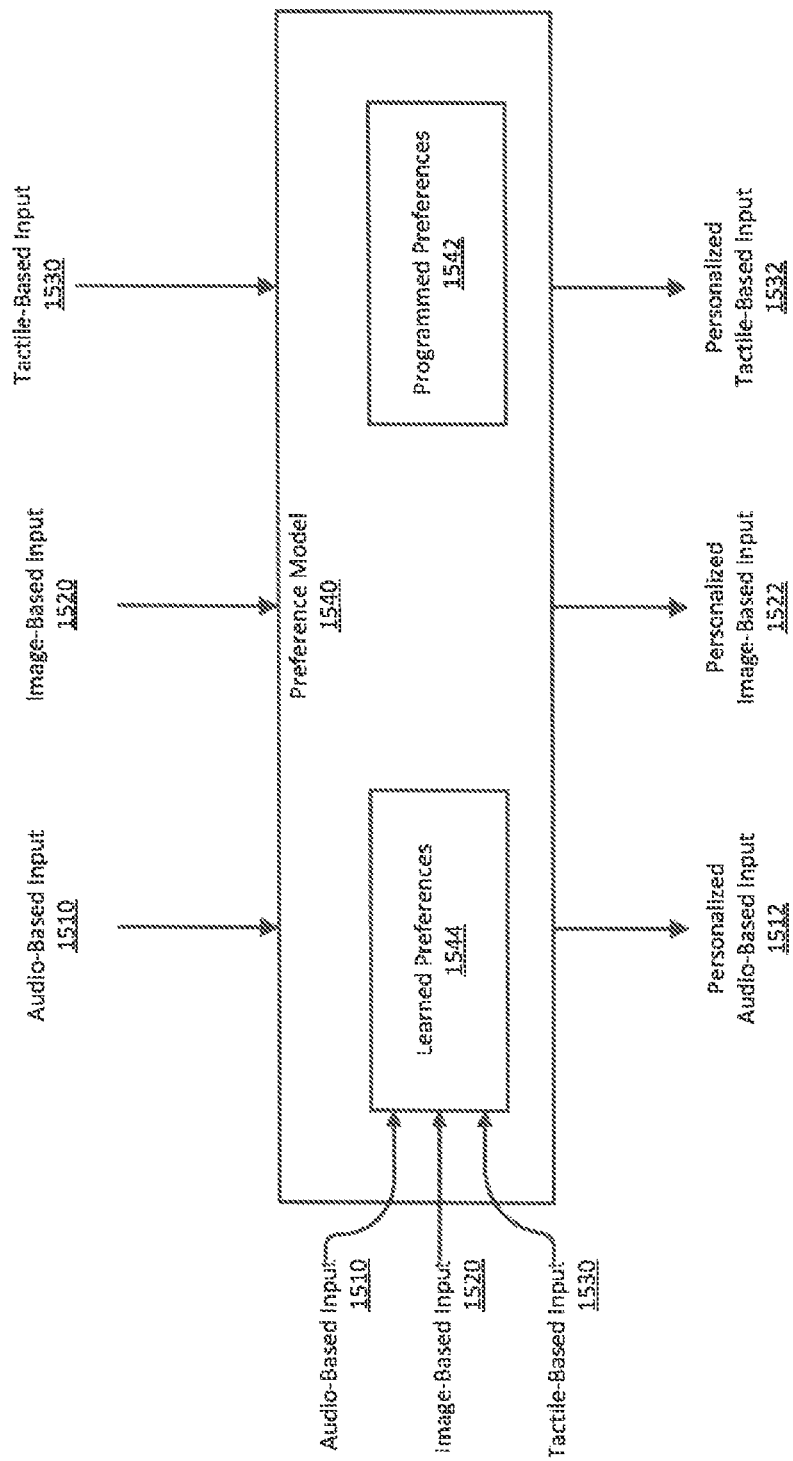
FIG. 15 illustrates an example of a preference model.

FIG. 15 illustrates an example of a preference model 1540. In some instances, a preference model can also be referred to as "settings" or "options" that enable a user to personalize a device or system. For example, a preference model for a smartphone can be programmed with information such as the smartphone user's preferred ringtones, a background image, and the user's thumbprint for unlocking the device. The smartphone preference model can also store information such as the user's telephone account information, email addresses, passwords, and so on. To store information that a person may enter or configure into the preference model 1540, the preference model 1540 may include a set of programmed preferences 1542. The programmed preferences may change over time, but generally only change when a device's user initiates a change.

The preference model 1540 can also include a set of learned preferences 1544. Unlike the programmed preferences 1542, the learned preferences 1544 are obtained through the person's use of a virtual personal assistant-enabled device. For example, the learned preferences 1544 may retain audio-based input 1510, image-based input 1520, and tactile-based input 1530 entered into the device in the past. The learned preferences 1544 may further retain associations made with particular input. For example, the learned preferences 1544 may associate repeated searches for antique shops (entered, for example, through text entry or voice commands) with a fondness for antiques. As another example, the learned preferences 1544 may associate a person's use of particular words or phrases with a particular culture or social group that the person may belong to. As another example, the learned preferences 1544 may store information provided in response to questions asked in dialogues with the person, such as the names and ages of the person's children.

The preference model 1540 can use the stored programmed preferences 1542 and the learned preferences 1544 to personalize a person's interaction with a virtual personal assistant-enabled device. The preference model 1540 illustrated in this example may receive as inputs audio-based input 1510, image-based input 1520, and/or tactile-based input 1530. These various inputs may, for example, be provided by the tools illustrated in FIGS. 12-14. The programmed preferences 1542 and/or learned preferences 1544 of FIG. 15 can be applied to the inputs 1510, 1520, 1530, to filter and/or adjust the inputs according to the preferences 1542, 1544. The preference model 1540 thus can provide personalized audio-based input, personalized image-based input 1522, and/or personalized tactile-based input 1532, for use by other parts of the virtual personal assistant. For example, the tactile-based input 1530 may include a person's thumbprint, entered using a thumbprint scanner, to which the preference model 1540 may apply a programmed preference 1542 to authenticate the person. As another example, audio-based input 1510 may indicate that the speaker is looking for a nearby coffee shop. In this example, the preference model 1540 may apply a learned preference 1544 in searching the area, and also find antique shops in the area. Finding from the learned preferences 1544 that the person is fond of antiques, the virtual personal assistant may provide the location of a nearby coffee shop, and also let the speaker know that there is an antique shop near the coffee shop, and where to find it.

Figure 16:
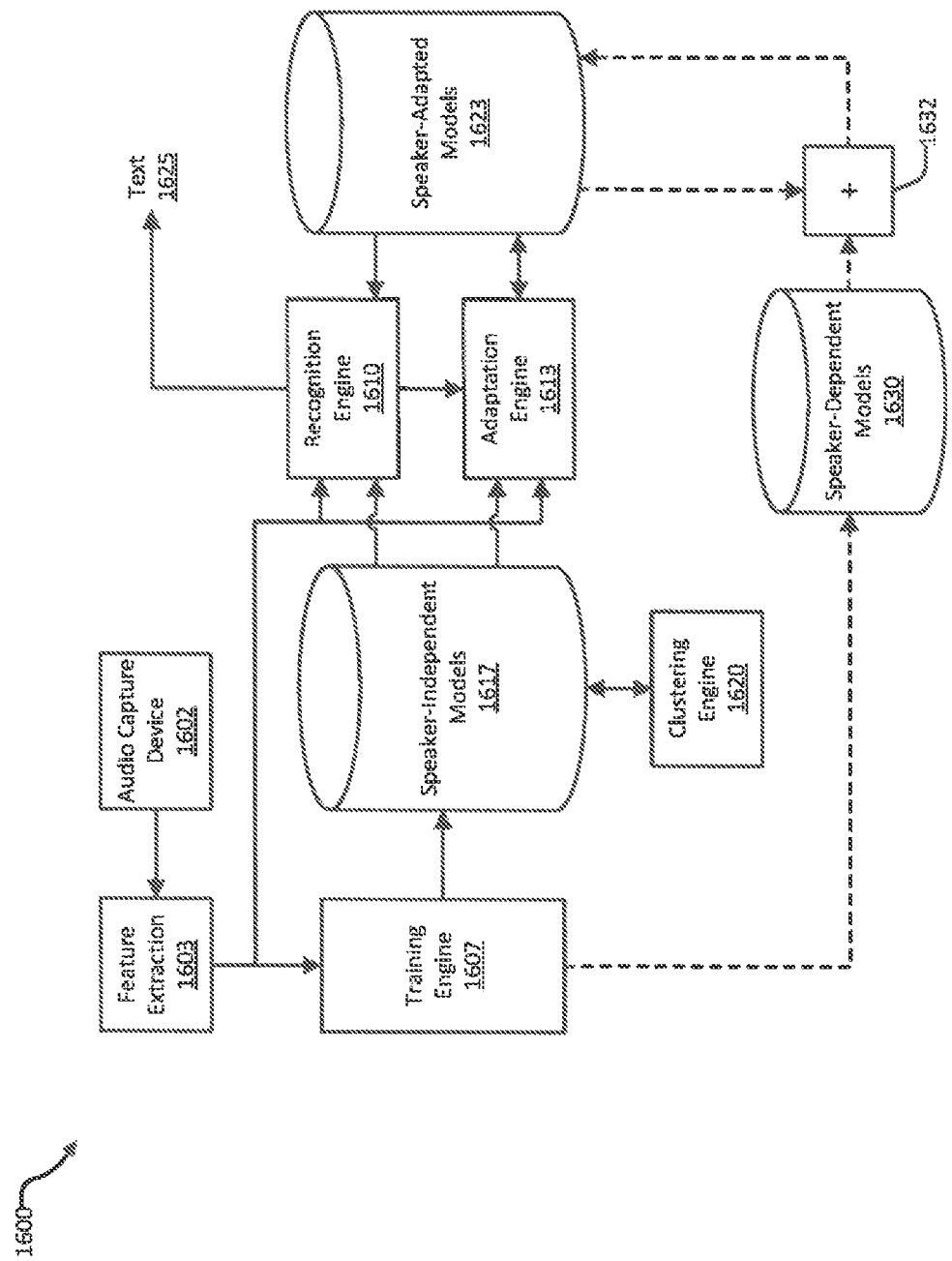
FIG. 16 illustrates an example of an adaptive speech recognition system.
Figure 17:
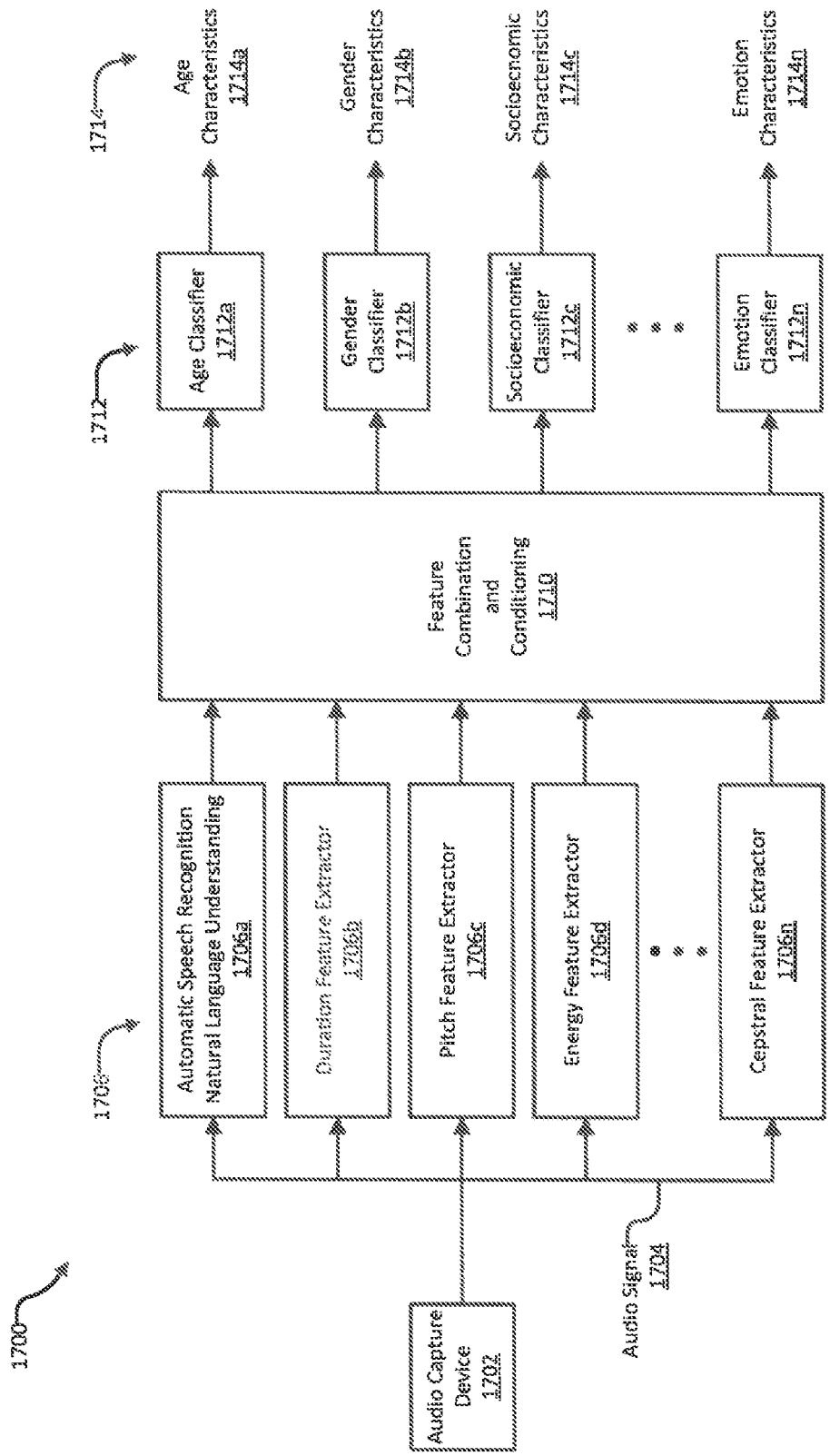
FIG. 17 illustrates an example of a system for determining a person's characteristics and/or emotional state from audio signals detected as coming from the person.
Figure 18:
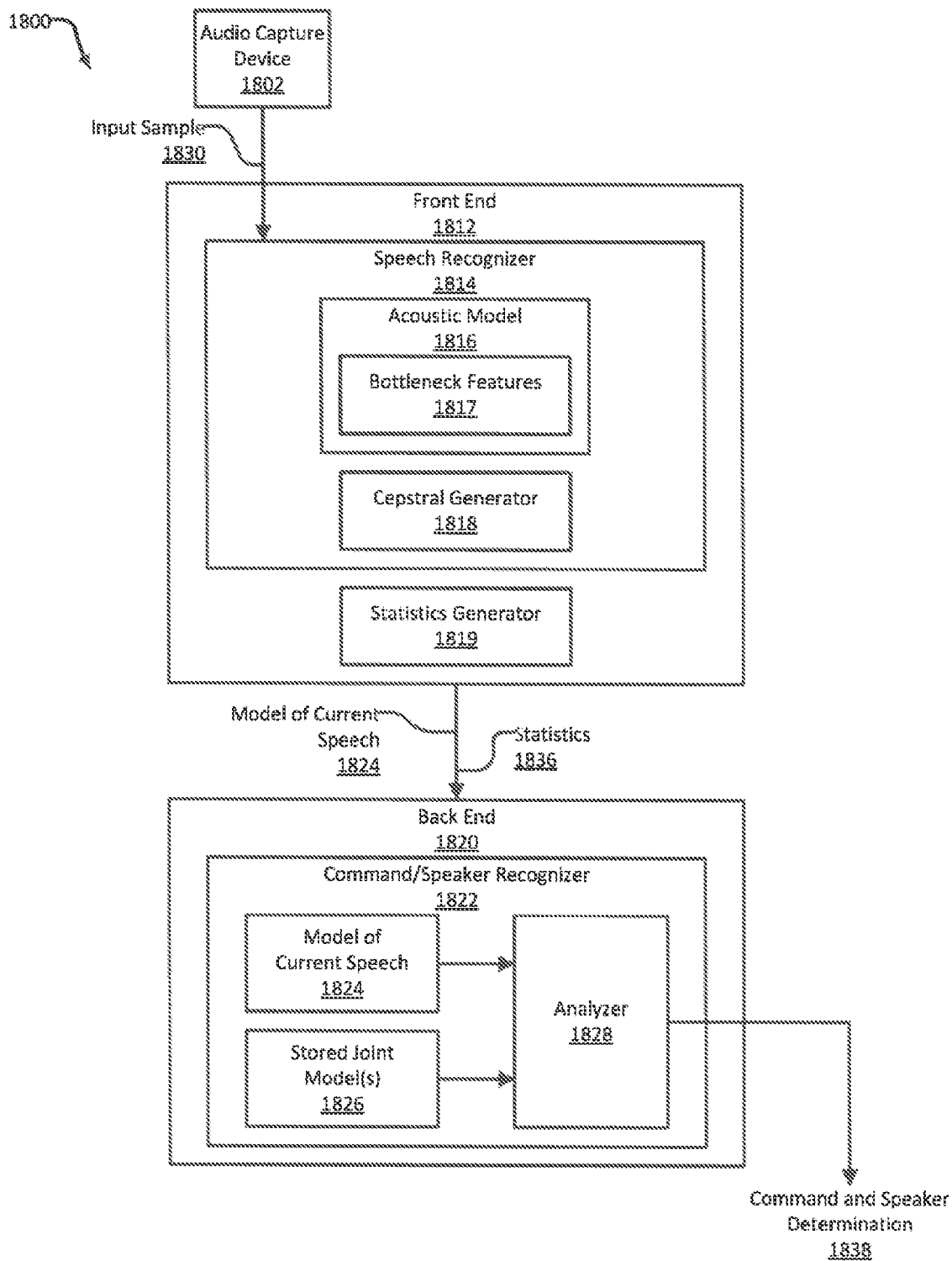
FIG. 18 illustrates an example of a spoken command analyzer.
Figure 19:
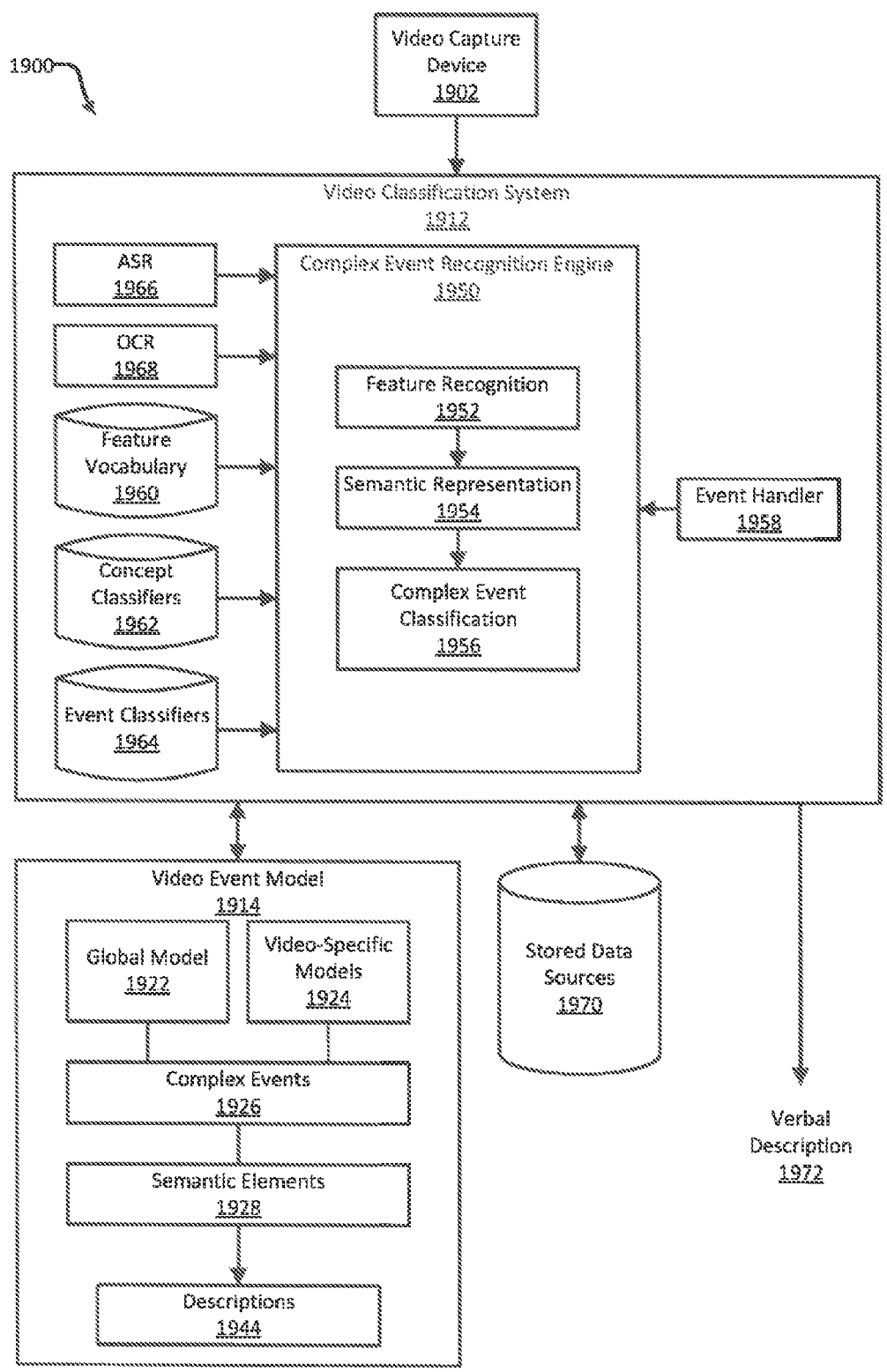
FIG. 19 illustrates an example of a visual detection system configured to identify visual information.
Figure 20:
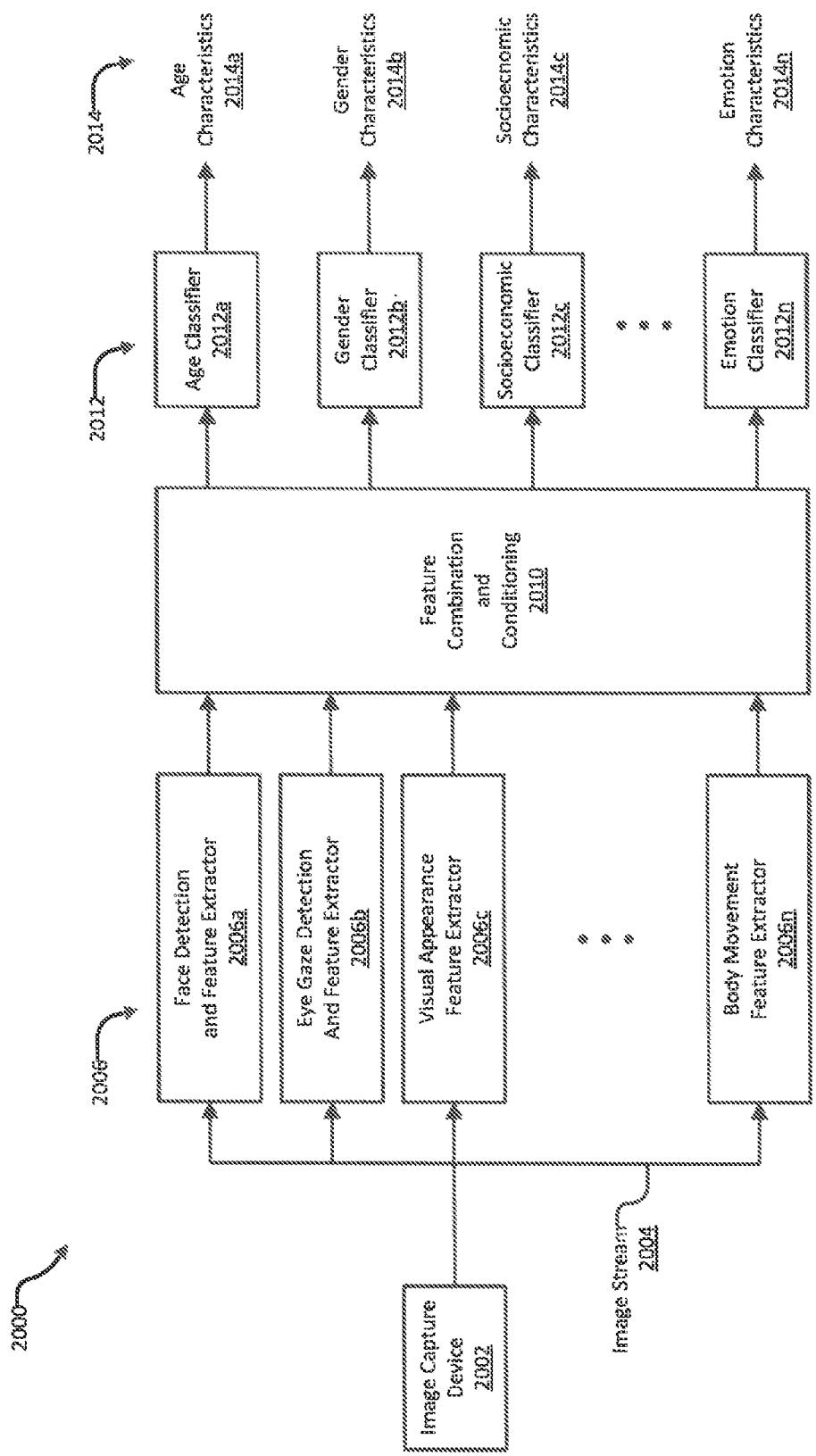
FIG. 20 illustrates an example of a system for determining a person's characteristics and/or emotional state from visual cues about the person.
Figure 21:
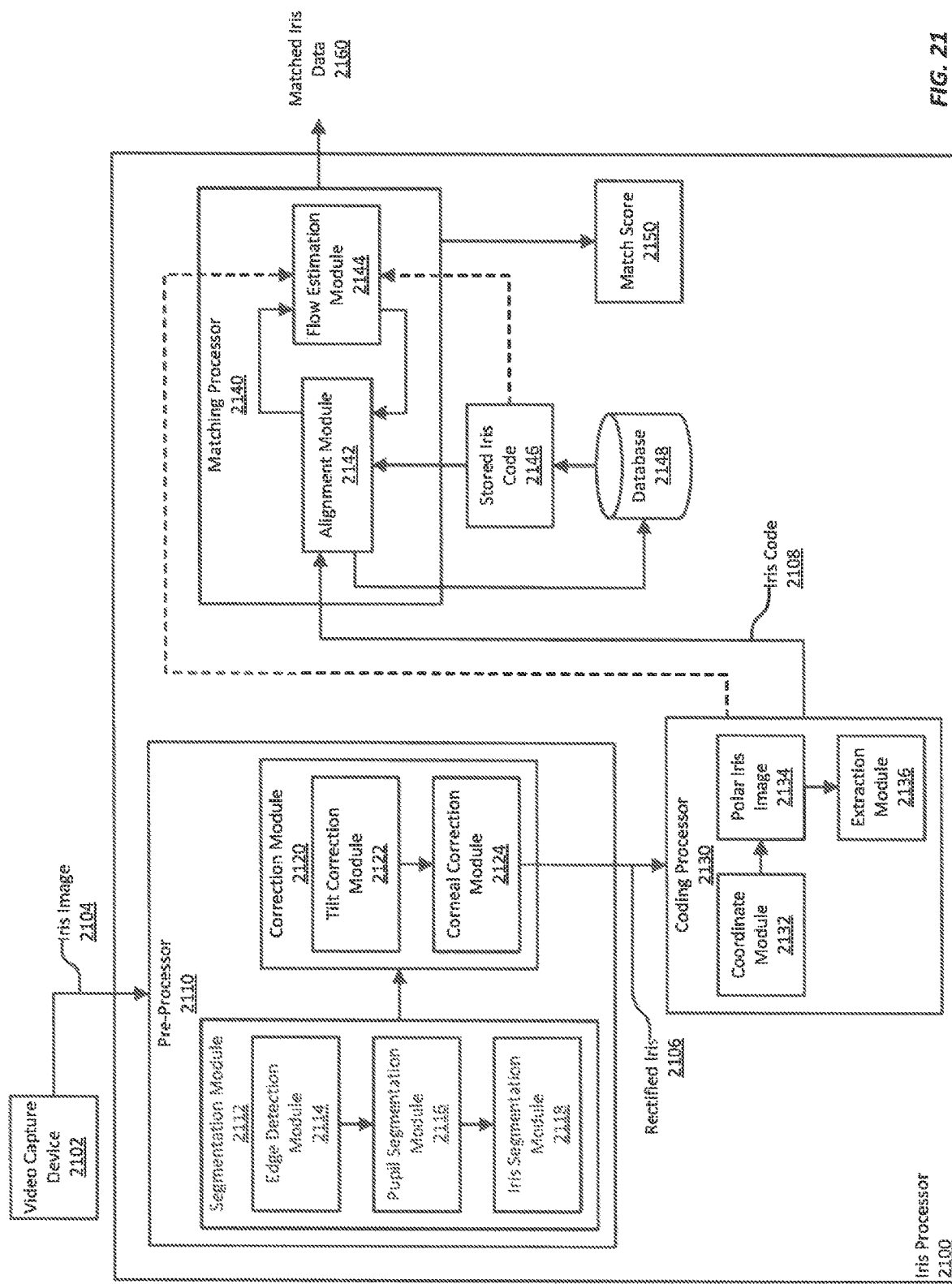
FIG. 21 illustrates an example of an iris processor, which can be used to determine iris biometrics.

As noted above, a virtual personal assistant may include various audio analysis and image analysis tools that may be able to understand, interpret, and/or reason to determine a person's intent and/or input state from audio and image data. FIGS. 16-18 provide example implementations of audio analysis tools and FIGS. 19-21 provide example implementations of image analysis tools. The examples in FIGS. 16-21 are provided to aid in the understanding of the possible tools a virtual personal assistant may use to understand, interpret, and/or reason, given audio or image input. A virtual personal assistant may be provided with other tools, or variations on the tools discussed here. Although some tools are described below as capable of understanding, interpreting, and reasoning, in some implementations a virtual personal assistant may use only the understanding aspect, and use the understanding output to conducting multi-model interpretation and reasoning. Alternatively, in some implementations, a virtual personal assistant may use the understanding and interpreting aspect, and use the interpretation output to conduct multi-modal reasoning.

FIG. 16 illustrates an example of an audio analysis tool, specifically, an adaptive speech recognition system 1600. An adaptive speech recognition system 1600 can be used to provide a semantic interpretation of audio input received by a virtual personal assistant-enabled device. The example speech recognition system 1600 uses stored speech models, and adapts to an individual speaker using a constrained maximum likelihood transformation approach. Under this approach, stored speech models are progressively transformed so that the models can better match the particular speech patterns (e.g., accents, inflections, mannerisms, etc.) of an individual speaker. Additionally, applying a constrained maximum likelihood transformation approach may reduce the time needed for the system to adjust to an individual speaker. A constrained linear transformation may be derived from a relatively small amount of speaker-dependent training data. Applying the transformation to speaker independent models produces a set of speaker-adapted models. The speaker-adapted models may greatly improve a speech recognition system's performance for individual speakers. In various implementations, the example speech recognition system 1600 outputs semantic information derived from audio input, in the form of text 1625. Speech recognition systems using this approach are also described in U.S. Pat. No. 5,864,810, titled "Method and Apparatus for Speech Recognition Adapted to an Individual Speaker," the entirety of which is incorporated by reference herein.

FIG. 16 illustrates one example of the components that may be included in a speaker-adaptive speech recognition system 1600. This example system 1600 includes an audio capture device 1602, a feature extraction module 1603, a training engine 1607, a recognition engine 1610, an adaptation engine 1613, a set of stored speaker-independent models 1617, a clustering engine 1620, a set of stored speaker-adapted models 1623, and an output receiver 1625. In some implementations, the system 1600 may also include a set of stored speaker-dependent models 1630. The system 1600 of FIG. 16 is presented as just one example of an adaptive speech recognition system, and variations including more components, fewer components, or different components also are possible.

The audio capture device 1602 is a device that is able to detect, record, and transmit audio signals. An audio capture device 1602 may include, for example, a microphone. In some implementations, the audio capture device 1602 may include transformation engines, such as for example engines that are able to convert an analog signal into a digital signal, or engines that are able to capture an audio input signal in a specific format (e.g., on a magnetic tape).

In various implementations, the audio capture device 1602 may operate in conjunction with a feature extraction 1603 module. Extracting features may include dividing an audio input signal into a number of temporal windows, generally but not always of equal duration. These temporal windows may also be referred to as frames. Acoustic characteristics such as frequency, pitch, tone, etc., can then be determined for each temporal window to identify particular linguistic features present within each temporal window.

In various implementations, the extracted features may be provided to the training engine 1607. The training engine 1607 may be used by the adaptive speech recognition system 1600 during a training phase. During the training phase, training data, typically in the form of prescribed or pre-planned text, is entered into the system 1600. For example, a group of people may be selected as representative of a population, and may be referred to as the training population. Each person in the group may then read the same prescribed text to the system 1600. The training engine 1607 is also provided the prescribed text, and can associate features extracted from the audio input signal with phones and/or phoneme identified in the text.

A phoneme is the smallest structural unit that distinguishes meaning in a language, while a phone is an instance of a phoneme in actual utterances. Phonemes are not the physical segments themselves, but are cognitive abstractions or categorizations of them. A "phone," as used herein, may refer to, among other things, an alphanumeric or symbolic notation that represents a single unique speech sound. For example, the pronunciation of "t" in "stick", "bittle", "bit" and "tick" represent physically different sounds (phones) due to their position in the word, but are the same phoneme in English. Phones can be combined with other phones to form a word or other verbal expression in a human-spoken language. A phone may correspond to a single, regular variation in pronunciation of a vowel or consonant. In some cases, a combination of letters may produce a single phone (e.g., "th" and "ng"). Additionally, some letters of the alphabet produce different phones in different contexts (e.g., the short "a" in "rat" versus the long "a" in "rate"). A "phoneme" may refer to, among other things, the smallest unit of sound that has a distinct meaning to speakers of a particular language. For example, the pronunciation of "t" in "stick" and "tick" is similar enough in the English language that it is considered as the same phoneme, but the difference between the two pronunciations of "t" in another language may be significant and therefore constitute two different phonemes. Thus, the same phone may have different phonemic characteristics depending on the speaker's native language, for example. Phones can be denoted using a phonetic alphabet, such as the Arpabet for American English or the International Phonetic Alphabet (IPA) for other languages.

The associations made by the training engine 1607 can be stored in the speaker-independent models 1617. The speaker-independent models 1617 can be stored, for example, in a database-type structure, including software modules stored in volatile memory and/or software modules embodied in non-volatile hardware storage systems. In some implementations, the speaker-independent models 1617 may be grouped by a clustering engine 1620 into a set of tied models. In various implementations, a speech recognition system, such as the adaptive speech recognition system 1600, may use multi-dimensional Gaussian mixture densities to model the probability functions of various speech states in stored recognition models, such as the speaker independent models 1617. That is, the system may use a mathematical model to determine the probability that an input is associated with a particular speech state. In various implementations, Gaussian mixture densities can be derived during the system's training phase.

The Gaussian mixture densities may be stored as a weighted sum of simple Gaussian curves. The set of simple Gaussian curves used to model a particular state is often referred to as a "codebook." In a fully-tied speech recognition system, one codebook of simple Gaussian curves is used to model the probability density functions of all the speech states in the speech recognition system. Furthermore, each probably density function can have associated with it a set of weighing coefficients that can be applied to the Gaussian curves in the codebook. In a fully-untied system, a separate codebook of simple Gaussian curves is used to model the probability density functions of each separate speech stage in the system. A partially-tied system uses multiple codebooks, and each codebook is used to model the probability density function of a group or "cluster" of related speech states. In such a system it is assumed that the same transformation can be used for all the Gaussian curves in a particular codebook. Such a system thus uses a small amount of speaker-dependent data to compute transformations for all of the stored Gaussian curves. Additionally, in some cases, a linear transformation can be shared by different related codebooks.

In various implementations, the clustering engine 1620 identifies speech states sharing similar Gaussian curves, and may create an individual codebook or "genone" for each cluster. These codebooks can contain a set of Gaussian curves that can be used to estimate the speech states in the associated cluster.

Once the training phase is complete, the adaptive speech recognition system 1600 can be put into an operative phase. During the operative phase, unplanned or un-prescribed audio input signals (also referred to herein as unknown input signals) are provided to the feature extraction 1603 module, and the extracted features are provided to the recognition engine 1610 and the adaptation engine 1613. The recognition engine 1610 uses the speaker-independent models 1617 to recognize the unknown input signals. For example, the recognition engine 1610 can use the speech-independent models 1617 to determine a most probable path of speech states for a given set of feature data. This most probable path may be associated with particular words. The recognition engine 1610 may output the recognized words as text 1625, which may be used by other systems in a virtual personal assistant.

Quite often, a speaker providing input to the system 1600 may have vocal characteristics that vary from those of the training population. For example, the speaker may have an accent or a speech impediment. The adaptive speech recognition system 1600 thus includes an adaptation engine 1613. The adaptation engine 1613 receives the features extracted by the feature extractor 1603, as well as the speech states determined by the recognition engine 1610. The adaptation engine 1613 then compares the extracted features with the speech states. Based on this comparison, the adaptation engine 1613 determines a set of transformations for the probability models for these speech states. The set of transformations may better fit the speech patterns of the particular speaker. After receiving from this person, the adaptation engine 1613 may apply the set of transformations to some or all of the speech states stored in the speaker-independent models, and store the result as speaker-adapted models 1623. Thereafter, the recognition engine 1610 may use the speaker-adapter models 1623 to determine speech states for this particular person.

In some implementations, the adaptation engine 1613 continues to determine and apply transformations as new audio input is received from a particular speaker. In these implementations, the speaker-adapter models 1623 can gradually develop into models that closely match the speech patterns of the particular speaker.

In some implementations, the adaptive speech recognition system 1600 may be trained for a specific person's speech patterns. For example, a person with distinct speech characteristics, which may be dissimilar to speech characteristics of the training population, may read a pre-scribed text to the system 1600. From this training data, the training engine 1607 may derive speaker-dependent models, in the same way that the training engine 1607 derives speaker-independent models. In these implementations, the system includes a combining engine 1632, which, when the system 1600 is in operative mode, can combine the speaker-dependent models with the speaker-adapted models. The speaker-dependent models 1630 may thus improve the recognition performance of the speaker-adapter models 1623.

In some implementations, the adaptive speech recognition system 1600 can be combined with a speaker identification system, which is not illustrated here. A speaker identification system may indicate to the system 1600 whether the speaker-independent models 1617 or the speaker-adapted models 1623 should be applied, or whether a particular set of speaker-adapted models 1623 should be applied. For example, when the speaker identification system recognizes a particular speaker whose speech patterns are known to approximate the training population, the identification system may enable the speaker-independent models 1617. As another example, the speaker identification system may recognize a speaker for whom a speaker-adapted model 1623 has previously been generated. In this example, the identification system may enable the speaker-adapted model 1623 for this identified speaker. As another example, the speaker identification system may determine that a person speaking is new and unknown. In this example, the identification system may enable speaker adaptation, causing a new speaker-adapted model 1623 to be generated. Alternatively, in this example, the identification system may seek confirmation as to whether speaker adaptation should be enabled.

FIG. 17 illustrates an example of an audio analysis tool, here embodied as a system 1700 for determining a person's characteristics and/or emotional state from audio signals detected as coming from the person. A person's characteristics and/or emotional state can be used to adjust the "personality" of a system, such as a virtual personal assistant, that is responding to the person. For example, the manner in which output is formulated and presented to the person can be adjusted, as well as the timing of the output. Additionally, the characteristics and/or emotional state can be used to as a factor in determining the person's intent. For example, an angry tone of voice may modify words that could otherwise be interpreted as positive or even happy. Systems for determining a person's characteristics and emotional state are also described in U.S. Pat. No. 9,213,558, titled "Method and Apparatus for Tailoring the Output of an Intelligent Automated Assistant to a User, "the entirety of which is incorporated by reference herein.

The example system 1700 generally includes one or more feature extractors 1706, a feature combination and conditioning module 1710, and one or more classifiers 1712. The feature extractors 1706 may receive audio input from an audio capture device 1702. The classifiers 1712 may output various characteristics 1714 in a format that can be used by other devices or systems. The system 1700 of FIG. 17 is presented as one example of a system configured to determine a person's characteristics and/or emotional state from audio input, and other systems using similar components, fewer components, more components, or different components are possible.

The audio capture device 1702 can be a device, such as a microphone, that is capable of sensing and recording sounds, such as speech, grunts, laughs, and other human vocalizations, as well as clapping, slaps, finger snaps, and other sounds that can be made by a person. The audio capture device 1702 may be configured to convert captured audio signals into a format that can be used by the system 1700. For example, the audio capture device 1702 can produce an analog waveform or a digital representation of the audio signal.

The feature extractors 1706 may be implemented using processing devices configured to extract features from an audio input signal. Various examples of feature extractors 1706 are provided in this example, including an automatic speech recognition and natural language understanding processor 1706a, a duration feature extractor 1706b, pitch feature extractor 1706c, energy feature extractor 1706d, and cepstral feature extractor 1706n. In various implementations, the system 1700 may include other audio feature extractors, not illustrated here. In various implementations, the example extractors 1706 illustrated here can be combined, can be separated into multiple modules, and/or can extract other audio-related features.

Features extracted by the automatic speech recognition and natural language understanding processor 1706a may be extracted from automatic speech recognition results.

These features include, for example, lexical content and linguistic content. N-gram classifiers can be applied to lexical content to produce a distribution of probabilities over a number of characteristics and emotional states. An n-gram is a continuous sequence of n items from a given sequence of text or speech. The items can be phonemes, syllables, letters, words, or base pairs. N-gram classifiers may thus determine the probability that certain words are related to particular characteristics and/or emotional states. Linguistic content can roughly indicate a person's state of mind. For example, particular words can be associated with positive or negative emotions. Linguistic measures such as "idea density" and word length across interaction sessions for a particular speaker may also be extracted.

Features extracted by the duration feature extractor 1706 relate to the duration of events, and may be extracted from the time alignments of words and phones. These features include, for example, pauses within words, increments in the duration of phones with respect to pre-computed averages, latency in producing a response to a system prompt, probability distribution of certain unit durations (e.g., phone durations), and timing information related a person interrupting system output.

Features extracted by the pitch feature extractor 1706c characterize a person's pitch excursions. These features may be extracted from fundamental frequency (F0) or pitch contours in the person's speech and alignments between the speech and associated automatic speech recognition. These features include, for example, ranges in the fundamental frequency within utterances and words, fundamental frequency slopes along phrases and words, probability distributions of these slopes, and probability distributions of normalized fundamental frequency values (where the normalization may take the form of mean fundamental frequency removal).

Features extracted by the energy feature extractor 1706*d* include the energy-related features of speech waveforms, such as the zeroeth cepstral coefficient, the logarithm of short time energy (hereinafter referred to simply as "energy"), and time alignment information (e.g., from automatic speech recognition results). These features include, for example, range of energy excursions within words and sentences, slopes of energy within words and sentences, probability distributions of normalized energy (where normalization may include referring all energy values to the maximum per sentence or per interaction, among other forms of normalization), and probability distribution of energy slopes.

Features extracted by the cepstral feature extractor 1706*n* may be used to build acoustic models. These models may be trained or adapted to speech data representative of various characteristics and emotional states. These models can be used to obtain probability distributions over the various user characteristics and states.

The feature combination and conditioning module 1710 may be implemented as a processing device, configured to combine and condition the features that are extracted by the feature extractors 1706. In some implementations, multiple features are combined at different levels and can be modeled as joint features, which allows statistical models to account for dependencies and correlations. For example, a first group of features can be conditioned on a second group of features at specific events. For example, a good prosodic feature for frustration is the pitch taken specifically from the longest (relative to its intrinsic duration) vowel region in an utterance (i.e., not the pitch everywhere, but rather the pitch when the user stretches out a word).

The classifiers 1712 may be implemented using processing devices configured to generate conclusions about a person based on the combined and conditioned features provided by the feature combination and conditioning module 1710. FIG. 17 illustrates various examples of classifiers 1712, including an age classifier 1712*a*, a gender classifier 1712*b*, a socioeconomic classifier 1712*c*, and an emotion classifier 1712*n*. The age classifier 1712*a* can make a conclusion with respect to the age characteristics of the person. The conclusion can be general (e.g., the person is a child or the person is an adult) or relatively specific (the person is between the ages of 25-30). The gender classifier 1712*b* can make a conclusion with respect to the gender of the person. The socioeconomic classifier 1712*c* can make a conclusion with respect to the socioeconomic group of the person. The emotion classifier 1712*n* can make a conclusion with respect to the current emotional or affective state of the person.

Each classifier 1712 outputs a respective characteristics, such as an age characteristics 1714*a*, a gender characteristic 1714*b*, a socioeconomic characteristic 1714*c*, and/or an emotion characteristic 1714*n*. The characteristics 1714 may be output in a format that can be used by another system. For example, the characteristics 1714 can be represented by program code, and can be output as binary coded data.

In various implementations, specific types of classifiers may be implemented in the classifiers 1712. For example, statistical classifiers can be implemented and trained to perform classification of characteristics and emotional states (e.g., by generating a probability distribution over user characteristics and states). Statistical classifiers may be useful in performing classification based on the duration events, frequency and pitch, energy, and visual characteristics. Probability distributions generated by statistical classifiers for various characteristics can be combined to obtain a final estimate of characteristics and emotional states. As another example, training-based classifiers may try to match principal component analysis and/or object or pattern recognition results to trained models, where the models correspond to defined characteristics and emotional states.

FIG. 18 illustrates an example of an audio analysis tool, specifically, a spoken command analyzer 1800. The spoken command analyzer 1800 of this example includes a voice biometrics system and a speech recognition system. In various implementations, the spoken command analyzer 1800 may include only a voice biometrics system or only a speech recognition system. The illustrated example spoken command analyzer 1800 is provided as one example of a system configured to determine voice biometrics and/or for speech recognition, and other examples, using similar or different components are possible. Spoken command analyzers are also discussed in U.S. patent application Ser. No. 15/013,580, filed on Feb. 2, 2016 and titled "Joint Speaker Authentication and Key Phrase Identification," the entirety of which is incorporated by reference herein.

In various implementations, the spoken command analyzer 1800 can include a speech recognition component and a voice biometrics component. The speech recognition component can be used to, given a sample of human speech, analyze the sample and determine the content of the sample. For example, the speech recognition component can determine whether the person asked a question or issued a command. The voice biometrics component can be used to derive acoustical properties of the sample, such as frequencies or frequency ranges, pitch or pitch ranges, tone or tonal ranges, durations, volume or volume ranges, timbre, sonic texture, and/or spatial location(s) of the sample with respect to the point at which the sample was captured. The example spoken command analyzer 1800 can be configured to determine both the content of, and the biometric data for, the same input speech sample.

In various implementations, the voice biometric information can be used to identify a specific speaker. For example, the spoken command analyzer 1800 can use the voice biometric information to determine that an input phrase was spoken by John rather than by Sam. In some implementations, the speaker's identity can be used to authenticate the speaker. For example, the speaker's identity can be used to determine whether the speaker is authorized to issue a specific instruction. In some cases, a voice-driven system may be configured to only allow particular people to issue some instructions (e.g., "unlock my car"). In other cases, the system may be configured to allow broad categories of people (e.g., adults only) to issue some instructions, while other instructions can be issued by anyone. In most cases, the spoken command analyzer 1800 can identify and authenticate the speaker from the same speech sample that contains the instruction. The spoken command analyzer 1800 may provide the speaker's identification information and the content of the speaker's input to other devices or systems, which may be configured to authenticate the speaker and/or to execute the speaker's instructions.

In various implementations, the voice biometric information from a speech sample can be used for other purposes.

For example, the voice biometric information can be supplied to systems for determining characteristics about a speaker (e.g., age, gender, ethnicity, nationality, etc.) and/or the emotional state of the speaker (e.g., angry, frustrated, enthusiastic, happy, etc.). Systems for determining speaker characteristics and/or emotional states are described above.

In various implementations, the spoken command analyzer 1800 may use a single model to both identify a speaker and to determine what the speaker has said. A "joint" or "combined" speaker and content model models both person-specific and command-specific acoustic properties of a person's speech. The joint speaker and content model can be implemented using, for example, a phonetic model or a i-vector. An i-vector is a compact representation of a speaker's utterance. In various implementations, an i-vector for a short phrase (e.g. one lasting two to five seconds or two to three seconds) can be extracted from training data obtained either during an explicit enrollment process or passively collected as a person speaks while operating a device that includes the spoken command analyzer 1800. I-vector extraction can result in both text identification and speaker identification information being included in the i-vector. I-vectors allows for comparison between similarly constructed i-vectors extract from later-entered speech input.

The short (in terms of time duration) nature of the speech sample and joint analysis of content and speaker identification allows for essentially real time (or interactive-time) content and speaker determination without needing to access a remote speaker model. For example, device's user need not first verify her identity (e.g., by speaking a specific phrase) before speaking a command. Instead, the user can simply provide the command, which the device will use to verify whether the speaker is authorized to enter the command.

In various implementations, the spoken command analyzer 1800 can also be configured to associate particular vocal input with certain actions. For example, a device's user may specify that when she says "Shazam!" the device is to unlock her car door, but that the same utterance does not unlock the front door to the person's house. As another example, the person may specify that when she says "open sesame" the device is to unlock the liquor cabinet inside the her house. In these examples, should the person's I I-year old child speak the same commands, the device will recognize that the child is not authorized to enter these commands. The device can further be configured to inform the person that someone other than her has attempted to access the car or the liquor cabinet.

FIG. 18 illustrates an example implementation of a spoken command analyzer 1800. The spoken command analyzer system 1800 and its components can be implemented using software and/or hardware computer-readable modules, components, and/or data structures, as desired for a particular design or implementation. The example spoken command analyzer 1800 receives input samples 1830 from an audio capture device 1802. The audio capture device 1802 can be a device, such as a microphone, that is configured to detect and record sounds. In various implementations, the input samples may be in the form of natural language, that is, ordinary language as spoken by people to other people. An input sample 1830 that includes natural language may also be referred to as a "speech signal." As used herein, "natural language" may refer to, among other things, words, phrases, verbal expressions, and/or combinations thereof, in human speech, as distinguished from, for example, computer generated codes, such as Completely Automated Public Turing tests to tell Computers and Humans Apart (CAPTCHA).

In various implementations, the spoken command analyzer 1800 may include a front end module 1812 and aback end module 1820. The front end module 1812 in this example includes a speech recognizer 1814 subsystem. The speech recognizer 1814 may associate speech segments from an input sample 1830 with speech content, such as for example phonemic, phonetic, or lexical units such as phonemes, phones, tri-phones, or words. A "speech segment" is all or a part of a current input sample 1830 that forms a particular word or sound. A speech segment may also be referred to as a "time slice" or "frame" of the audio (speech) signal.

In various implementations, the spoken command analyzer 1800 associates individual speech segments from an input segment 1830 with phonetic or phonemic content. In doing so, the spoken command analyzer 1800 is able to capture speaker-specific characteristics (such as the speaker's pronunciations) of lexical units (e.g., phonemes, phones, tri-phones, tri-phone sequences, or other utterances). For example, if two speakers each say the word "car"-within other, non-matching speech content—and one speaker has a British accent while the other speaker has a Southern American accent, spoken command analyzer 1800 can inherently compare the audio signal for the word "car" (a tri-phone) for both speakers. In this way, the spoken command analyzer 1800 can distinguish between the two speakers by comparing portions of the audio signal that correspond to similar phonetic units, and thereby more accurately authenticate users. In contrast, traditional text-independent voice biometric systems, such as a Gaussian Mixture Model-Universal Background Model approach, does not leverage phonetic or phonemic information in speaker comparisons.

Thus in various implementations, the front end module 1812 may be configured to integrate the phonetic or phonemic content of the speech sample (e.g., "speech content") with the speaker recognition analysis. In other words, the content of the speech and the identity of the speaker are determined at the same time. Other systems may instead separately determine speech content and then determine speaker identification. Yet other systems may determine speech content and speaker identification at the same time but using separate processes, with the results being combined afterwards.

In various implementations, the speech recognizer 1814 extracts phone and/or phonemic content from an input sample 1830 The speech recognizer may then time-align the phone-level content of the input sample 1830 so that the phonemic or phonetic content of each speech segment can be determined in the context of the temporally preceding and/or subsequent phonemic or phonetic content. In these implementations, the speech recognizer 1814 may function as a partial speech recognizer in that it does not require, for example, language models or grammars. In various implementations, fully automated speech recognition system, which includes language models and grammars, can be used in place of, or in conjunction with, the example speech analyzer 1814.

In various implementations, the speech recognizer may include a neural network-based acoustic model 1816. The acoustic model 1816 may include a deep neural network that can be trained for automatic speech recognition using acoustic features derived from input speech samples 1830. Once trained, the deep neural network can be used to associate an input sample 1830 with phonetic content. The deep neural network can produce bottleneck features 1817. Bottleneck features are generally generated by a multi-layer perceptron that has been trained to predict context-independent monophone states. Bottleneck features can improve the accuracy of automatic speech recognition systems.

The speech recognizer 1814 in this example combines the bottleneck features 1817 with cepstral features 1818 that are separately derived from an input sample 1830. The combined bottleneck features 1817 and cepstral features 1818 can be used to create a joint speaker and content model of the current speech 1824, which is provided to the back end module 1820. The combination of bottleneck features 1817 and cepstral features 1818 can be used to generate a phonetic model (such as an i-vector), which can be used for both speaker identification and phonetic or text identification.

The bottleneck features 1817 and cepstral features 1818 may also be provided to a statistics generator 1819. The statistics generator 189 may generate speaker-specific statistics 1836 relating to the frequency of detected features. The statistics generator 1819 may rely on the universal background model (UBM) to generate the statistics 1836.

The model of current speech 1824 and statistics 1836 for an input sample 1830 are provided to the back end module 1820. In various implementations, the back end module 1820 includes a joint command/speaker recognizer 1822. The command/speaker recognizer 1822 may input the model of current speech 1824 and stored joint models 1826 into an analyzer 1828. As discussed further below, the analyzer 1828 may be configured to both determine the content of an input sample 1830 and to identify the speaker. The analyzer 1828 may subsequently output a command and speaker determination 1838.

The stored joint models 1826 may be generated from training data. In various implementations, the spoken command analyzer 1800 may be configured to enter a training phase, during which the spoken command analyzer 1800 collects training data. The spoken command analyzer 1800 may enter this phase automatically, for example upon recognizing an unknown speaker, upon receiving a command from another system that automatically determines that the spoken command analyzer 1800 should be trained, and/or upon receiving a command initiated by a user of the device.

During the training phase, models of current speech 1824, derived from training data, may be stored in the stored joint models 1826. Training data can be entered into the spoken command analyzer 1800 during an enrollment process, during which a person may be asked to speak particular phrases. Training data can then be derived from input samples 1830 generated from the spoken phrases. Alternatively or additionally, training data can be obtained passively while a person uses the device that includes the spoken command analyzer 1800. The stored joint models 1826 may model both content specific and speaker specific features (e.g., acoustic properties) extracted from a person's training data. The stored joint models 1826 may also be referred to as phonetic models.

During normal operation (that is, when not obtaining training data), the back end module 1820 may use the stored joint models 1826 to determine the content of an input sample 1830 and/or to determine the identity of a speaker. The back end module 1820 may subsequently output a command and speaker determination 1838 The command and speaker determination 1838 may include the content of an input sample 1830, such as a command or question. The command and speaker determination 1838 may also include the identity of the speaker, including whether the speaker is unknown. The command and speaker identification 1838 may be provided to other devices or systems that are configured to use this information.

To generate the joint command and speaker determination 1838, the back end module 1820 may include a joint command and speaker analyzer 1828. The analyzer 1828 may look for similarities between a current phonetic model (that is, a model of current speech 124) and stored phonetic model(s) (e.g. the stored joint models 1826). Specifically, the analyzer 1828 can compare the phonemic, phonetic, and/or lexical content (e.g. at the phone or tri-phone level) as produced by a specific speaker. In this, the analyzer 1828 does not rely on traditional acoustic features alone. For example, the command/speaker recognizer 1822 may use a probabilistic linear discriminant analysis (PLDA) to compare one or more phones or phonemic characteristics of the current phonetic model to one or more similar phones or phonemic characteristics of the stored phonetic model(s).

In another optional approach, during registration multiple samples of a command to be registered may be collected from a speaker. These samples can be used to create a command model, which may be added to the stored phonetic models. A detection threshold for this command model can be determined by comparing each of the samples against a model made from the remaining sample, so that a comparison score is created for each sample. A threshold for the command can then be determined using the average of these three scores. The threshold may be offset with a bias, and may be scaled with a set of parameters that are based on the samples. This example process for determining a threshold allows the system to accounting for variations in scores due to differing phonetic content of the command being registered.

FIG. 19 illustrates an example of a video analysis tool, specifically, a visual detection system 1900 configured to identify visual information, such as facial expressions, body language, and gestures, among other things. In various implementations, the visual detection system 1900 includes a number of computerized modules and data structures including a video classification system 1912, a video event model 1914, and a video capture device 1902. As discussed further below, the video classification system 1912 can develop and use the video event model 1914 to identify simple and complex events that likely are depicted in still and moving images (e.g., videos) provided by the video capture device 1902. In some cases, the images being provided by the video capture device 1902 are real-time, that is, being delivered as they are being captured. In other cases, the images being provided by the video capture device 1902 are pre-recorded. Once the event or events in the images are identified, the video classification system 1912 can generate a verbal description 1972 of the identified complex events, which may be formatted for use by other systems in the virtual personal assistant. Visual detection systems are also discussed in U.S. Pat. No. 9,244,924, titled "Classification, Search, and Retrieval of Complex Video Events," the entirety of which is incorporated by reference herein.

Generally, a simple event can be characterized by a small number of atomic events and/or other detected elements, such as scenes, actors (e.g., people or other living things), objects, audio, and/or text. Atomic events tend to be temporally localized, and can be associated with a short description. Examples of atomic events include facial expressions, such as smiling, grimacing, eye-rolling, and so on. Other examples of atomic events include physical gestures, such as pointing, waving, shrugging, and so on.

Complex events typically involve a related number of different atomic elements or concepts that have been combined in some fashion. For example, a complex event may include elements that have been juxtaposed (e.g., they may occur together, either in the same frame or in a sequence of frames of the video), that occur in a temporal sequence over the course of multiple images, or that occur in different temporal segments of a video, among other things. Some examples of complex events include events that involve an actor or multiple different actors interacting with other people, objects, or living things (e.g., a concert, a baseball game, a dog show, a trip to the zoo, a birthday party, or a dance recital). As an example, a "wedding ceremony" may consist of various atomic actions such as "hugging" and "kissing," which may occur together or at different times during a video. If, in a given video, "hugging" is detected as occurring in a church-like setting or a garden scene, objects such as a "ring" and "candles" are detected, and traditional wedding music is detected in the audio track, the video likely may depict a wedding ceremony. If, however, the "hugging" is detected as occurring along with "people jumping," an object such as a "ball" is detected, and a large cheering crowd is detected in the audio track, the video more likely may depict a team winning a sporting event rather than a wedding ceremony. By using intelligent, automated complex event detection and classification techniques, the visual detection system 1900 can distinguish between different types of complex events even when they contain some of the same atomic events or elements, and identify the complex event(s) that are most likely depicted therein.

In various implementations, the example video classification system 1912 can include a complex event recognition engine 1950, which may be able to recognize simple and complex events based on lower-level features that have been detected in input images, and an event handler 1958, which can recognize new complex events (e.g., complex events that were previously undefined in the video event model 1914) without having to perform lower-level feature recognition.

In various implementations, the complex event recognition engine 1950 includes a feature recognition module 1952, a semantic representation module 1954, and a complex event classification module 1956. The feature recognition module 1952 can employs a number of automated feature recognition algorithms to detect lower-level features of interest in input images, and may engage a feature vocabulary 1960 to recognize the low-level features. "Low-level features" may mean visual features that capture characteristic shapes and motion without significant spatial or temporal variations between different instances of the features. In some implementations, both static and dynamic low-level visual features are used. Static visual features include features that are extracted from individual key images at a defined extraction rate (e.g., 1 image/second). Some examples of static visual feature detectors include Gist, Scale-Invariant Feature Transform (SIFT), and colorSIFT. The Gist feature detector can be used to detect abstract scene and layout information, including perceptual dimensions such as naturalness, openness, roughness, etc. The SIFT feature detector can be used to detect the appearance of an image at particular interest points without regard to image scale, rotation, level of illumination, noise, and minor changes in viewpoint. The colorSIFT feature detector extends the SIFT feature detector to include color keypoints and color descriptors, such as intensity, shadow, and shading effects.

Dynamic visual features include features that are computed over horizontal, vertical, and time (x-y-t) segments or windows of the input images. Dynamic feature detectors can detect the appearance of actors, objects and scenes as well as their motion information. Some examples of dynamic feature detectors include MoSIFT, Spatia-Temporal Interest Point (STIP), Dense Trajectory based Histograms of Oriented Gradients (DFT-HOG), and Dense-Trajectory based Motion Boundary Histogram (DTF-MBH). The MoSIFT feature detector extends the SIFT feature detector to the time dimension and can collect both local appearance and local motion information, and identify interest points in the input images that contain at least a minimal amount of movement. The STIP feature detector computes a spatia-temporal second-moment matrix at each image point using independent spatial and temporal scale values, a separable Gaussian smoothing function, and space-time gradients. The DTF-HOG feature detector tracks two dimensional interest points over time rather than three dimensional interest points in the x-y-t domain, by sampling and tracking feature points on a dense grid and extracting the dense trajectories. The Histogram of Gradients (HoGs) are computed along the dense trajectories to eliminate the effects of camera motion. The DTF-MBH feature detector applies the MBH descriptors to the dense trajectories to capture object motion information. The MBH descriptors represent the gradient of optical flow rather than the optical flow itself Thus, the MBH descriptors can suppress the effects of camera motion, as well. However, Histograms of Optical Flow (HOF) may be used, alternatively or additionally, in some implementations.

The feature recognition module 1952 quantizes the extracted low-level features by feature type using a feature-specific vocabulary 1960. In some implementations, the feature vocabulary 1'260 or portions thereof are machine-learned using, for example k-means clustering techniques. In some cases, the feature vocabulary 1960 may include a smaller vocabulary size (e.g., 1000 words) for static features and a larger vocabulary (e.g., 10,000 words) for dynamic (e.g., motion) features. The feature recognition module 1960 may aggregate the quantized low-level features by feature type, by using, for example, a Bag-of-Words (BoW) model in which a frequency histogram of visual words is computed over multiple of the input images.

In some implementations, the semantic representation module 1954 can apply event classifiers 1964, such as Support Vector Machine (SVM) classifiers, directly to the BoW features, and the complex event classification module 1954 uses various data fusion strategies (e.g., early and late fusion) to identify complex events 1926 based on the fused low-level features. In some implementations, the semantic representation module 1954 can perform concept detection based on the low-level features and the complex event classification module 1956 determines the complex events based on the detected concepts. More specifically, the semantic representation module 1954 uses one or more concept classifiers 1962 to analyze the low-level features and derive therefrom semantic elements 1928, which represent the higher-level concepts or atomic elements including scenes, actions, actors, and objects, as described above. The complex event classification module 1956 can apply one or more of the event classifiers 1964 to the semantic elements 1928 to determine the complex events 1926 that are likely associated with the detected semantic elements 1928. In various implementations, the concept classifiers 1962 and/or event classifiers 1964 may be manually specified and/or derived using machine learning techniques.

In some implementations, the video classification system 1912 can detect the presence of a variety of different types of atomic elements in input images, including audio, text, and geographic locations, in addition to the more typical visual features (e.g., actors, objects, scenes, actions). To do this, the complex event recognition engine 1950 may interface with an automated speech recognition (ASR) system 1966 and/or an optical character recognition (OCR) system 1968. For instance, the ASR system 1966 may identify spoken words present in a video's audio track and provide a text translation of the spoken words to the complex event recognition engine 1950. The OCR system 1968 may recognize text that is present in a visual scene of the video and provide the recognized text to the complex event recognition engine 1950. For example, the OCR system 1968 may be used to detect words or phrases displayed on apparel, street signs, or buildings that are depicted in the input images. The complex event recognition engine 1950 may also be provided with non-visual features that may not be directly derived from input images. For instance, some devices are equipped with an integrated geolocation system (such as a Global Positioning System (GPS) sensor) and/or other sensors that can detect geographic location, motion, and/or other real-time sensed information. Video camera applications for such devices may access the GPS data (or other real-time data) and automatically associate it with a images at the time the image is created. Data fusion techniques may be used by the complex event recognition engine 1950 to combine these alternative visual and non-visual features with the more traditional visual features produced by the feature recognition module 1952. In this way, the complex event recognition engine 1950 can utilize a variety of visual and non-visual features to identify complex video events.

The example video event model 1914 may initially be developed using on training images, that is images that are known to depict certain events. As new images are classified by the complex event recognition engine 1950, the video event model 1914 can be updated, either manually or through machine learning techniques. Some input images may depict events with which the video event model 1914 is not already familiar (e.g., events for which there are no training examples recognized in the video event model 1914). These events may be referred to as "new events." The event handler 1958 can classify new events based on a semantic description of the event, rather than requiring the input images to be processed by the complex event recognition engine 1950 or otherwise be explicitly defined. Such a description may be supplied by a person, in the form of annotations or tags, and/or a manually defined concept vector. As a simple example, a semantic concept space may include a number of dimensions each representing predefined concepts that tend to be indicators of different types of complex events.

For example, a semantic concept space may be defined as: [indoor event, outdoor event, kitchen, person kissing, vehicle moving, hands visible, placing fillings on bread, spreading cream, jumping over obstacles, person pointing]. Based on a viewing of input images depicting "making a sandwich," a corresponding concept vector may be estimated, using the above example, as: [1, 20 0, 1, 0, 0, 1, 1, 1, 0, 0], where each binary value indicates the presence or absence of the concept dimension in the video (1=present, 0=absent). In some implementations, these binary values may be enhanced by computing the semantic similarity between pairs of concepts. For example, the atomic action "dancing" may or may not be an indicator of a "wedding ceremony" (e.g., depending on the type of ceremony). Therefore, a multi-value indicator, rather than a binary indicator, may be used, in some implementations. The multi-value indicator may be determined based on the semantic similarity of "dancing" to other co-occurring concepts.

The concept vector for the new event may be defined by a person, or be generated by the event handler 1958 based on information supplied by a person or information obtained from a stored data source 1970. As an example, a person may create a video of a fishing trip and give it the title, "fishing trip." With this information, the new event handler 1958 may consult the stored data sources 1970 to identify concepts that are commonly associated with fishing trips, and then generate a concept vector for the video based on that information. With the semantic description of the new event represented as a concept vector in the semantic concept space, the event handler 1958 can determine whether input images depict a particular complex event by computing the semantic similarity or semantic affinity of dimensions of the video's concept vector to the semantic elements in the concept space. To do this, a semantic affinity matrix of concepts derived from stored data sources 1970 such as WORDNET or WIKIPEDIA, or computed from video training examples, may be used.

The example video event mode 1914 can include one or more computer-accessible data and/or programming structures (e.g., vectors, matrices, databases, lookup tables, or the like), and may include one or more indexed or otherwise searchable stores of information. The video event model 1914 may contain or reference data, arguments, parameters, and/or machine-executable algorithms that can be applied to input images being classified by the video classification system 1912.

The example video event model 1914 includes a global model 1922 and video-specific models 1924. The global model 1922 can include, at a general level that can be applied to a variety of different types of input images, semantic information about various types of complex events 1926 and atomic elements or "concepts" 1928 associated therewith For example, the semantic elements 1928 include semantic descriptions of actors (e.g., persons or other living things), scenes, actions, objects, audio, text, and geographic locations. The global model 1922 may also maintain indicators of the determined evidentiary significance of each of the semantic elements 1928 to the various types of complex events 1926. In some implementations, these indicators are gleaned by the video classification system 1912 using machine learning techniques applied to a number of training videos depicting the various types of complex events 1926. For example, training videos depicting a "person making a sandwich" (a complex event) may indicate that semantic elements such as "kitchen" (scene), "hands visible" (actor), "placing fillings on bread" (action) and "spreading creamy substance" (action) are highly likely to be associated with a person making a sandwich, while other atomic elements such as "outdoor event," (scene), "vehicle moving" (action) or "person jumping" (action) are unlikely to be associated with that particular complex event. Alternatively or additionally, one or more of these indicators may be developed based on information that is manually supplied. For instance, a person viewing a video of someone making a sandwich may conclude that "slicing bread" (action) is an atomic element that is highly likely to indicate a person making a sandwich, and may add that indicator to the video event model 1914 manually.

The video-specific models 1924 contain information relating to the actual instances or occurrences of the various complex events 1926 and the semantic elements 1928 that are associated with those complex events. That is, for a set of input images, the video-specific model 1924 may contain information about instances of semantic elements 1928 detected in the input images by type (e.g., actors, scenes, actions, objects, audio, text, or geographic location) and information about each complex event 1926 detected in the input images. Further, the video-specific model 1924 can map the complex event and semantic element information to the location(s) in the images at which they occur (e.g., frame number). In some implementations, a video-specific model 1924 may indicate whether a semantic element is present or absent in input images in discrete manner (e.g., 1=present, 0=absent), while in other implementations, an evidentiary value defined with reference to a range of possible values (e.g., a probabilistic or statistical likelihood or confidence) may be assigned.

In some implementations, the video event model 1914 can include or reference ontological information, which may indicate relationships between words and phrases that are commonly used by people to describe the various complex events 1926 and semantic elements 1928. For instance, whereas the video classification system 1912 may be programmed to recognize an action as "slicing bread," a person manually tagging the same video may use the phrase "cutting a slice of bread." Accordingly, the video event model 1914 may include an indication that these two phrases are semantically similar. As such, the video event model 1914 may include semantic information that describes the meanings of different words and phrases that may be associated with the complex events 1926 and/or the semantic elements 1928, their properties, and the relationships between or among the different complex events 1926 and semantic elements 1928 represented in the model. In some implementations, the video event model 1914 may be updated continuously as new images are analyzed, as new complex events are learned, and/or as new user feedback is received.

FIG. 20 illustrates an example of a video analysis tool, here embodied as a system 2000 for determining a person's characteristics and/or emotional state from visual cues about the person. A person's characteristics and/or emotional state can be used to adjust the "personality" of a system, such as a virtual personal assistant, that is responding to the person. For example, the manner in which output is formulated and presented to the person can be adjusted, as well as the timing of the output. Additionally, the characteristics and/or emotional state can be used to as a factor in determining the person's intent. For example, an angry tone of voice may modify words that could otherwise be interpreted as positive or even happy. Systems for determining a person's characteristics and emotional state are also described in U.S. Pat. No. 9,213,558, the entirety of which is incorporated by reference herein.

The example system 2000 generally includes one or more feature extractors 2006, a feature combination and conditioning module 2010, and one or more classifiers 2012. The feature extractors 2006 may receive visual input from an image capture device 2002. The classifiers 2012 may output various characteristics 2016 in a format that can be used by other devices or systems. The system 2000 of FIG. 20 is presented as one example of a system configured to determine a person's characteristics and/or emotional state from visual input, and other systems using similar components, fewer components, more components, or different components are possible.

An image capture device 2002 is a device, such as a camera, that is capable of sensing and recording visual images. The image capture device 2002 may be able to record still images (e.g. photographs) and/or moving images (e.g. video). The image capture device 2002 may further be able to convert captured images into a format that can be used by the rest of the system 2000. For example, the image capture device 2002 may be configured to convert still images into a digital image file (e.g. a Tagged Image File Format (TIFF), Joint Photographic Experts Group (JPEG), Graphic Interchange Format (GIF), Portable Network Graphics (PNG) file or a file formatted using some other method). As another example, the image capture device 2002 may be configured to output digital video, such as for example Moving Picture Experts Group (MPEG) video or Advanced Video Coding (AVC) video.

In various implementations, the image capture device 2002 can be configured to capture certain aspects of a person and/or the person's environment. For example, the image capture device 2002 can be configured to capture images of the person's face, body, and/or feet. Alternatively or additionally, the image capture device 2002 can be configured to capture images of areas that may be within the person's field of view and/or behind the person. The captured images may be provided to the feature extractors 2006 as image data.

The feature extractors 2006 may be implemented using processing devices configured to extract features from an audio input signal. Various examples of feature extractors 2006 are provided in this example, including a face detection and feature extractor 2006a, an eye gaze detection and feature extractor 2006b, a visual appearance feature extractor 2006c, and a body movement feature extractor 2006n. In various implementations, the system 2000 may include other visual feature extractors, not illustrated here. In various implementations, the example extractors 2006 illustrated here can be combined, can be separated into multiple modules, and/or can extract other audio-related features.

Features extracted by the face detection and feature extractor 2006a may be used to determine the general appearance of the person's face as well as any facial expressions made by the person. These features include, for example, features of the face and/or facial elements (e.g., mouth, eyebrows, eyes, head, etc.) such as color, shape, texture, position, orientation, movement, and so on. These features may also include, for example, the color, shape, and texture of a person's hair (or lack thereof), head coverings worn by the person (e.g., hat, scarf, etc.), facial coverings (e.g., eyeglasses, sunglasses, masks, hijab), and facial jewelry (e.g., earrings, nose ring, etc.). In some implementations, this information can be extracted by detecting the person's face and performing principal component analysis (PCA) on the face region. In some implementations, temporal components of some of these features may also be extracted.

Features extracted by the eye gaze detection and feature extractor 2006b can be used to determine where a person is looking. This information can be used to determine how attentive a person is to the system or the system's output. Alternatively or additionally, this information can be used to identify an object that the person is looking at. Extracted features include, for example, whether the person is looking at the system display, what percentage of the time the person spends looking at the display, what parts of the display the person focuses on, how close the person's focus is to the desired areas of focus, and what percentage of the time the person spends looking at the desired area of focus. Extracted features can also include, for example, the direction a person is looking when speaking particular words (e.g. "what is that?") and objects detected as probably being within the person's field of view.

Features extracted by the visual appearance feature extractor 2006c can be used to make determinations background, occupation, current activity (e.g., swimming, sleeping), or emotional state (e.g. disheveled). Features extracted include, for example, data about the area below the person's face (e.g. the neck and chest area, the lower torso, or feet). The visual appearance of this area, including the choice of clothing, the style in which the clothing is worn, and the presence of specific jewelry (e.g., religious jewelry), can be used to aid in characterizing the person. Appearance patterns in this area can be extracted by collecting shape, color, and texture features and applying statistical pattern recognition methods. Features extracted by the visual appearance feature extractor 2006c can further include the style and condition of the user's footwear (which may be strongly associated with the user's socioeconomic group). Appearance patterns in this area can be extracted by collecting shape, color, and texture features and applying statistical pattern recognition methods.

Features extracted by the body movement feature extractor 2006d include, for example, the pose or motion of the person's head, arms, hands, legs, and feet as a function of time. This information can be used to determine, for example, whether a person is agitated or calm, whether a person is indicating agreement or disagreement, whether the person is pointing and possibly also what the person is point at, and the person's current activity (e.g., walking, sitting), among other things.

The feature combination and conditioning module 2010 may be implemented as a processing device, configured to combine and condition the features that are extracted by the feature extractors 2006. In some implementations, multiple features are combined at different levels and can be modeled as joint features, which allows statistical models to account for dependencies and correlations. For example, a first group of features can be conditioned on a second group of features at specific events. For example, a good prosodic feature for frustration is the pitch taken specifically from the longest (relative to its intrinsic duration) vowel region in an utterance (i.e., not the pitch everywhere, but rather the pitch when the user stretches out a word).

The classifiers 2012 may be implemented using processing devices configured to generate conclusions about a person based on the combined and conditioned features provided by the feature combination and conditioning module 2010. FIG. 20 illustrates various examples of classifiers 2012, including an age classifier 2012a, a gender classifier 2012b, a socioeconomic classifier 2012c, and an emotion classifier 2012n. The age classifier 2012a can make a conclusion with respect to the age characteristics of the person. The conclusion can be general (e.g., the person is a child or the person is an adult) or relatively specific (the person is between the ages of 25-30). The gender classifier 2012b can make a conclusion with respect to the gender of the person. The conclusion may not be as simple as "male" or "female," and may include "transgender" or "unknown," as may be the case for some children. The socioeconomic classifier 2012c can make a conclusion with respect to the socioeconomic group of the person. The emotion classifier 2012n can make a conclusion with respect to the current emotional or affective state of the person.

Each classifier 2012 outputs a respective characteristics, such as an age characteristics 2014a, a gender characteristic 2014b, a socioeconomic characteristic 2014c, and/or an emotion characteristic 2014n. The characteristics 2014 may be output in a format that can be used by another system. For example, the characteristics 2014 can be represented by program code, and can be output as binary coded data.

In various implementations, specific types of classifiers may be implemented in the classifiers 2012. For example, statistical classifiers can be implemented and trained to perform classification of characteristics and emotional states (e.g., by generating a probability distribution over user characteristics and states). Statistical classifiers may be useful in performing classification based on the duration events, frequency and pitch, energy, and visual characteristics. Probability distributions generated by statistical classifiers for various characteristics can be combined to obtain a final estimate of characteristics and emotional states. As another example, training-based classifiers may try to match principal component analysis and/or object or pattern recognition results to trained models, where the models correspond to defined characteristics and emotional states.

FIG. 21 illustrates an example of video analysis tool, specifically, an iris processor 2100, which can be used to determine iris biometrics. In various implementations, the iris processor 2100 includes a pre-processor 2110, a coding processor 2130, and a matching processor 2140. The iris processor 2100 may receive an iris image 2104, possibly extracted from a larger image. The iris image 2104 (or the larger image) may be provided by a video capture device 2102. The iris processor 2100 may output a matched iris 2160, determined from a remote or local database.

In various implementations, the iris image 2104 includes at least one eye, with the iris and pupil at least partially visible. In various implementations, the iris processor 2100 may attempt to match the eye captured in the iris image 2104 with an image stored in a local or remote database. In various implementations, the iris image 2104 is compared to stored images using Hamming distances between the iris image 2104 and a stored image. In some implementations, the iris image 2104 is an infrared image. In some implementations, the iris image 2104 is provided in the ordinary visible light spectrum, that is, as a red-green-blue (RGB) image.

An iris image 2104 may not be a perfect image of an iris, and may have variable iris/pupil and iris/sclera contrast, small eyelid openings, and/or non-frontal iris presentations. The pre-processor 2110 may segment and normalize the iris in the iris image 2104, and output a modified iris image with clearly delineated iris boundaries and synthesized quasi-frontal presentation. For example, when the iris in the iris image 2104 was rotated towards the left, right, up, or down, the pre-processor 2110 may synthesize an iris on the iris image 2104 as if it were positioned directly frontally. Similarly, a frontally positioned pupil can be synthesized on the skewed or rotated pupil of the iris image 2104.

The coding processor 2130 can analyze and encode iris information from the iris image generated by the pre-processor 2110. The iris image 2104 may vary in resolution, quality, and/or state of focus. Hence, the coding processor 2130 may encode the iris information at a range of spatial scales so that structural iris information contained in the iris image 2104 can be robustly represented. The information content of the resulting code will vary depending on the characteristics of iris image 2104. The code for the iris image 2104 that is generated by the coding processor 2130 can provide spatial interpolation to facilitate iris code alignment by the matching processor 2140.

The matching processor 2140 can align the code generated by the coding processor 2130 to a stored iris code template. The matching processor 2140 may perform this alignment using estimated residual distortion of the code generated by the coding processor 2130. In some implementations, a "barrel shift" algorithm may be employed to perform the alignment. In some cases, normalization by the pre-processor 2110 may be insufficient. In these cases, the matching processor 2104 may compensate by applying constraints to the alignment process. In all cases, the matching process 2104 may register structural correspondences, and can compare the aligned codes to determine whether a match exists. When a match is found, the matching processor returns matched iris data 2160. In various implementations, the iris data 2160 may be used by other systems in a virtual personal assistant.

As illustrated in FIG. 21, in various implementations, the pre-processor 2110 receives the iris image 2104 and outputs a rectified iris image 2106. The rectified iris image 2106 can correct for uncontrolled capture scenarios such as ambient illumination conditions, varied illumination geometries, reduced eyelid opening area, presentation angle (obliquity), or other variations from an ideal image. In various implementations, the pre-processor 2110 can adjust the rectified iris 2106 to suit the matching algorithm used by the matching processor 2140. In various implementations, the pre-processor 2110 includes a segmentation module 2112 and a correction module 2120.

The segmentation module 2112 can correct the input iris image 2104 for low-contrast pupil and iris boundaries. The image produced by the segmentation module 2112 can be provided to the correction module 2120 for further correction. In various implementations, segmentation module 2112 includes an edge detection module 2114, a pupil segmentation module 2116, and an iris segmentation module 2118. The edge detection module 2114 can be used to detect pupil and iris boundaries. The pupil segmentation module 2116 can calculate the pupil boundary region, and may insert an artificial black colored pupil in the pupil boundary region. The pupil segmentation module 2116 may also warp oblique irises and pupils to be circular. The iris segmentation module 2118 can calculate the iris boundary. The iris segmentation module 2118 can further normalize the diameter of the iris, using, for example, a range of estimates derived from an autofocus setting of the camera that provided the iris image 2104.

In various implementations, the correction module 2120 can include a tilt correction module 2122 and a corneal correction module 2124. The tilt correction module 2122 may rectify images where the iris image 2104 was captured at an oblique angle (e.g., the person was looking down or sideways). The tilt correction module 2122 can provide a tilt-corrected image by estimating the tilt angle of the iris with respect to the camera orientation. The corneal correction module 2124 can correct for distortions in the iris image 2104 caused by the optical effect of the cornea and the anterior chamber of the eye through which the iris was imaged. The two structures together can have the optical effect of a single water-filled plano-convex lens in contact with the iris. Viewed from an oblique angle, such a lens will produce asymmetric distortion in the iris image 2104, compressing the image in some areas and expanding it in others. The corneal correction module 2124 can correction for this distortion.

In various implementations, the coding processor 2130 includes a coordinate module 2132. The coordinate module 2132 can transform the rectified iris image 2106 into a polar iris image 2134. The polar iris image 2134 may be oriented so that the pupil boundary appears at the top and the iris-sclera boundary area appears at the bottom. In some cases, the upper eyelid and/or eyelashes may be visible in the polar iris image 2134, in some cases partially obstructing the iris.

After converting the rectified iris image 2106 into a polar iris image 2134, the polar iris image 2134 is provided to the extraction module 2136. The extraction module may filter and subsample the polar iris image 2134 to produce a multi-resolution iris code 2108 representation of the iris. In various implementations, the extraction module 2136 may pass the iris image through a series of bandpass filters to produce a set of filtered images.

In various implementations, the matching processor 2140 comprises an alignment module 2142 and a flow estimation module 2144. The iris code 2108 generated by the coding processor 2130 is provided to the alignment module 2142. The alignment module 2142 can perform various alignments to the iris code 2108 based on the matching algorithms described below. The alignment module 2142 can further provide the iris code 2108 to the flow estimation module 21444 to generate estimated flow vectors to aid in matching. The alignment module 2142 compares the iris code 2108 to a stored iris code 2146 from a database 2148 to determine whether a match exists. If a match does not exist, more iris codes from the database 2148 are compared with the iris code 2108. Match scores are determined, and if the match score meets or is below a predetermined threshold, then a match exists. In some implementations, a Hamming distance is used as a match score. The matched iris data 2160 is returned by the matching processor 2140. In some implementations, flow estimation is applied to information derived from the unknown iris code 2108 and the stored iris code 2146. This information may be part of the iris code 2108 per se or it may not. The resulting flow field from the flow estimation module 2144 is used to generate a modified iris code that is matched against a reference iris code by the matching processor 2140 to produce a match score 2150.

In a binary context, such as when comparing iris codes, a Hamming distance represents a binary distance based on logical exclusive-or (XOR) operations to computes the number of bits that differ between two binary images. In some implementations, the alignment module 2142 performs a Daugman barrel shift on the iris codes, that is, finds the iris code rotation that provides the best match between the iris codes being compared. In some implementations, the matching algorithm employed by the matching processor 2140 is a modified algorithm using the Hamming distance for each set of barrel shift positions and taking the lowest Hamming distance as the score for that pair of codes. If the score is below some threshold (that may be adjusted based on the estimated number of statistical degrees of freedom represented by the codes) then the unknown code is deemed to be a match. If the Hamming distance is above the threshold then the unknown code is labeled an impostor. In some implementations, the threshold depends on details of the iris code structure and on the statistical requirements of the matching scenario.

The modified algorithm employed by the alignment module 2142 barrel shifts the iris codes being compared and also locally aligns the iris codes to each other to compensate for inaccuracies in iris image normalization due to uncorrected optical distortion or complexities of iris dilation and contraction. The local alignment function, performed by the alignment module 2142, allows compensation for distortions in the input iris image that are not uniform across the iris. This is accomplished by shifting local regions of the code to bring them into more accurate alignment with corresponding regions of the reference code. If this process is performed using very small estimation regions, virtually any iris code can be made to match any other iris code which will result in false matches being generated.

This false matching problem can be avoided to imposing suitable smoothness conditions on the estimated flow field. For example, if the flow field is estimated by performing local translation estimation using relatively large estimation regions then the local flow estimates will represent the average motion over this relatively large region. If such regions overlap, so that the regions used to compute the flow vectors for neighboring locations contain much of the same content, then the displacement estimates will change gradually with position and false matching will be prevented. Alternatively, local displacement estimates made with small estimation regions can be smoothed by spatial filtering to eliminate rapid changes in local displacement. As a further alternative, a global parametric representation such as a low order polynomial or truncated Fourier series can be used, and 50 the parameters of this parametric representation estimated directly or fit to local estimates. Such parametric representation has inherent smoothness properties that prevent too rapid change in local shifts to occur. The alignment module 2142 further produces multiple match scores for each comparison, between the iris code 2104 and the stored iris code 2146 for example, because each iris code contains multiple frequency bands.

FIGS. 16-21 above provide examples of systems for analyzing audio and image input in various ways. These systems can determine possible different meanings in the audio and images, including words, emotions, biometrics, gestures, and so on. While human conversation can be reduced to discrete components in this fashion, in reality people rely on combinations of information in order to understand each other. For example, a person may speak words that indicate interest in a topic, but the person's facial expression may indicate disinterest. Human conversation can also be dynamic, and people's intentions and emotional states can change over the course of a conversation. For example, a conversant may become agitated based on what another conversant says or does, or may become calmer.

In various implementations, a virtual personal assistant can include multi-modal, multi-temporal system that can account for the dynamic nature of human interactions. A multi-modal system can include a dynamic model, which can recognize temporal interaction sequences of behavioral cues or "markers" and can consider the relative significance of verbal and non-verbal communication. The dynamic model can take into account a variety of different non-verbal inputs, such as eye gaze, gestures, rate of speech, speech tone and loudness, facial expressions, head pose, body pose, paralinguistics, and/or others, in addition to verbal inputs (e.g., speech), in detecting the nature and/or intensity of the behavioral cues. Additionally, the model can consider the behavioral cues over multiple time granularities. For example, the model can consider the verbal and/or non-verbal behavior of various individuals involved in the interaction over short-term (e.g., an individual action or event occurring within a matter of seconds), medium-term (e.g., a greeting ritual lasting several seconds or longer), and/or long-term (e.g., a longer segment of the interaction or the interaction as a whole, lasting several minutes or longer) time scales.

Figure 22:
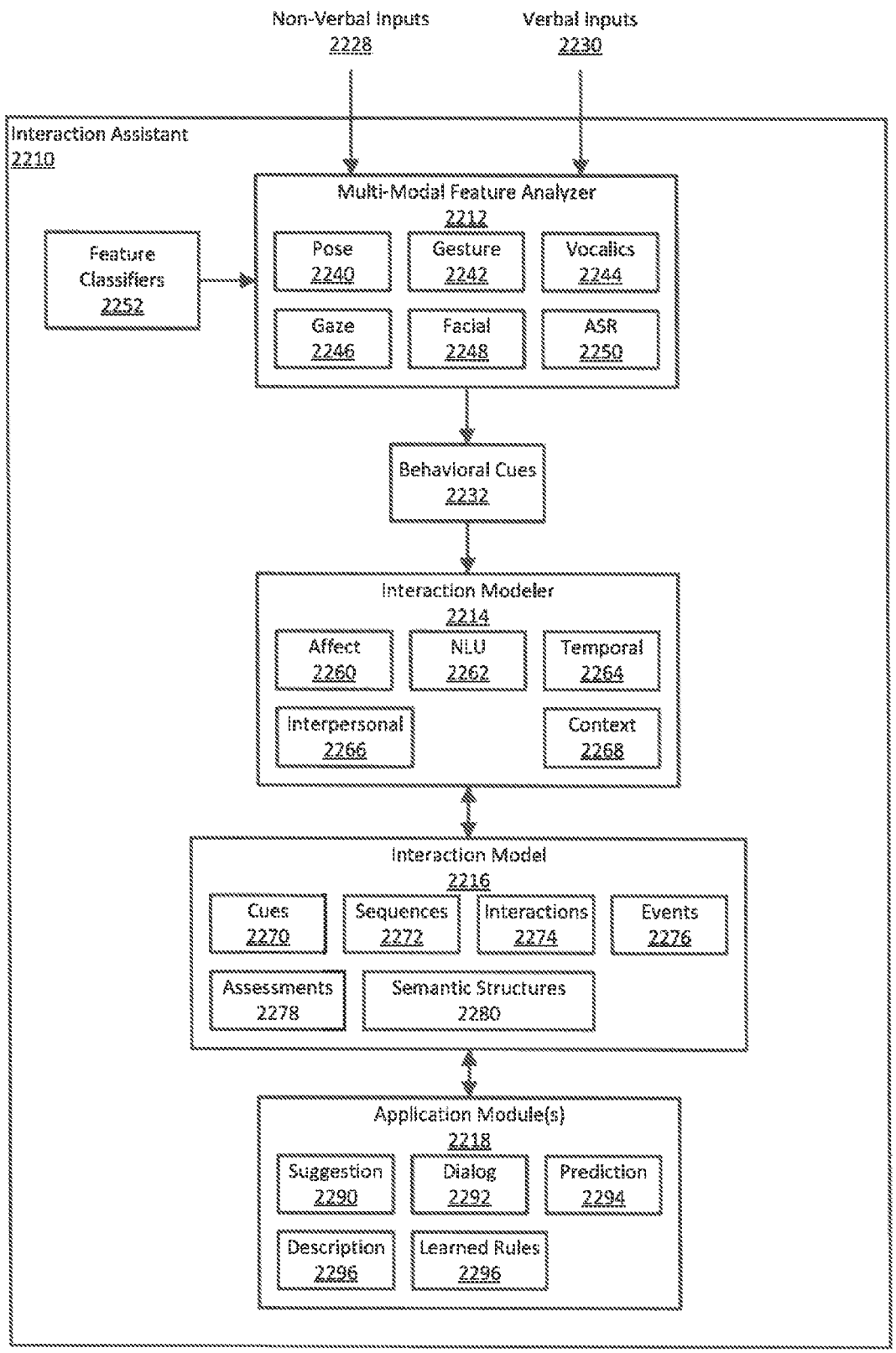
FIG. 22 illustrates an example of an interaction assistant.

FIG. 22 illustrates an example of an interaction assistant 2210. An interaction assistant 2210 can be configured to analyze and interpret both verbal 2230 and non-verbal 2228 inputs and identify therefrom the various types of verbal and/or non-verbal behavioral cues 2232 that may be expressed by a person who has provided the input. In various implementations, the verbal 2230 and non-verbal 2228 inputs can be provided by the various analysis and input format tools discussed above. As such, the verbal 2230 and non-verbal 2228 inputs can include, for example, text provided by an automatic speech recognition system, description emotions detected from speech, descriptions vocal biometrics, descriptions objects and/or faces recognized in images, descriptions of emotions and/or body language detected in images, descriptions of iris biometrics, typed text, commands entered through a graphical user interface, and/or touchscreen gestures, among other things. Each of these inputs can be described as a mode, or a combination of modes. Multi-modal systems that include an interaction assistant are also discussed in U.S. Pub. No. 2014/0212854, titled "Multi-Modal Modeling of Temporal Interaction Sequences," the entirety of which is incorporated by reference herein.

"Cues," as used herein, generally means human responses to internal and/or external stimuli, such as expressive or communicative indicators of a person behavioral, emotional, or cognitive state, and/or indicators of different phases, segments, or transitions that occur during the person's interaction with a virtual personal assistant. For example, an indication that the person has made eye contact may indicate an amicable interaction, while an indication that the person is looking away may indicate boredom or distraction during part of the interaction. Similarly, a sequence of cues involving eye contact followed by a handshake may indicate that a greeting ritual has just occurred or that the interaction is about to conclude, depending upon the time interval in which the sequence occurred (e.g., within the first few seconds or after several minutes).

The example interaction assistant 2210 can assess the nature and/or efficacy of a virtual personal assistant's interaction with a person in a number of different ways during, at and/or after the conclusion of the interaction, based on its analysis of the behavioral cues 2232 over one or more different time scales. Alternatively or additionally, using the behavioral cues 2232, the interaction assistant 2210 can assess the cognitive and/or emotional state of a person over the course of an interaction, as well as whether and how the person's state changes over time. Using multiple different time scales, the interaction assistant 2210 can assess the relative significance of different behavioral cues 2232 in the context of different segments of the interaction; that is, as compared to other behavioral cues (including those expressed by other participants), and/or in view of the time interval in which the cues occurred relative to the total duration of the interaction. These and other analyses and assessment(s) can be performed by the interaction assistant 2210 "live" (e.g., while the interaction is happening, or in "real time") and/or after the interaction has concluded.

In general, an interaction between a person and a virtual personal assistant-enabled device may take the form of an exchange of verbal and/or non-verbal communication. In some cases, the interaction may involve multiple people interacting with each other as well as the virtual personal assistant. The interaction may occur whether or not all of the participants are at the same geographic location. For example, one or more of the participants may be involved in the interaction via videoconferencing, a webcam, a software application, and/or in some other fashion.

In various implementations, the interaction assistant 2210 can be implemented as a number of computerized modules and data structures, including a multi-modal feature analyzer 2212, an interaction modeler 2214, an interaction model 2216, one or more application modules 2218, and one or more feature classifiers 2252. The multi-modal feature analyzer 2212 can apply the feature classifiers 2252 to the non-verbal inputs 2228 and the verbal inputs 2230 to identify therefrom the behavioral cues 2232 expressed by a person during an interaction. In some implementations, the feature classifiers 2252 are include statistical or probabilistic algorithms that, for example, take an input "x" and determine a mathematical likelihood that x is similar to a known feature, based on "training" performed on the classifier using a large number of known samples. When a match is found for the input x with a high enough degree of confidence, the data stream is annotated or labeled with a description that corresponds to the matched data. In some implementations, one or more of the classifiers 2252 can be configured to detect the behavioral cues 2232 over multiple time scales, as described further below. Similar types of classifiers, and/or others, may be used to recognize facial expressions and/or other behavioral cues 2232.

The example multi-modal feature analyzer 2212 can include a number of sub-modules or sub-systems, including a pose recognizer 2240, a gesture recognizer 2242, a vocal feature recognizer 2244, a gaze analyzer 2246, a facial feature recognizer 2248, and an automated speech recognition system 2250, among others. These sub-modules can process streams of different types of multi-modal data to recognize the low-level features depicted therein or represented thereby. Such processing may be done by the various sub-modules or sub-systems in parallel (e.g., simultaneously across multiple modalities) or sequentially, and independently of the others or in an integrated fashion. For instance, early and/or late fusion techniques may be used in the analysis of the multi-modal data. In general, early fusion techniques fuse the multi-modal streams of data together first and then apply annotations or labels to the fused stream, while late fusion techniques apply the annotations or labels to the separate streams of data (e.g., speech, body pose, etc.) first and then fuse the annotated streams together.

In implementations in which a person's body pose, head pose, and/or gestures are analyzed, the pose recognizer 2240 and gesture recognizer 2242 can process depth, skeletal tracing, and/or other inputs (e.g., x-y-z coordinates of head, arms, shoulders, feet, etc.) generated by image analysis tools, extract the low-level features therefrom, and apply pose and gesture classifiers (e.g., Support Vector Machine (SVM) classifiers) and matching algorithms (e.g., normalized correlations, dynamic time warping, etc.) thereto to determine the pose or gesture most likely represented by the inputs 2228, 2230. Some examples of such poses and gestures include head tilted forward, head tilted to side, folded arms, hand forward, standing, hand to face, hand waving, swinging arms, etc. In some implementations, the pose analyzer 2240 may use these and/or other techniques similarly to classify body postures in terms of whether they appear to be, for example, "positive," "negative," or "neutral."

In implementations in which one or more participant's vocal features (e.g., non-speech features and/or paralinguistics such as voice pitch, speech tone, energy level, and OpenEars features) are analyzed, the vocal feature recognizer 2244 can extract and classify the sound, language, and/or acoustic features from the inputs 2228, 2230. In some implementations, voice recognition algorithms may use Mel-frequency cepstral coefficients to identify the speaker of particular vocal features. Language recognition algorithms may use shifted delta cepstrum coefficients and/or other types of transforms (e.g., cepstrum plus deltas, ProPol 5th order polynomial transformations, dimensionality reduction, vector quantization, etc.) to analyze the vocal features. To classify the vocal features, SVMs and/or other modeling techniques (e.g., GMM-UBM Eigenchannel, Euclidean distance metrics, etc.) may be used. In some implementations, a combination of multiple modeling approaches may be used, the results of which are combined and fused using, for example, logistic regression calibration. In this way, the vocal feature recognizer 2244 can recognize vocal cues including indications of, for example, excitement, confusion, frustration, happiness, calmness, agitation, and the like.

In implementations in which one or more participant's gaze is analyzed, the gaze analyzer 2246 can consider non-verbal inputs 2228 that pertain to eye focus, duration of gaze, location of the gaze, and/or pupil dilation, for example. Such inputs may be obtained or derived from, e.g., video clips of a person. In some implementations, the semantic content of the subject of a person's gaze may be analyzed. In general, eye tracking systems monitor and record the movement of a person's eyes and the focus of her gaze using, for example, an infrared light that shines on the eye and reflects back the position of the pupil. The gaze analyzer 2246 can, using these and other techniques, determine cues 2232 that indicate, for example, boredom, confusion, engagement with a subject, distraction, comprehension, and the like.

In implementations in which a person's facial expression, head or face pose, and/or facial features are analyzed, the facial feature recognizer 2248 can analyzes non-verbal inputs 2228 obtained from image data, alone or in combination with motion and/or kinetic inputs such as may be obtained from a system that includes gyroscopes and/or accelerometers, or similar system. In some implementations, low and mid-level facial can bee are extracted from the inputs 2228, 2230 and classified using facial feature classifiers 2252. From this, the facial feature recognizer 2248 can detect, for example, smiles, raised eyebrows, frowns, and the like. As described further below, in some implementations, the facial expression information can be integrated with face pose, body pose, speech tone, and/or other inputs to derive indications of the participants' emotional state, such as anger, confusion, disgust, fear, happiness, sadness, or surprise.

The ASR system 2250 can identify spoken words and/or phrases in the verbal inputs 2230 and, in some implementations, translate verbal inputs 2230 to text form. When used in connection with the interaction assistant 2210, the ASR system 2250 can provide verbal cues that can, after processing by the natural language understand (NLU) system 2262 described below, tend to indicate the nature or efficacy of an interaction. For example, words like "sorry" may indicate that the interaction is going poorly or that a speaker is attempting to return the interaction to a positive state; while words like "great" may indicate that the interaction is going very well.

The interaction modeler 2214 can develop a dynamic model, the interaction model 2216, of an interaction based on the behavioral cues 2232 gleaned from the verbal 2230 and/or non-verbal 2228 inputs captured over the course of an interaction. The model is "dynamic" in that it can account for the non-stationary nature of human interactions as the interactions evolve over time. Additionally, the example interaction modeler 2214 can apply a "data-driven" approach to "learn" or "discover" characteristic or salient patterns of cues expressed during and interaction, whether or not they are explicitly stated. The "bottom-up" approach of the example interaction modeler 2214 allows the interaction model 2216 to be developed so that it can be contextualized and personalized for a specific person that is participating in the interaction. For instance, whereas a heuristic rule-based system might always characterize looking away as an indicator of mind-wandering, such behavior might indicate deep thinking in some people and distraction in others, at least in the context of the a particular interaction. These types of finer-grain distinctions in the interpretation of human behavior can be revealed by the interaction modeler 2214 using the interaction model 2216.

The interaction modeler 2214 can enable modeling of an interaction within the interaction's context, as it evolves over time, rather than as a series of snapshot observations. To do this, the example interaction modeler 2214 can apply techniques that can model the temporal dynamics of the multi-modal data captured by a virtual personal assistant. In various implementations, discriminative modeling techniques such as Conditional Random Fields (CRFs) can be used. In some implementations, generative models (such as Hidden Markov Models (HMMs)) or a combination of discriminative and generative models may be used to model certain aspects of an interaction. For example, in some embodiments, HMMs may be used to identify transition points in the interaction (such as conversational turns or the beginning or end of a phase of the interaction), while CRFs may be used to capture and analyze the non-stationarity of the behavioral cues during the segments of the interaction identified by the HMMs.

The interaction modeler 2214 can apply the CRFs and/or other methods to recognize one or more temporal interaction sequences, each of which can include a pattern of the behavioral cues 2232 occurring during an interaction. A "temporal interaction sequence" refers to any pattern or sequence of behavioral cues 2232 expressed by a person over a time interval during the interaction, which is captured and recognized by the interaction assistant 2210. In other words, a temporal interaction sequence can be thought of as a "transcript" of a pattern or sequence of the low-level features captured by the virtual personal assistant over the course of the interaction. Different temporal interaction sequences can occur simultaneously or overlap, as may be the case where one temporal interaction sequence involves behavioral cues of one participant and another involves behavioral cues of another participant occurring at the same time.

In some implementations, the interaction modeler 2214 can recognize and annotate or label the temporal interaction sequences over multiple time scales, where a time scale is defined by an interval of time whose size can be compared to the size of other time intervals of the interaction. Moreover, in some implementations, the interaction modeler 2214 can learn the associations, correlations and/or relationships between or among the behavioral cues 2232 across multiple modalities, as well as the temporal dynamics of behavioral cues 2232, in an integrated fashion, rather than analyzing each modality separately. As such, the interaction modeler 2214 can derive an assessment a person's behavioral state based on a combination of different multi-modal data, at various points in time and over different temporal sequences of an interaction.

The example interaction modeler 2214 is can include a number of different behavioral modeling sub-modules or sub-systems, including an affect analyzer 2260, a natural language understanding (NLU) system 2262, a temporal dynamics analyzer 2264, an interpersonal dynamics analyzer 2266, and a context analyzer 2268, which can analyze the temporal interaction sequences of behavioral cues 2232. These analyzers can evaluate relationships and dependencies between and/or among the various behavioral cues 2232, which may be revealed by the CRFs and/or other modeling techniques, in a variety of different ways. As a result of these analyses, each of the temporal interaction sequences may be annotated with one or more labels that describe or interpret the temporal interaction sequence. For example, whereas the feature classifiers 2252 may provide low- or mid-level labels such as "smile," "frown," "handshake," etc., the interaction modeler 2214 can apply higher-level descriptive or interpretive labels to the multi-modal data, such as "greeting ritual," "repair phase," "concluding ritual," "amicable," "agitated," "bored," "confused," etc., and/or evaluative labels or assessments such as "successful," "unsuccessful," "positive," "negative," etc. Such annotations may be stored in the interaction model 2216 and/or otherwise linked with the corresponding behavioral cues 2232 and temporal interaction sequences derived from the inputs 2228, 2230 as metatags, for example.

The affect analyzer 2260 cam analyze the various combinations of behavioral cues 2232 that occur during the temporal interaction sequences. For instance, the affect analyzer 2260 can consider combinations of behavioral cues 2232 that occur together, such as head pose, facial expression, and verbal content, and their interrelationships, to determine the participant's likely behavioral, emotional, or cognitive state. In various implementations, such determinations can be based on the integrated combination of cues rather than the individual cues taken in isolation. The example affect analyzer 2260 can also analyze the temporal variations in each of the different types of behavioral cues 2232 over time. In some cases, the affect analyzer 2260 compares the behavioral cues 2232 to a "neutral" reference (e.g., a centroid). In this way, the affect analyzer 2260 can account for spontaneous behavior and can detect variations in the intensities of the behavioral cues 2232.

The NLU system 2262 can parse, semantically analyze, and interpret the verbal content of the verbal inputs 2230 that have been processed by the ASR system 2250. In other words, the NLU system 2262 can analyze the words and/or phrases produced by the ASR system 2250 and determine the meaning most likely intended by the speaker, given the previous words or phrases spoken by the participant or others involved in the interaction. For instance, the NLU system 2262 may determine, based on the verbal context, the intended meaning of words that have multiple possible definitions (e.g., the word "pop" could mean that something has broken, or may refer to a carbonated beverage, or may be the nickname of a person, depending on the context).

The affect analyzer 2260 and/or the NLU system 2262 may annotate the multi-modal data and such annotations may be used by the temporal 2264, interpersonal 2266, and context 2268 analyzers for analysis in the context of one or more temporal interaction sequences. That is, each or any of the analyzers 2264, 2266, 2268 may analyze temporal patterns of the non-verbal cues and verbal content. For instance, if the verbal content of one participant includes the word "sorry" at the beginning of an interaction and the word "great" at the end of the interaction, the results of the temporal analysis performed by the analyzer 2264 may be different than if "great" occurred early in the interaction and "sorry" occurred later. Similarly, an early smile followed by a frown later might be interpreted differently by the analyzer 2264 than an early frown followed by a later smile.

The temporal dynamics analyzer 2264 can analyze the patterns of behavioral cues 2232 to determine how the behavior or "state" (e.g., a combination of behavioral cues captured at a point in time) of a person changes over time. To do this, the temporal dynamics analyzer 2264 can examine the temporal interaction sequences and compare the behavioral cues 2232 that occur later in the temporal sequences to those that occurred previously. The temporal dynamics analyzer 2264 can also consider the time interval in which behavioral cues occur in relation to other time intervals. As such, the temporal dynamics analyzer 2264 can reveal, for example, whether a participant appears, over time, to be growing impatient or increasingly engaged in an interaction.

The interpersonal dynamics analyzer 2266 can analyzes the patterns of behavioral cues 2232 to determine how the behavior or "state" of a person changes in response to the behavior of virtual personal assistant. To do this, the interpersonal dynamics analyzer 2266 can consider temporal sequences of the behavioral cues 2232. For instance, a temporal interaction sequence may include a frown and tense body posture, followed by a calm response by the virtual personal assistant, followed by a smile by the person. From this pattern of behavioral cues, the interpersonal dynamics analyzer 2266 may, for example, identify the virtual personal assistant's response as significant in terms of their impact on the nature or efficacy of the interaction as a whole.

The context analyzer 2268 can analyze the patterns of behavioral cues 2232 to determine how the overall context of the interaction influences the behavior of a person. In other words, the context analyzer 2268 can consider temporal interaction sequences that occur over different time scales, such as over both short term and long range temporal segments. Whereas a "time interval" refers generally to any length of time between events or states, or during which something exists or lasts, a time scale or temporal granularity connotes some relative measure of duration, which may be defined by an arrangement of events or occurrences, with reference to at least one other time scale. For instance, when the time scale is "seconds," the time interval might be one second, five seconds, thirty seconds, etc. Similarly, when the time scale is "minutes," the time interval may be one minute, ten minutes, etc. As a result, the context analyzer 2268 may consider a frown as more significant to an interaction that only lasts a minute or two, but less significant to an interaction that lasts ten minutes or longer.

In some implementations, the time scale(s) used by the context analyzer 2268 may not be predefined or static (such as minutes or seconds) but may be dynamic and derived from the behavioral cues 2232 themselves. That is, the time scale(s) can stem naturally from the sensed data. In some cases, the time scale (s) may correspond to one or more of the temporal interaction sequences. For example, a temporal interaction sequence at the beginning of an interaction may include a smile and a handshake by one participant followed by a smile and a nod by another participant and both participants sitting down. Another temporal interaction sequence may include the behavioral cues of the first interaction sequence and others that follow, up to a transition point in the interaction that is indicated by one or more subsequent behavioral cues (e.g., the participants stand up after having been seated for a while). In these examples, while the smiles may have significance to the first temporal interaction sequence, they may have lesser significance to the interaction as a whole when considered in combination with the behavioral cues of the second temporal interaction sequence. As an example, the interaction modeler 2214 may detect from the first temporal interaction sequence that this appears to be a friendly meeting of two people. However, when the time scale of the first temporal interaction sequence is considered relative to the time scale of the second interaction sequence, the interaction modeler 2214 may determine that the interaction is pleasant but professional in nature, indicating a business meeting as opposed to a casual meeting of friends.

In some implementations, other indicators of the interaction context may be considered by the context analyzer 2268. For instance, the virtual personal assistant may provide data that indicates whether the interaction is occurring indoors or outdoors, or that identifies the geographic location of the interaction. Such indicators can be derived from video clips, or be obtained from computerized location systems (e.g., a cellular system or global positioning system (GPS)) and/or other devices. The context analyzer 2268 can consider these inputs and factor them into the interpretation of the behavioral cues 2232. For instance, a serious facial expression may be interpreted differently by the interaction modeler 2214 when an interaction occurs in a boardroom rather than at an outdoor party. As another example, if some of the behavioral cues 2232 indicate that a person looks away while the system is talking, the context analyzer 2268 may analyze other behavioral cues 2232 and/or other data to determine whether it is more likely that the person looked away out of boredom (e.g., if the system has been speaking on the same topic for several minutes) or distraction (e.g., something occurred off-camera, such as another person entering the room).

The example interaction model 2216 can include a graphical model that represents and models the spatio-temporal dynamics of an interaction and its context. The interaction model 2216 can use hidden states to model the non-stationarity of an interaction. The interaction model 2216 can be implemented using one or more computer-accessible data structures, arguments, parameters, and/or programming structures (e.g., vectors, matrices, databases, lookup tables, or the like), and may include one or more indexed or otherwise searchable stores of information. The example interaction model 2216 includes data stores 2270, 2272, 2274, 2276, 2278, 2280 to store data relating to the behavioral cues 2232, the temporal interaction sequences, and interactions that are modeled by the interaction modeler 2214, as well as data relating to events, assessments, and semantic structures that are derived from the cues 2232, temporal interaction sequences, and interactions as described further below. The interaction model 2216 can also maintain data that indicates relationships and/or dependencies between or among the various cues 2232, sequences 2272, and interactions.

The events data 2276 can include human-understandable characterizations or interpretations (e.g., a semantic meaning) of the various behavioral cues and temporal interaction sequences. For example, a temporal interaction sequence including smiles and handshakes may indicate a "greeting ritual" event, while a temporal interaction sequence including aloud voice and waving arms may indicate an "agitated person" event. Similarly, the events data may characterize some behavioral cues as "genuine smiles" and others as "nervous smiles." The events data 2276 can include identifiers of short-term temporal interaction sequences (which may also be referred to as "markers") as well as longer-term sequences. For example, a marker might be "eye contact" while a longer-term event might be "amicable encounter."

The assessments data 2278 can include indications of the nature or efficacy of interactions as a whole and/or portions thereof, which are derived from the temporal interaction sequences. For example, the nature of an interaction might be "businesslike" or "casual" while the efficacy might be "successful" or "unsuccessful," "positive," or "negative," "good" or "poor." The semantic structures 2280 include patterns, relationships, and/or associations between the different events and assessments that are derived from the temporal interaction sequences. As such, the semantic structures 2280 may be used to formulate statements such as "a pleasant conversation includes smiles and nods of the head" or "hands at sides indicates relaxed." Indeed, the semantic structures 2280 may be used to develop learned rules for an interaction, as described further below.

The interaction model 2216 can make the assessments, semantic structures, and/or other information stored therein accessible to one or more of the application modules 2218, for various uses. Some examples of application modules 2218 include a suggestion module 2290, a dialog module 2292, a prediction module 2294, a description module 2296, and a learned rules module 2298. In some implementations, the modules 2218 may be integrated with the interaction assistant 2210 (e.g., as part of the same "app"). In other embodiments, one or more of the application modules 2218 may be embodied as separate applications (e.g., third-party applications) that interface with the interaction assistant 2210 via one or more electronic communication networks.

The example suggestion module 2290 can evaluate data obtained from the interaction model 2216 and generates suggestions, which may be presented to a person using the virtual personal assistant and/or others (e.g., researchers and other human observers) during and/or after an interaction. To do this, the suggestion module 2290 may compare patterns of cues, events, and/or assessments to stored templates and/or rules. As an example, the suggestion module 2290 may compare a sequence of behavioral cues to a template and based thereon, suggest that a person remove his or her glasses or adjust his or her body language to appear more friendly. The suggestions generated by the suggestion module 2290 may be communicated to the participants and/or others in a variety of different ways, such as text messages, non-text electronic signals (such as beeps or buzzers), and/or spoken dialog (which may include machine-generated natural language or pre-recorded human voice messages).

The example dialog module 2292 can evaluate data obtained from the interaction model 2216 in the context of a dialog between a person and a virtual personal assistant-enabled device. In a virtual personal assistant, as discussed further below, the user's dialog input is processed and interpreted by ASR and NLU systems, and a reasoner module monitors the current state and flow of the dialog and applies automated reasoning techniques to determine how to respond to the user's input. The reasoner module may interface with an information search and retrieval engine to obtain information requested by the user in the dialog. A natural language generator formulates a natural-language response, which is then presented to the user (e.g., in text or audio form).

The example dialog module 2292 can use the interaction data (e.g., cues, events, assessments, etc.) to determine how to interpret and/or respond to portions of the dialog that are presented to it by the human participant. For instance, the dialog module 2292 may use an assessment of an interaction to determine that the person's remarks were intended as humor rather than as a serious information request, and thus a search for substantive information to include in a reply is not needed. As another example, the dialog module 2292 may use event or assessment data gleaned from non-verbal cues to modulate its response. For example, when based on the data the person appears to be confused or frustrated, the dialog module 2292 may select different words to use in its reply, or may present its dialog output more slowly, or may include a graphical representation of the information in its reply. In some implementations, the dialog module 2292 may utilize information from multiple time scales to attempt to advance the dialog in a more productive fashion. For example, when the sequences 2272 indicate that the user appeared to be more pleased with information presented earlier in the dialog but now appears to be getting impatient, the dialog module 2292 may attempt to return the dialog to the pleasant state by, perhaps, allowing the user to take a short break from the dialog session or by representing information that was presented to the user earlier, which seemed to have generated a positive response from the user at that earlier time.

The example prediction module 2294 can operate in a similar fashion to the suggestion module 2290. For example, the prediction module 2294 can compares pattern of the events data 2276, assessment data 2278, and the like to stored templates and/or rules. However, the prediction module 2294 does this to determine cues or events that are likely to occur later in an interaction. For example, the prediction module 2294 may determine that if the system continues a particular sequence of cues for several more minutes, the person is likely to get up and walk out of the room. Such predictions generated by the prediction module 2294 may be presented to the person and/or others, during and/or after an interaction, in any suitable form (e.g., text, audio, etc.).

The example description module 2296 can generate a human-intelligible description of one or more of the assessments that are associated with the interaction 2224. That is, whereas an assessment indicates some conclusion made by the interaction assistant 2210 about an interaction or a segment thereof, the description generally includes an explanation of the reasons why that conclusion was made. In other words, the description typically includes a human-understandable version of the assessment and its supporting evidence. For example, if an assessment of an interaction is "positive," the description may include a phrase such as "this is a positive interaction because both the user made eye contact, smiled, and nodded." In some implementations, the description generated by the description module 2296 may include or be referred to as a recounting.

The example learned rules module 2298 can generate rules based on the semantic structures 2280. Such rules can be derived from the actual data collected during the interaction 2224 rather than being based on heuristics. Some examples of such learned rules include "speaking calmly in response to this person's agitated state will increase [or decrease] the person's agitation" or "hugging after shaking hands is part of this persons greeting ritual." Such learned rules may be used to update the interaction model 2216, for example. Other uses of the learned rules include training and coaching applications (e.g., to develop a field guide or manual for certain types of interactions or for interactions involving certain topics or types of people).

In general, the bidirectional arrows connecting the interaction modeler 2214 and the application modules 2218 to the interaction model 2216 are intended to indicate dynamic relationships between them. For example, the interaction model 2216 may be updated based on user feedback obtained by one or more of the application modules 2218. Similarly, updates to the interaction model 2216 can be used to modify the algorithms, parameters, arguments and the like, that are used by the interaction modeler 2214. Further, regarding any information or output that may be generated by the application modules 2218, such data may be for later use, or may be communicated to other applications (e.g., over a network), alternatively or additionally to being presented to a person using a virtual personal assistant-enable device.

III. Conversational System

An interaction assistant as described above may be assisted in determining how to react during the course of a dialog by one or more ontologies. For example, the interaction assistant may use ontologies to aid in determining suggestions, formulating dialog, and/or predicting how an interaction may proceed. As discussed above, an ontology is a framework for organizing information. In various implementations, a virtual personal assistant may include context-specific frameworks, such as domain-specific ontologies.

In various implementations, a virtual personal assistant may also include dynamic and adaptive ontologies. An adaptive ontology can adapt to new concepts and relationships as a virtual personal assistant acquires new information during use. For example, an adaptive ontology can be grown using machine learning. A dynamic ontology can be operated on similar principles as an adaptive ontology, in that the dynamic ontology can grow as a virtual personal assistant acquires new information. A dynamic ontology, however, can be focused less on being a repository of all useful knowledge, and more as a history or context-specific framework of a conversation with a person or group of people. For example, a dynamic ontology can record intents interpreted from a person's input and concepts associated with those intents. In various implementations, a dynamic ontology can be added to using static or adaptive ontologies, so that the dynamic ontology has information on an as-needed basis. In various implementations, a dynamic ontology can also shrink, as information ceases to be relevant.

Figure 23:
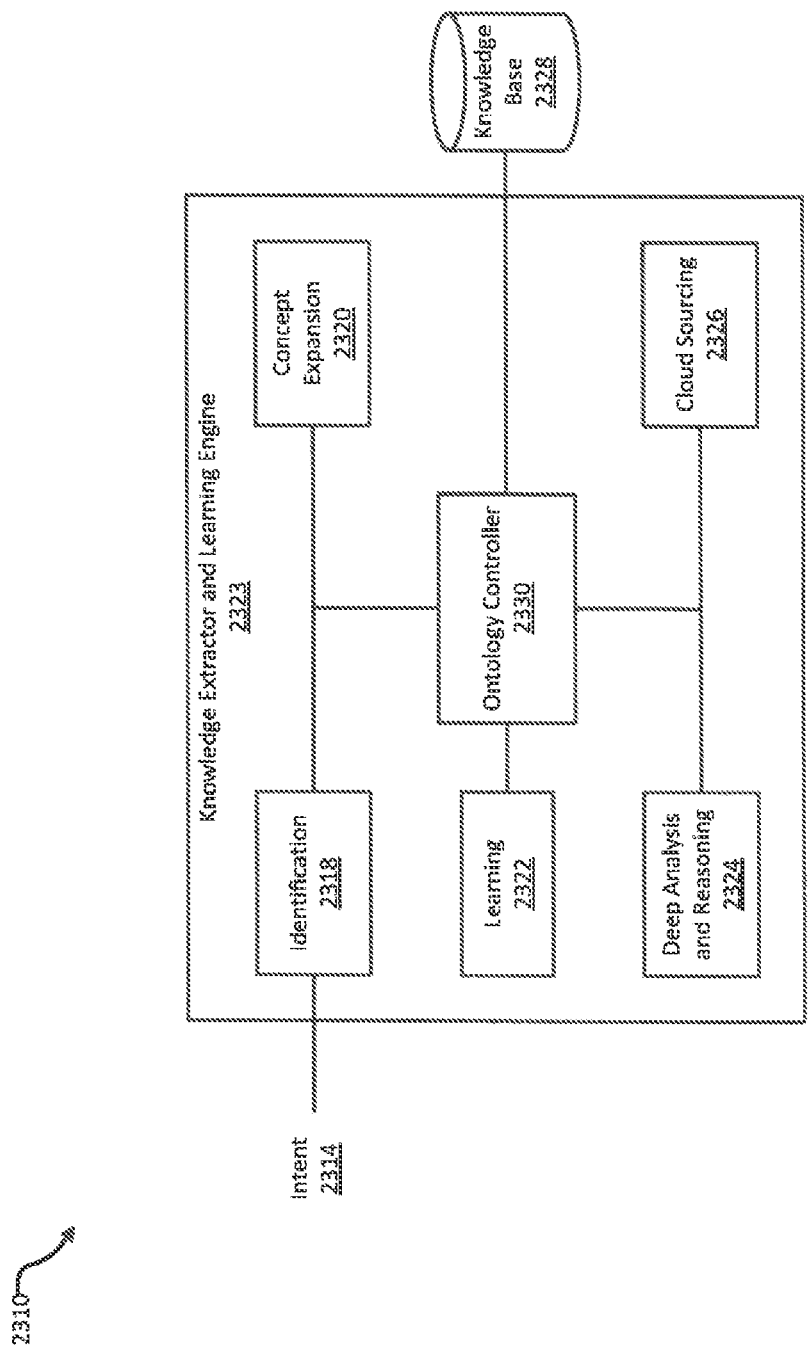
FIG. 23 illustrates an example of an adaptive or dynamic ontology system.

FIG. 23 illustrates an example of an adaptive or dynamic ontology system 2310. Generally, an adaptive or dynamic ontology system 2310 can adapt a virtual personal assistant's current knowledge using a particular person's preferences. The adaptive or dynamic ontology system 2310 can also improve, change, and/or modify the virtual personal assistant's general and domains-specific ontologies, given explicit and/or implicit feedback from a device's user, user data such as user profiles, and from learning a person's preferences. The adaptive or dynamic ontology system 2310 can enable a virtual personal assistant to, using machine learning, adapt ontologies so that new concepts and relationships can be developed or strengthened based on machine learning. The adaptive or dynamic ontology system 2310 can, also using machine learning, enable the removal of concepts or weakening of relationship strength among concepts.

In various implementations, the adaptive or dynamic ontology system 2310 can include a knowledge extractor and learning engine 2316. In various implementations, the knowledge extractor and learning engine 2316 may include software logic modules that enable a virtual personal assistant to adapt an ontology for an individual's terminology, usage patterns, preferences, and priorities, among other things. The knowledge extractor and learning engine 2316 can gather new terms, usage, meanings, preferences, and priorities through various observations, such as click stream data, implicit user behavior patterns, and explicit user indications. In various implementations, the knowledge extractor and learning engine 2316 can index these observations according to a set of pre-determined features, where these features define the characteristics of observation data that are of interest to the virtual personal assistant. The knowledge extractor and learning engine 2316 can process such input and overlay the data over indexed, tagged, and clustered data derived from a variety of data sources. The resulting process generates indicators that can be incorporated into a virtual personal assistant. In this way, the virtual personal assistant can have the ability to adapt to a user's needs, preferences, lingo and more.

As illustrated in FIG. 23, the knowledge extractor and learning engine 2316 may have several modules, among them an ontology controller 2330. The ontology controller 2330 can interacts with other modules in the knowledge extractor and learning engine 2316, including an identification module 2318, a concept expansion module 2320, a learning module 2322, and a deep analysis and reasoning module 2324. The knowledge extractor and learning engine 2316 may also include a cloud sourcing module 2326, and may interact with a knowledge store 2328.

In various implementations, the adaptive ontology system 2310 includes five phases: concept identification, relationship identification, concept inclusion, concept exclusion, and concept and relationship personalization.

In various implementations, concept identification processes specify a new concept that needs to be added to the ontology map. An ontology map is a topological representation of objects in an ontology and how they relate to each other. In various implementations, concept identification beings when the identification module 2314 receives an intent 2314, formulated, for example, by an interpretation component of a virtual personal assistant. The identification module 2314 may identify concepts, such as people, places, or things, expressed within in the intent. The ontology controller 2330 may identify new concepts, for example by querying the knowledge base 2328 for the concepts identified by the identification module 2314. In various implementations, the identification module 2314 can also identify particular terms that may be unique to a particular person. For example, the intent 2314 may have been passed through a preference model, which may have associated a particular person or the person's personal characteristics with the intent.

The ontology control 2330 may further use the concept expansion module 2320 and learning module 2322 to perform relationship identification. To perform relationship identification, in various implementations, the concept expansion module 2320 can use indexing, clustering, classification and frequency counts to identify relationships between newly discovered concepts and existing concepts. Using this information, the learning module 2322 can determine possible relationships between the newly discovered concept and the current ontology. An affinity index can quantify the strength of the relationship using concept occurrence frequency and co-concept occurrence frequency.

After determining the affinity index between the newly discovered concept and nodes in the ontology map, the ontology controller 2330 can perform concept inclusion. That is, the ontology controller 2330 can pick relationships with the greatest affinity index. The ontology controller 2330 and learning engine 2316 can then update the ontology to include the new concept using the concept inclusion process. The knowledge extractor and learning engine 2316 can continue an ongoing process of strengthening or weakening the affinity index for newly included concepts based upon user inputs such as query requests and click stream data.

In contrast, when the ontology controller 2330 discovers from the user's inputs that the newly created concepts and its relationships are not used by the user, the ontology controller 2330 can perform concept exclusion by decrease the affinity index. When the process continues to a point where the affinity index falls under a certain threshold, the concept node in the ontology map becomes an orphan and can be pruned or excluded from the map.

In various implementations, concept inclusion and exclusion can be assisted by the deep analysis and reasoning module 2324. The deep analysis and reasoning module 2324 can identify important terms often referred to in the corpus but that do not appear in the ontology, and identify important terms in questions found in the corpus. These terms are collected along with the context in which they appeared. Those terms whose frequencies attain a certain threshold are passed on to ontology controller 2333, which can use the context and user feedback, among other things, to try to identify if the terms relate to existing concepts in the ontology.

The remaining phase is concept relationship and personalization. Concept nodes in the ontology may have associated parameters. Monitoring user inputs and data, and based on user feedback, the knowledge extractor and learning engine 2316 can learn acceptable values and ranges for some parameters and adjust them over time.

IV. Example Applications

Figure 24:
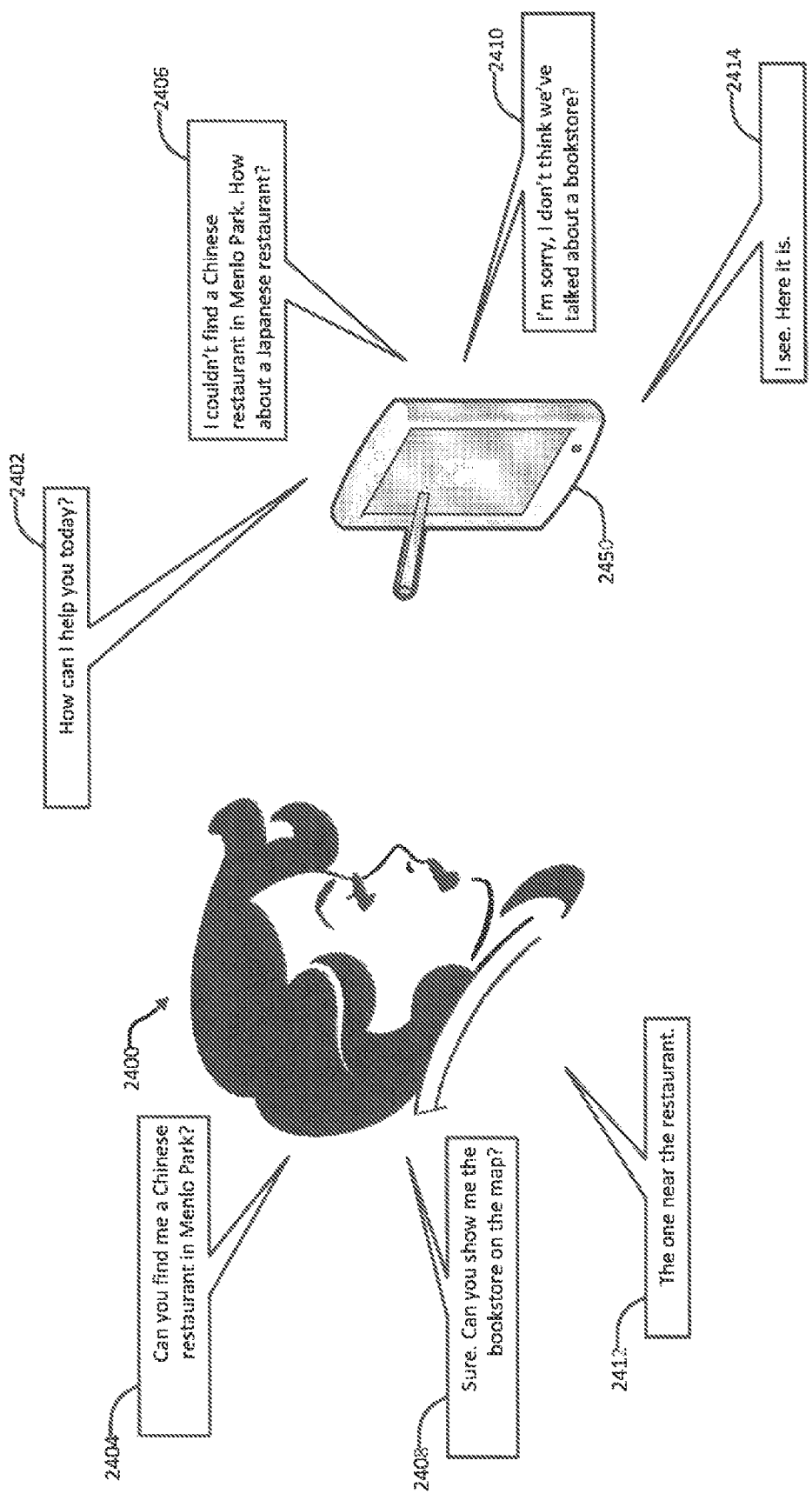
FIG. 24 illustrates an example where a virtual personal assistant has been integrated into a tablet device.
Figure 25:
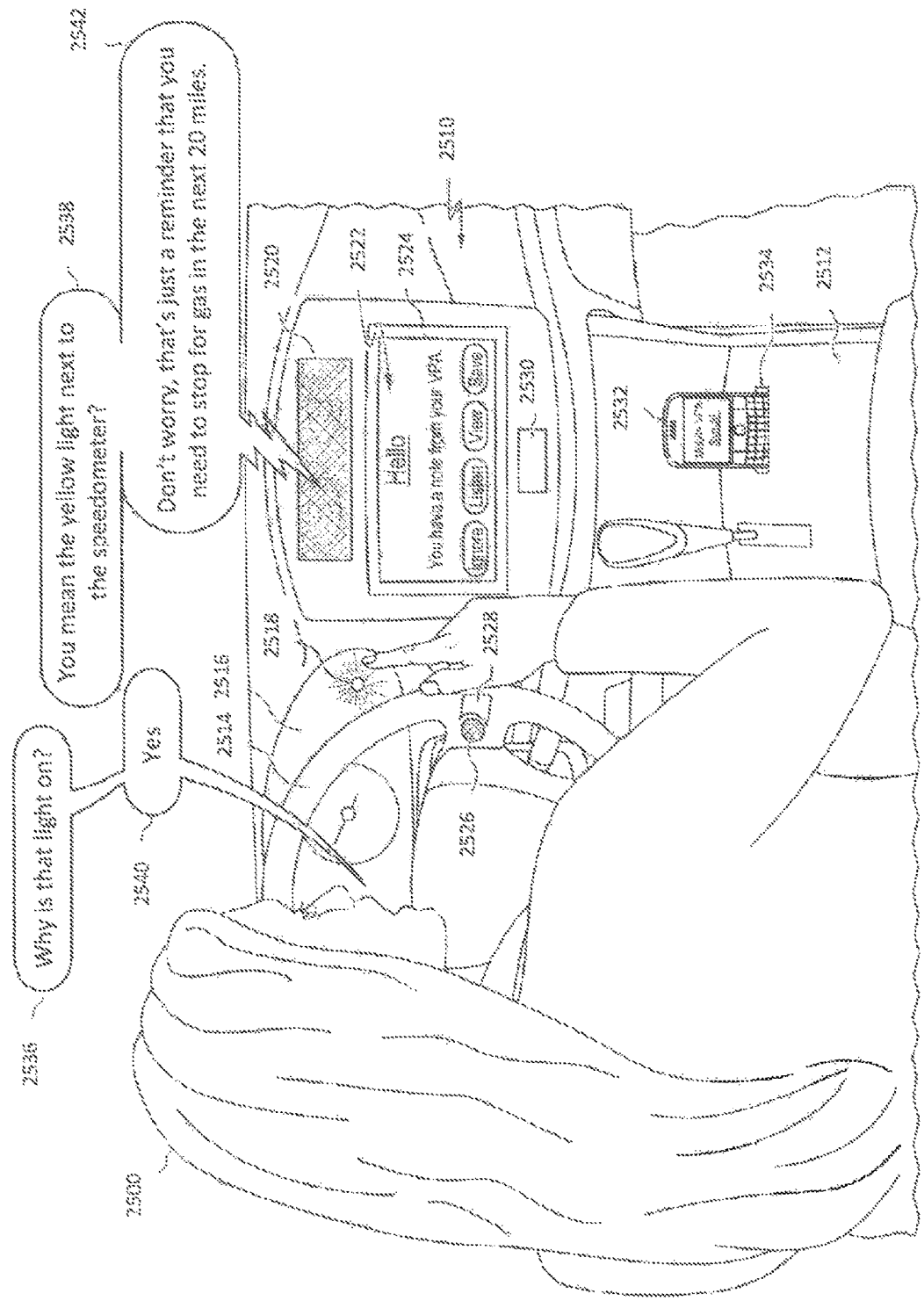
FIG. 25 illustrates an example where a virtual personal assistant has been implemented in an automobile.
Figure 26:
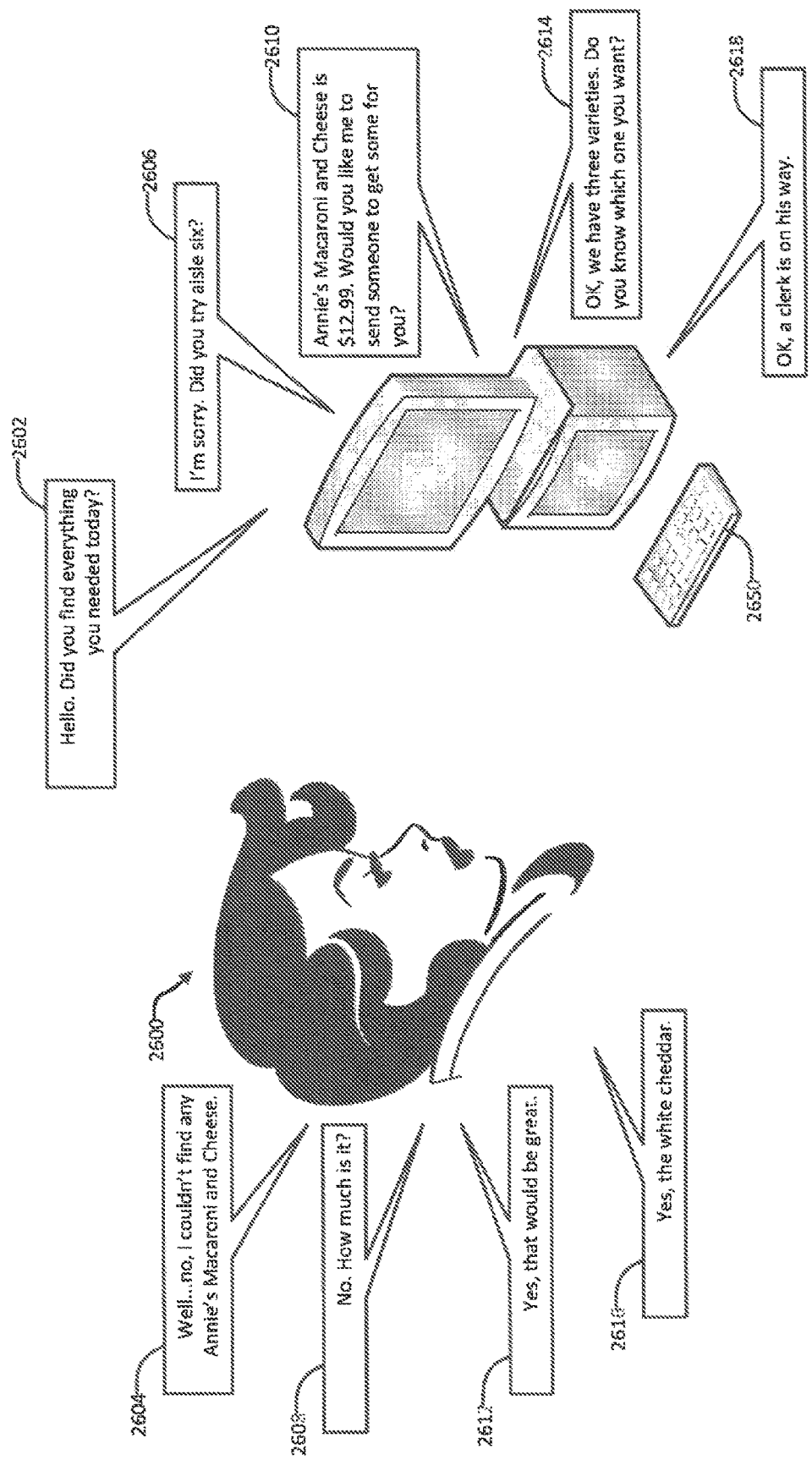
FIG. 26 illustrates an example where a virtual personal assistant has been implemented in a service robot.

A multi-modal, conversational virtual personal assistant, and components with which a virtual personal assistant can understand, interpret, and reason have been discussed above. Provided in FIGS. 24-26 are example applications of virtual personal assistants, to illustrate virtual personal assistants being used in different contexts. These examples illustrate the conversational abilities of virtual personal assistants, the ability to recognize verbal and non-verbal cues, and the ability to adjust responses according to both verbalized and non-verbalized responses.

FIG. 24 illustrates an example where a virtual personal assistant has been integrated into a tablet device 2450. FIG. 24 further illustrates an example of an interaction a person 2400 may have with the tablet device 2450. In this example, the domain may be defined as a tablet device domain. A tablet device can be a type of general-purpose computing device, and thus the domain can be quite broad. A tablet device, however, may have typical uses, such as entertainment (e.g., playing games, watching movies, etc.), communication (e.g., making phone calls, sending text messages or emails or instant messages, engaging in social media, video conferencing, etc.), and retrieval of information (e.g., conducting web searches). Thus, the tablet domain, though broad, can also be focused on these typical use cases.

To enable interactions with the person 2400, the tablet device 2450 may include various input interfaces. These input interfaces may include, for example, a touchscreen that the person 2400 can use to type text, select buttons, initiate applications, control applications, and provide other tactile input. The input interfaces can also include a microphone that can capture words and/or noises made by the person 2400. The input interface can also include a camera that can capture images of the person 2400, the person's 2400 gestures or body language, and/or the person's environment. The tablet device 2450 may further include various output interfaces that the virtual personal assistant can use to respond to the person 2400. The output interfaces can include a display screen for providing visual information, and a speaker for providing audible information.

This example illustrates the virtual personal assistant interpreting the person's 2400 intents, making suggestions, asking for confirmation, and maintaining the thread of the conversation. In this example, the virtual personal assistant may make use of automatic speech recognition, natural language understanding, domain-specific and general ontologies, dynamic ontologies, local information and information found on the Internet, in order to respond to the person 2400 in a conversational manner, and to provide the person 2400 with the information she asked for.

The interaction may begin by, at step 2402, the tablet device 2450 asking the person 2400: "How can I help you today?" In various implementations, the interaction may have been triggered when the person 2400 activated an application on the tablet device 2450 by selecting an icon on the screen, pushing a button, and/or speaking a phrase. Alternatively or additionally, the tablet device 2402 may have recognized, from the person's 2400 expression or non-verbal sounds, that the person 2400 needed some information.

At step 2404, the person 2400 asks: "Can you find me a Chinese restaurant in Menlo Park?" Using automatic speech recognition and natural language understanding, the virtual personal assistant can determine that the person's 2400 intent is to location a particular type of restaurant (Chinese) in a particular city (Menlo Park). The virtual personal assistant can further use an ontology, such as an ontology for information about the city of Menlo Park, to find the requested information. Failing to find what the person 2400 asked for, the virtual personal assistant may draw the conclusion that a restaurant of some other type may satisfy the person's 2400 request. Using an ontology, the virtual personal assistant may relate "Chinese restaurant" to "Asian restaurant" and further determine that there are Japanese restaurants in Menlo Park. The virtual personal assistant may thus, at step 2406, suggest: "I couldn't find a Chinese restaurant in Menlo Park. How about a Japanese restaurant?"

At step 2408, the person 2400 may be satisfied with the virtual personal assistant's suggestion, but may further ask a seemingly unrelated question: "Sure. Can you show me the bookstore on the map?" From this response, the virtual personal assistant may conclude that the person 2400 wants information about Japanese restaurants in Menlo Park, but may be uncertain what this information has to do with bookstores or maps. Thus, at step 2410, the virtual personal assistant may ask for clarification: "I'm sorry, I don't think we've talked about a bookstore?"

At step 2412, the person 2400 responds: "The one near the restaurant." This statement requires interpreting what "the one" and "the restaurant" is in order to understand the person's 2400 intent. Drawing on the stored, prior dialog, the virtual personal assistant can determine that "the restaurant" is a Japanese restaurant that the virtual personal assistant suggested earlier. The virtual personal assistant can further determine that "the one" is the bookstore that the person 2400. At this point in the conversation, the virtual personal assistant may ask which Japanese restaurant the person 2400 is asking about, if there is more than one in the city of Menlo Park. In this example, however, the virtual personal assistant can draw on available information, such as maps and address books, to determine that there is only one Japanese restaurant in Menlo Park with a bookstore nearby. Thus, at step 2414, the virtual personal assistant may respond: "I see. Here it is." The virtual personal assistant may further cause the tablet device 2450 to display a map, as requested by the person 2400.

FIG. 25 illustrates an example where a virtual personal assistant has been implemented in an automobile 2512. In this example, the domain can be defined is primarily vehicle and travel related. As such, the domain may include information about the functionality of the automobile 2510, about vehicle maintenance, and about driving, among other things. The domain may also include information such as maps, address books, routes, and so on. In implementations where the automobile 2510 is able to communicate with a network (e.g., through a cellular connection, radio signals, and/or through a mobile device 2534 that has been connected to the automobile 2510), the domain information may also include, for example, weather, road conditions, traffic, and other real-time information. In various implementations, given that a driver 2500 may ask for any information, or may desire to execute tasks unrelated to driving, the domain may be broader. For example, the domain may encompass similar information as would be in a tablet device domain. Vehicle personal assistants are also discussed in U.S. Pat. No. 9,085,303, titled "Vehicle Personal Assistant," the entirety of which is incorporate herein by reference.

In this example, the virtual personal assistant may make use of components typically provided on a dashboard 2510 of an automobile, such as speakers 2520, a display screen 2524, and various buttons 2530. The virtual personal assistant can use the speakers 2520 to provide audible information, and the display screen 2524 to provide visual information 2522 to the driver 2500. The buttons 2530 on the dashboard 2510 can, for example, disable the visual information 2522 from the virtual personal assistant, and/or activate the virtual personal assistant. The virtual personal assistant may also make use of other hardware within the automobile 2512, such as a microphone 2526 that may be mounted on the steering wheel 2514 or elsewhere, and buttons 2528 located on the steering wheel 2514. The virtual personal assistant can use the microphone 2526 to capture audible input. The buttons 2528 on the steering wheel 2514 can also be used to disable the visual information 2522, to activate or deactivate the virtual personal assistant, or for some other interactions with the personal assistant (e.g., changing the volume, etc.).

In various implementations, the automobile 2510 may include a dock 2534 for a mobile device 2532. In various implementations, the dock 2534 may provide a physical connector for the mobile device 2532, and may further provide ability to integrate the mobile device 2532 into the functionality of the automobile 2510. For example, when the mobile device 2532 is connected to the dock 2534, the driver 2500 may be able to make phone calls using the input interfaces provided by the automobile 2510, where the calls are made by the mobile device 2532. In some implementations, the virtual personal assistant is integrated into the mobile device 2532, and when the mobile device 2532 is in the dock 2534, the automobile 2510 is treated as an extension of the mobile device 2532. For example, when the mobile device 2532 is in the dock 2534, the virtual personal assistant in the mobile device 2532 may be able to obtain information about the automobile 2510, and/or control some systems (e.g. the audio system) of the automobile 2510. When the mobile device 2532 disconnects from the dock 2534, the mobile device 2532 no longer has access to the automobile's 2510 information or systems. In some implementations, the dock 2534 may provide a wireless connection (e.g. using Bluetooth™) between the automobile 2510 and the mobile device 2532.

In various implementations, the driver 2500 may engage with the virtual personal assistant by pressing a button (e.g., a button 2530 on the dashboard 2510 or a button 2528 on the steering wheel 2514). Alternatively or additionally the driver 2500 may engage with the virtual personal assistant by speaking a phrase or looking in the direction of the display screen 2524. Alternatively or additionally, the driver 2500 may simply begin speaking, and the virtual personal assistant, recognizing that the driver 2500 is the only person in the automobile 2510, may assume that the driver 2500 intends for the virtual personal assistant to respond.

In this example, at step 2536, the driver 2500, noticing a light 2518 on the dashboard 2510, asks: "why is that light on?" The driver 2500 may, at the same time, point at the light. The virtual personal assistant may, using automatic speech recognition and natural language understanding, determine that the driver's 2500 intent is for the virtual personal assistant to tell her what "that light" is for. To determine what "that light" refers to, the virtual personal assistant in this example does not have previous dialog to refer to, but does have image information, specifically, the direction in which the driver 2500 is pointing. Alternatively or additionally, the virtual personal assistant may assess which of all possible lights within the view of the driver 2500 the driver 2500 may be referring to. To confirm that it made the correct conclusion, the virtual personal assistant may ask, at step 2538: "You mean the yellow light next to the speedometer?"

The driver 2500 may respond, at step 2540, "Yes." The virtual personal assistant may detect some anxiety in the driver's 2500 tone of voice or the urgency in the manner in which she responded. Alternatively or additionally, the virtual personal assistant may, from image data, determine that the driver 2500 is frowning. The virtual personal assistant's response, at step 2542, may thus answer the driver's 2500 question in a reassuring manner: "Don't worry, that's just a reminder that you need to stop for gas in the next 20 miles."

FIG. 26 illustrates an example where a virtual personal assistant has been implemented in a service robot 2650. In this example, a service robot 2650 has been configured for use as a retail customer service robot. In this application, the service robot 2650 can scan customer's items, provide a total, answer questions about products for sale in the store, and provide general customer service. A service robot can also be used in other applications, such as in education, healthcare, and/or therapy. For example, a service robot can be used as a teaching assistant, answering questions, providing lectures, and/or providing interactive teaching sessions. As another example, a service robot can be used to assist in medical diagnosis and advice, or possibly as a remote assistant for a doctor. As another example, a service robot 2650 can be used at an information desk for a store, office building, hospital, police station, or any other venue where people may seek information about the venue.

In the illustrated example, the service robot 2650 has been stationed in a store, such as a grocery store. In this example, the domain may include the products sold by the store, as well as where the product are located within the store, and the store's current inventory. The domain may further include workflows to answer the types of questions shoppers may ask.

In this example, the interaction may begin when a shopper 2600 approaches the service robot 2650. The service robot 2650 may be equipped with a camera. By executing computer vision techniques on images captured by the camera, the service robot 2650 may recognize, for example from a direct manner in which the shopper 2600 approached the service robot 2650, that the shopper 2600 wants to ask the service robot 2650 a question. Alternatively or additionally, the shopper 2600 may activate the service robot 2650 by pushing a button or scanning a product using a barcode scanner built into the service robot 2650. Once activated, the service robot 2650 may ask, at step 2602, "Hello. Did you find everything you needed today?"

The shopper 2600 responds, at step 2604, "Well . . . no, I couldn't find any Annie's Macaroni and Cheese." The virtual personal assistant may, from the shopper's 2600 verbal response and/or imagery captured by the service robot's 2650 camera, determine that the shopper 2600 wants to buy some Annie's Macaroni and Cheese, and further may also detect some mild frustration. The virtual personal assistant, having access to the store's layout and inventory through, for example, a domain-specific ontology, knows where to find the Annie's Macaroni and Cheese, but rather than simply providing the answer, the virtual personal assistant may attempt to alleviate the shopper's 2600 frustration. Thus, the virtual personal assistant responds, at step 2606: "I'm sorry. Did you try aisle six?"

At step 2608, the shopper 2600 responds: "No. How much is it?" In this response, the virtual personal assistant must determine what "it" refers to. Referring to past dialog (e.g., stored in a dynamic ontology), the virtual personal assistant can determine that "it" refers to the Annie's Macaroni and Cheese. The virtual personal assistant may, from the shopper's 2600 tone of voice and/or facial expression, may sense growing frustration. The virtual personal assistant may thus make use of resources available that may alleviate the shopper's 2600 frustration. Specifically, the virtual personal assistant, in addition to answer the shopper's 2600, may, at step 2610, suggest assistance: "Annie's Macaroni and Cheese is $12.99. Would you like me to send someone to get some for you?"

The shopper 2600, at step 2612, responds positively: "Yes, that would be great." The virtual personal assistant, however, needs more information, and thus, at step 2614, asks: "Ok, we have three varieties. Do you know which one you want?" By retaining user state information via, for example, a dynamic ontology, the system can recall that the shopper was previously frustrated about being unable to find the Annie's Macaroni and Cheese in the store. To avoid potentially raising the shopper's 2600 frustration level again, the virtual personal assistant keeps the response short and precise. In this way, the virtual personal assistant implemented in the service robot 2650 can associate user states (e.g., emotional, cognitive, or mental states) with semantic information extracted from the dialog. The virtual personal assistant can further retain those associations in a memory (e.g., using an ontology) for future. In other words, the system associates the emotion of "frustration" with the semantic concept of "unable to find Annie's Macaroni and Cheese" and remembers this specific association of emotion to semantic information for later use.

At step 2616, the shopper 2600 responds: "Yes, the white cheddar." The virtual personal assistant may, at this point, confirm that this variety is available. The virtual personal assistant may then confirm, at step 2618, to the shopper 2600 that a person (or a robot) is being sent to fetch the product: "OK, a clerk is on his way."

Specific details were given in the preceding description to provide a thorough understanding of various implementations of systems and components for a virtual personal assistant. It will be understood, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" or "computer-program product" includes, but is not limited to, portable or non-portable storage devices, optical storage devices, and various other mediums capable of storing, containing, or carrying instruction(s) and/or data. A computer-readable medium and computer-program products may include a non-transitory medium in which data can be stored and that do not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium and computer-program products may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for network threat detection and analysis.

What is claimed is:

1. A method comprising:
receiving, by a computing device, sensory input comprising at least audio input and visual input;
determining semantic information from the sensory input;
determining a first questioning style to question a user using the semantic information;
determining scene information from the visual input;
determining, after waiting for audio input from the user, an input state associated with the user using the audio input and the scene information;
changing the first questioning style to a second questioning style using the determined input state, the second questioning style being different from the first questioning style; and
outputting a question to the user using the second questioning style.

2. The method of claim 1, further comprising extracting the scene information from at least one image input or at least one video input.

3. The method of claim 1, further comprising determining object information from the scene information and using the object information to determine the input state.

4. The method of claim 1, further comprising determining event information from the scene information and using the event information to determine the input state.

5. The method of claim 1, further comprising determining motion information from the scene information and using the motion information to determine the input state.

6. The method of claim 1, further comprising determining the scene information using at least one machine learned model trained using domain-specific training samples including at least one image sample or at least one video sample.

7. The method of claim 1, further comprising, using the scene information, determining a temporal sequence and using the temporal sequence to determine the input state, wherein the temporal sequence comprises (i) an object, (ii) an event, or (iii) a combination of (i) and (ii).

8. The method of claim 1, further comprising extracting an image of an iris of a human eye from the visual input, using the image to generate a code, comparing the code to a template, determining biometric information based on a comparison of the code to the template, and using the biometric information to determine the input state.

9. The method of claim 1, wherein the input state is at least one of an emotional state, cognitive state, or mental state of the user.

10. The method of claim 1, wherein the sensory input is generated by the user.

11. A device, comprising: at least one processor;
at least one sensor coupled to the at least one processor; and memory coupled to the at least one processor;
the memory cooperating with the at least one processor to cause the at least one processor to be capable of performing operations comprising:
receiving, by the at least one sensor, audio input;
receiving, by the at least one sensor, visual input;
determining semantic information from the audio input;
determining a first questioning style to question a user using the semantic information;
determining scene information from the visual input;
determining, after waiting for audio input from the user, an input state associated with the user using the audio input and the scene information;
changing the first questioning style to a second questioning style using the determined input state, the second questioning style being different from the first questioning style; and
outputting a question to the user using the second questioning style.

12. The device of claim 11, the memory cooperating with the at least one processor to cause the at least one processor to be capable of performing operations further comprising extracting the scene information from at least one image input or at least one video input.

13. The device of claim 11, the memory cooperating with the at least one processor to cause the at least one processor to be capable of performing operations further comprising determining object information from the scene information and using the object information to determine the input state.

14. The device of claim 11, the memory cooperating with the at least one processor to cause the at least one processor to be capable of performing operations further comprising determining event information from the scene information and using the event information to determine the input state.

15. The device of claim 11, the memory cooperating with the at least one processor to cause the at least one processor to be capable of performing operations further comprising determining motion information from the scene information and using the motion information to determine the input state.

16. The device of claim 11, the memory cooperating with the at least one processor to cause the at least one processor to be capable of performing operations further comprising determining the input state using at least one machine-learned model trained using domain-specific training samples including at least one image sample or at least one video sample.

17. The device of claim 11, the memory cooperating with the at least one processor to cause the at least one processor to be capable of performing operations further comprising, using the scene information, determining a temporal sequence and using the temporal sequence to determine the input state, wherein the temporal sequence comprises (i) at least one object, (ii) at least one event, or (iii) a combination of (i) and (ii).

18. The device of claim 11, the memory cooperating with the at least one processor to cause the at least one processor to be capable of performing operations further comprising extracting an image of an iris of a human eye from the visual input, using the image to generate a code, comparing the code to a template, determining biometric information based on a comparison of the code to the template, and using the biometric information to determine the input state.

19. At least one memory device storing instructions which, when executed by at least one processor, cause the at least one processor to be capable of performing operations comprising:
    receiving an audio input;
    receiving a visual input;
    determining semantic information from the audio input;
    determining a first questioning style to question a user using the semantic information;
    determining scene information from the visual input;
    determining, after waiting for audio input from the user, an input state associated with the user using the audio input and the scene information;
    changing the first questioning style to a second questioning style using the determined input state, the second questioning style being different from the first questioning style; and
    outputting a question to the user using the second questioning style.

20. The at least one memory device of claim 19, wherein the instructions, when executed by the at least one processor, cause the at least one processor to be capable of performing operations further comprising extracting the scene information from at least one image input or at least one video input and determining the input state using at least one machine-learned model trained using domain-specific training samples including at least one image sample or at least one video sample.

21. The at least one memory device of claim 19, wherein the instructions, when executed by the at least one processor, cause the at least one processor to be capable of performing operations further comprising determining object information from the scene information and using the object information to determine the input state.

22. The at least one memory device of claim 19, wherein the instructions, when executed by the at least one processor, cause the at least one processor to be capable of performing operations further comprising, using the scene information, determining a temporal sequence and using the temporal sequence to determine the input state, wherein the temporal sequence comprises (i) at least one object, (ii) at least one event, or (iii) a combination of (i) and (ii).

* * * * *